(12) United States Patent
Ohashi

(10) Patent No.: US 7,151,638 B2
(45) Date of Patent: Dec. 19, 2006

(54) ZOOMING LENS SYSTEM AND DEVICE USING THE ZOOMING LENS SYSTEM

(75) Inventor: Kazuyasu Ohashi, Funabashi (JP)

(73) Assignee: Ricoh Company, Ltd., Tokyo (JP)

( * ) Notice: Subject to any disclaimer, the term of this patent is extended or adjusted under 35 U.S.C. 154(b) by 66 days.

(21) Appl. No.: 11/064,515

(22) Filed: Feb. 24, 2005

(65) Prior Publication Data

US 2005/0190457 A1    Sep. 1, 2005

(30) Foreign Application Priority Data

Feb. 27, 2004 (JP) ............................. 2004-053631
May 17, 2004 (JP) ............................. 2004-146191

(51) Int. Cl.
*G02B 15/14* (2006.01)
(52) U.S. Cl. ..................................... 359/687; 359/690
(58) Field of Classification Search ................ 359/683, 359/687, 690
See application file for complete search history.

(56) References Cited

U.S. PATENT DOCUMENTS

| | | | | |
|---|---|---|---|---|
| 5,313,331 | A | * | 5/1994 | Mihara ........................ 359/687 |
| 5,383,058 | A | * | 1/1995 | Yonezawa .................... 359/687 |
| 5,581,319 | A | | 12/1996 | Ohashi |
| 5,630,188 | A | | 5/1997 | Ohashi |
| 6,498,687 | B1 | | 12/2002 | Sekita et al. |
| 6,747,818 | B1 | | 6/2004 | Ohashi et al. |
| 6,771,433 | B1 | | 8/2004 | Ohashi |
| 6,829,102 | B1 | | 12/2004 | Ohashi et al. |
| 2002/0060855 | A1 | | 5/2002 | Ohashi |
| 2004/0004772 | A1 | | 1/2004 | Ohashi et al. |

FOREIGN PATENT DOCUMENTS

| JP | 03-236040 | 10/1991 |
|---|---|---|
| JP | 03-278013 | 12/1991 |
| JP | 04-109263 | 4/1992 |
| JP | 05-088250 | 4/1993 |
| JP | 05-088274 | 4/1993 |
| JP | 05-313244 | 11/1993 |
| JP | 06-242506 | 9/1994 |
| JP | 09-274147 | 10/1997 |
| JP | 09-274148 | 10/1997 |
| JP | 10-039214 | 2/1998 |
| JP | 10-104518 | 4/1998 |
| JP | 2001-296476 | 10/2001 |
| JP | 2002-082282 | 3/2002 |
| JP | 2002-156581 | 5/2002 |
| JP | 2002-244039 | 8/2002 |

(Continued)

*Primary Examiner*—Scott J. Sugarman
(74) *Attorney, Agent, or Firm*—Oblon, Spivak, McClelland, Maier & Neustadt, P.C.

(57) ABSTRACT

A zooming lens apparatus including a first optical lens group having a positive refractive power, a second optical lens group having a negative refractive power, a third optical lens group having a positive refractive power, and a fourth optical lens group having a positive refractive power. The zooming lens apparatus also includes an aperture diaphragm arranged between the second and third optical lens group. When a scaling of the zooming lens system is changed from a wide-angle limit to a telescopic limit, the first optical lens group and the third optical lens group are moved in a first direction, and the fourth optical lens group is moved in a second direction opposite of the first direction. The zooming lens apparatus satisfies an inequality condition $0.60 < m_{4T} < 0.85$, where $m_{4T}$ represents an imaging magnification of the fourth optical lens group at the telescopic limit.

50 Claims, 26 Drawing Sheets

FOREIGN PATENT DOCUMENTS

| | | |
|---|---|---|
| JP | 2002-296499 | 10/2002 |
| JP | 2003-035868 | 2/2003 |
| JP | 2003-287679 | 10/2003 |
| JP | 2004-013169 | 1/2004 |

\* cited by examiner

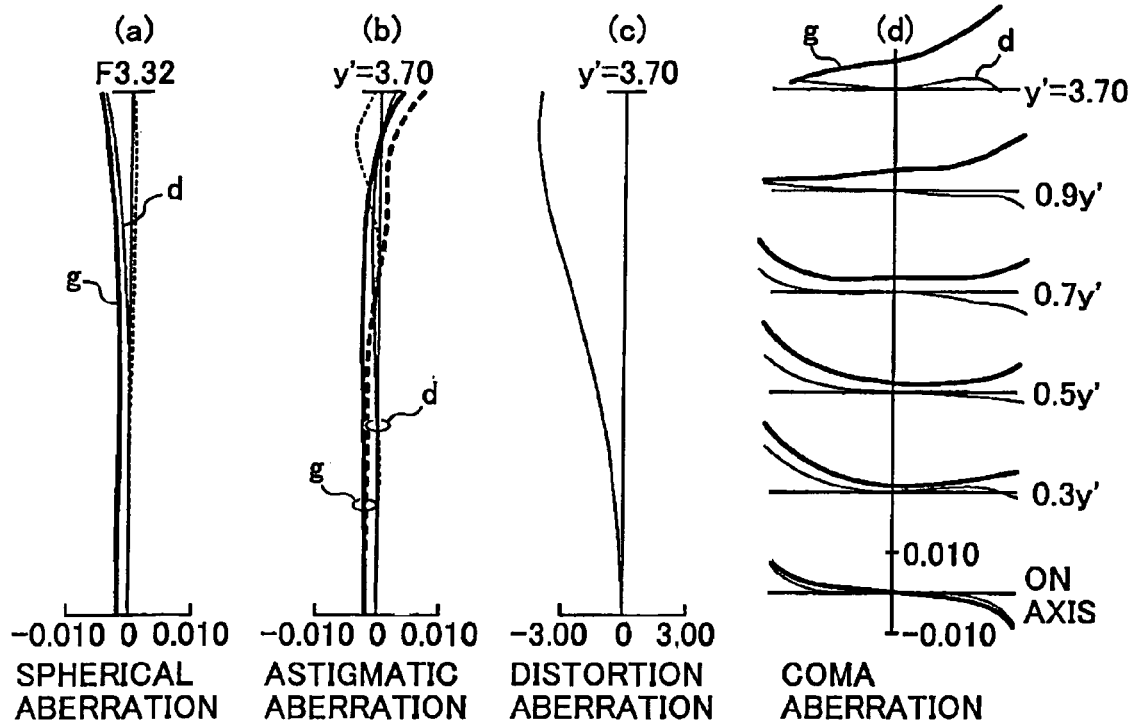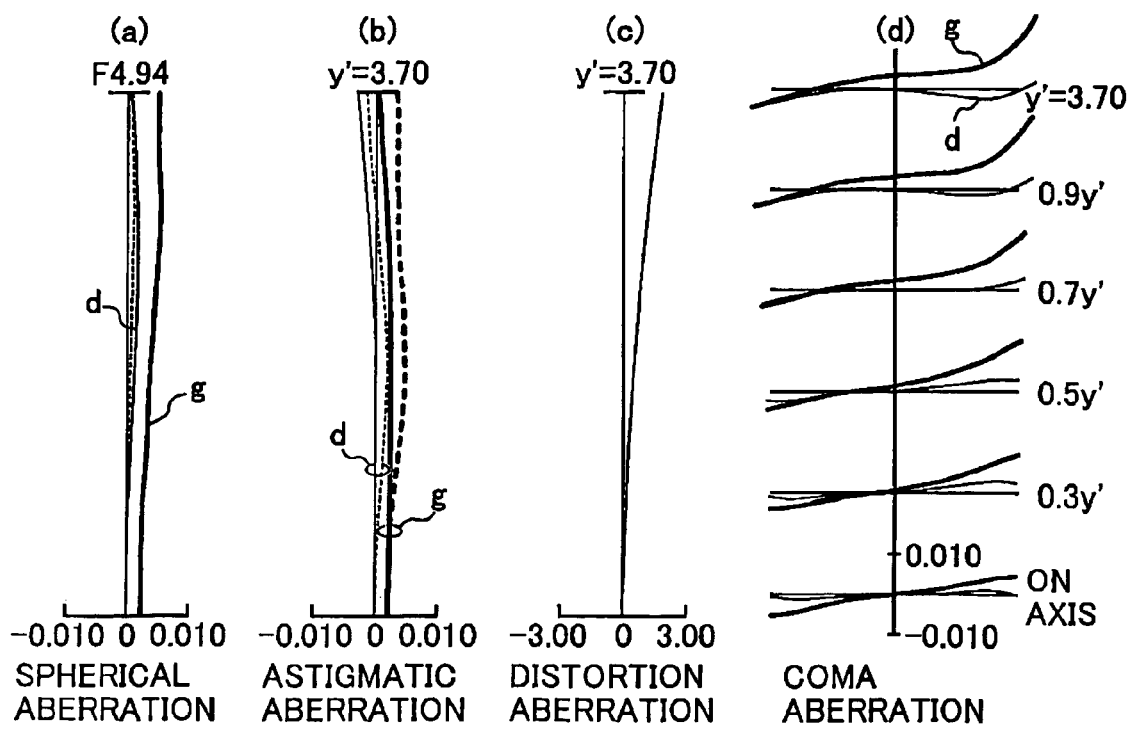

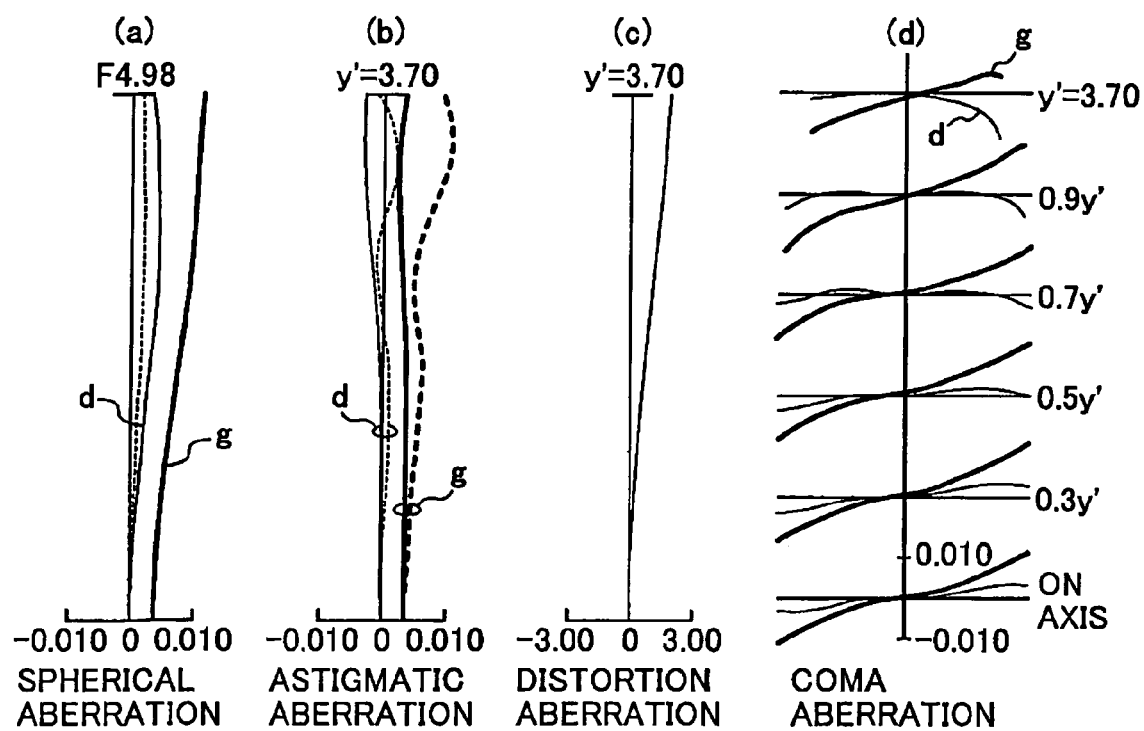

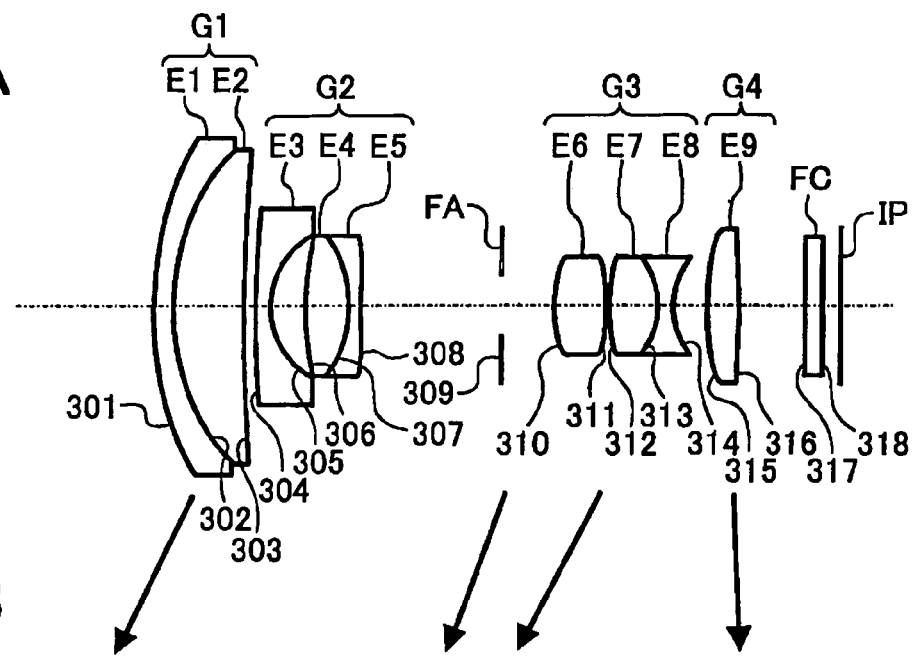
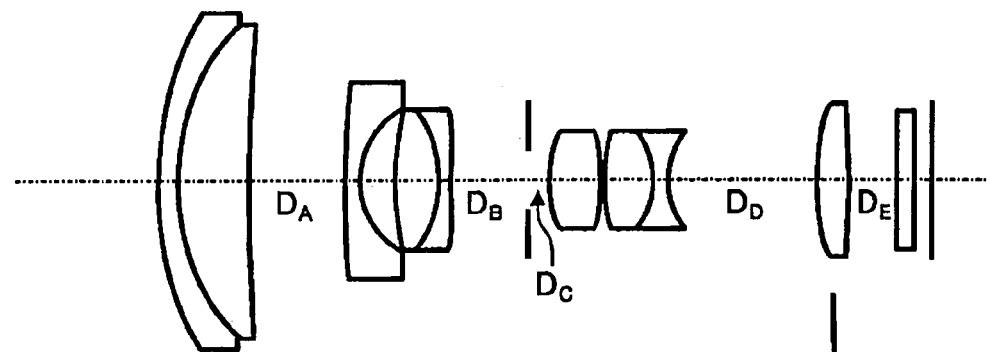
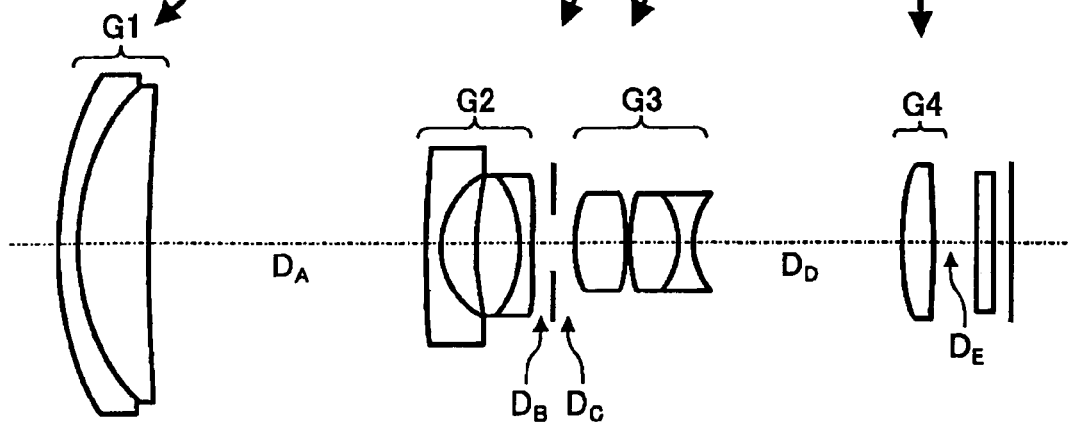
FIG. 3A
FIG. 3B
FIG. 3C

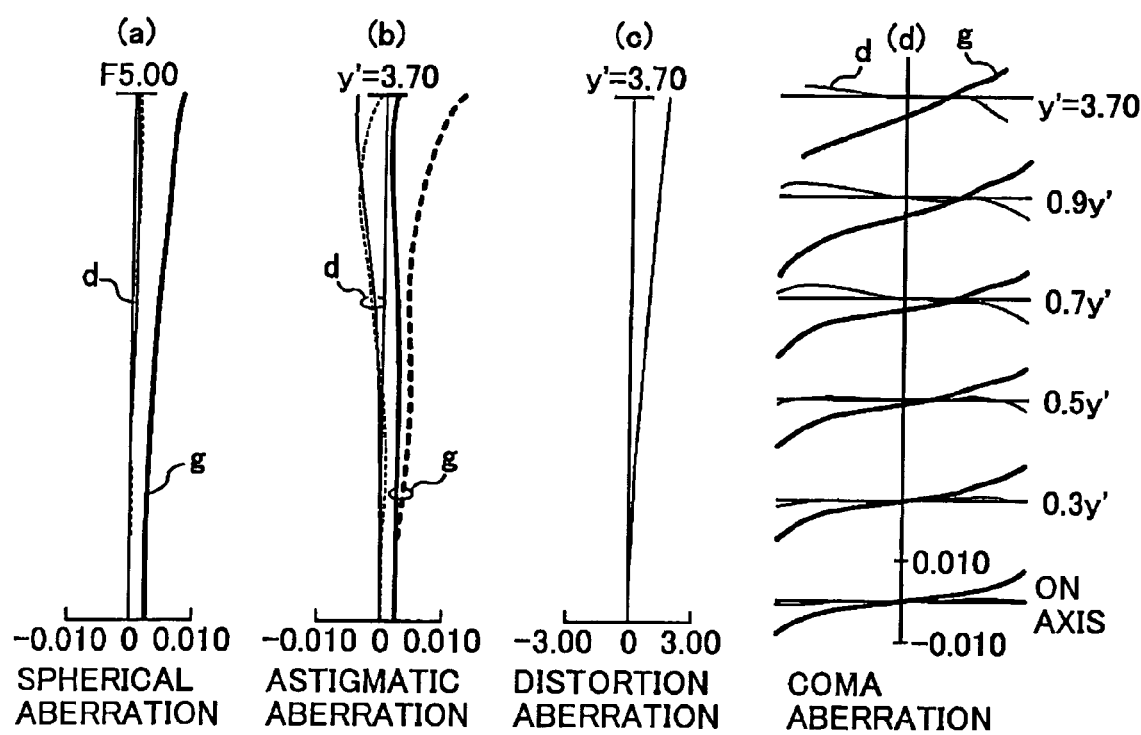

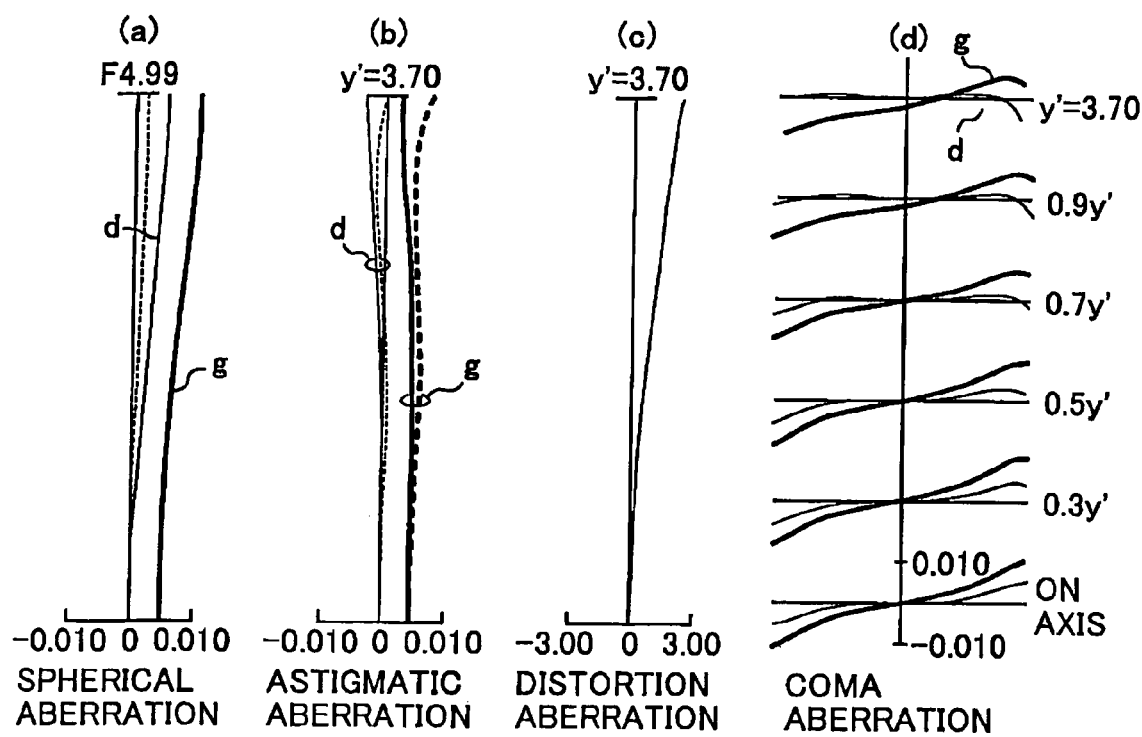

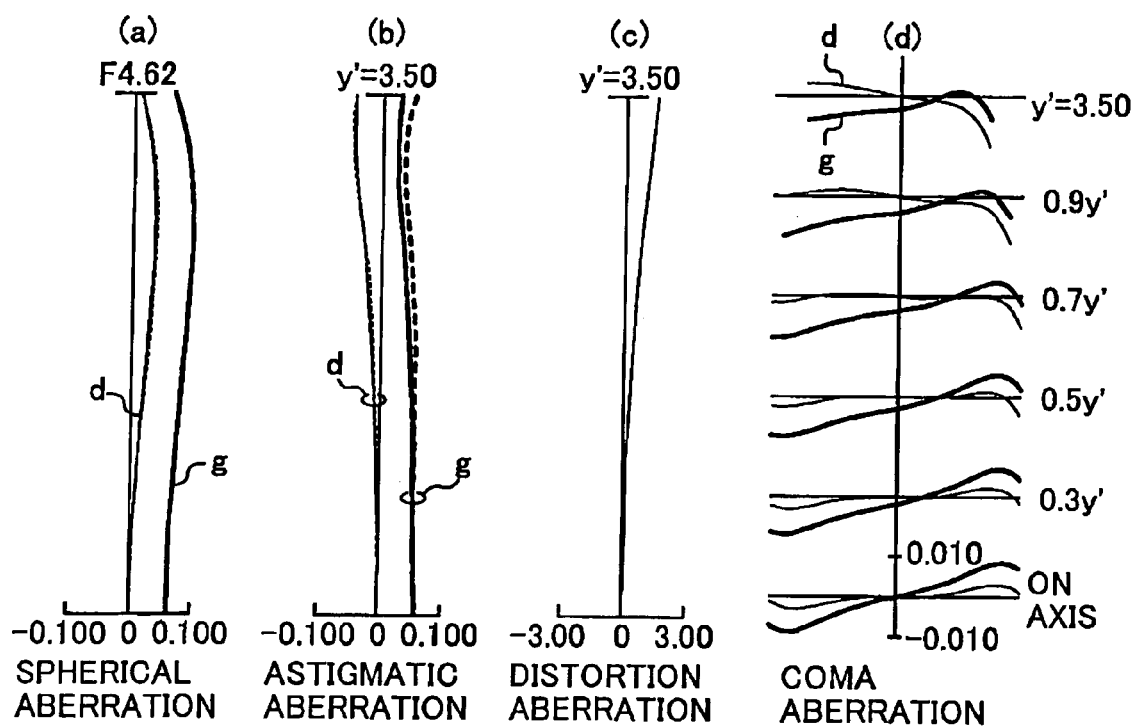

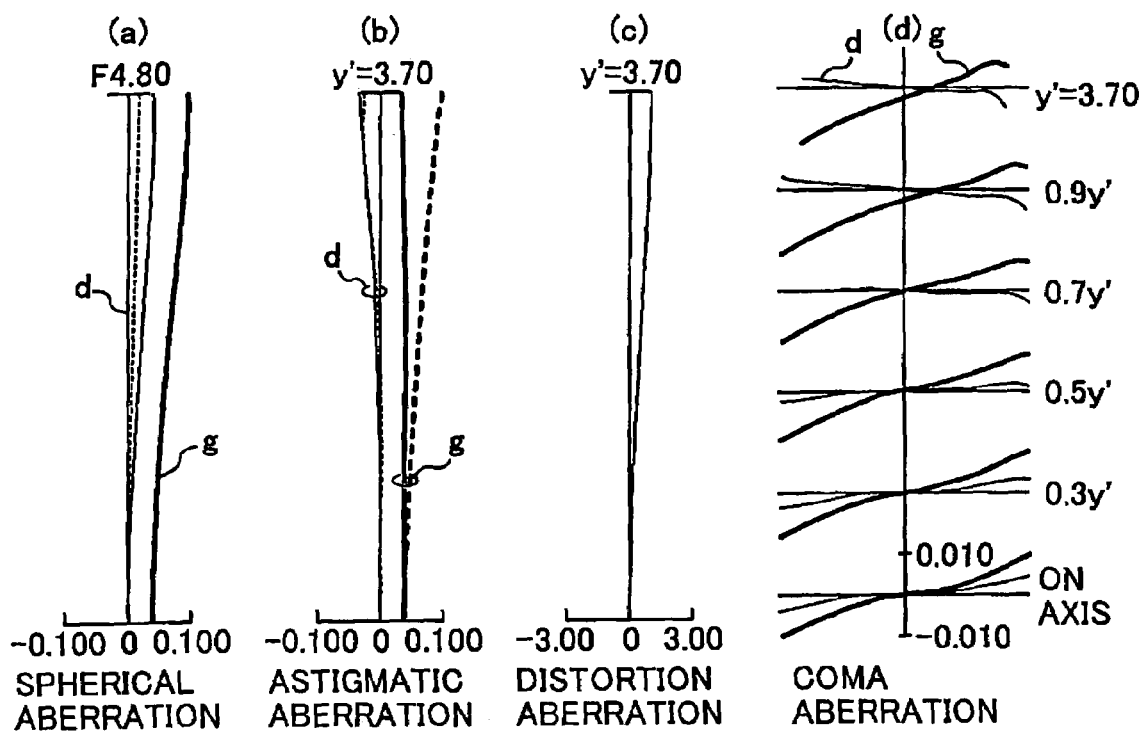

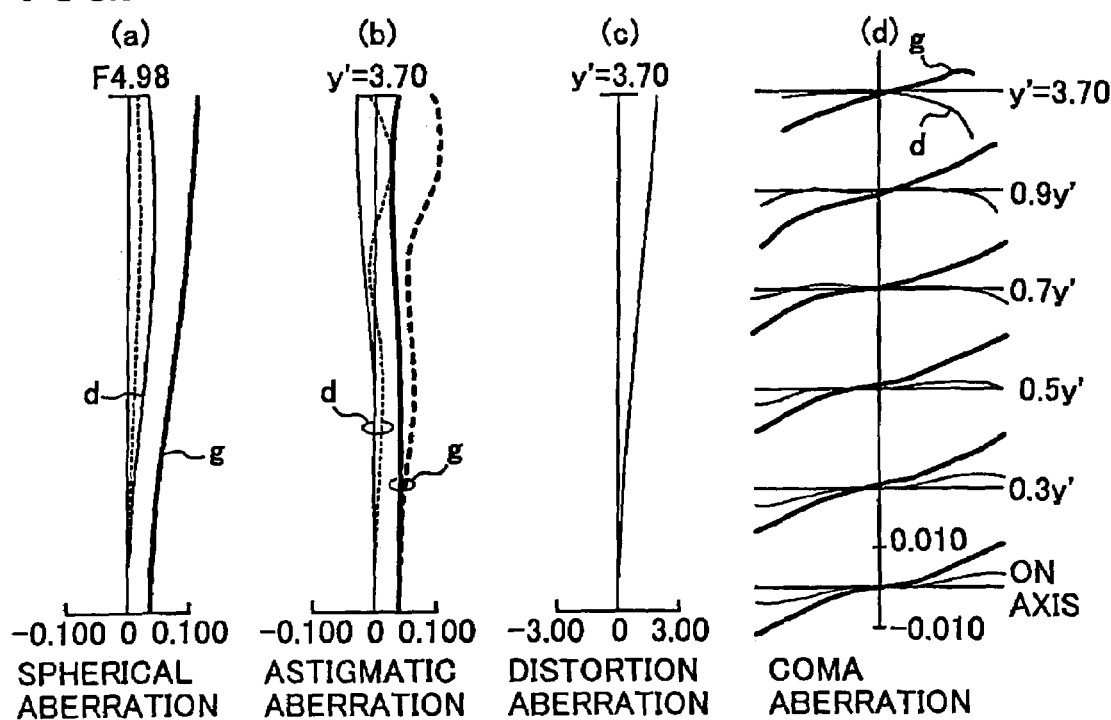

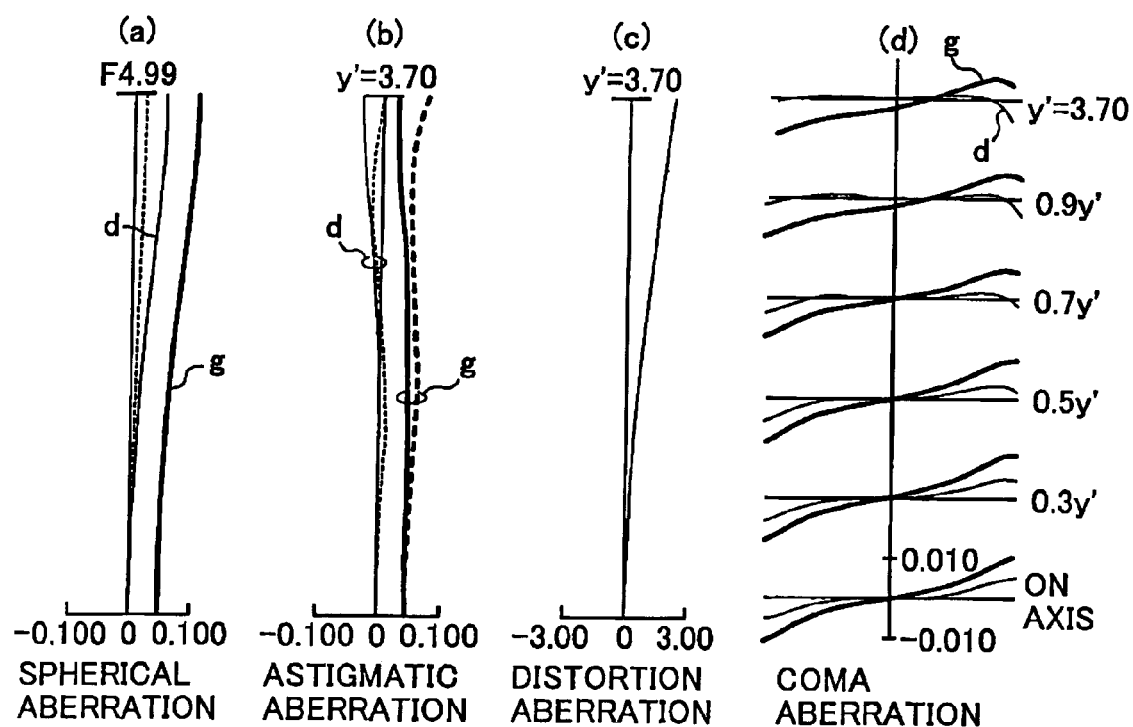

ZOOMING LENS SYSTEM AND DEVICE USING THE ZOOMING LENS SYSTEM

BACKGROUND OF THE INVENTION

1. Field of the Invention

The present invention relates to a compact zooming lens system and a digital still camera using the compact zooming lens system, and more particularly to a compact zooming lens system and a digital still camera using the compact zooming lens system having a wide half angle of view and a high resolution.

2. Description of the Related Art

In recent years, digital still cameras or electronic cameras have rapidly come into widespread use in place of conventional cameras using silver film. A typical digital still camera shoots a subject with a solid image pickup device such as an image pickup device including a CCD (charge-coupled device), for example, and obtains image data including a still image and/or a motion image. The obtained image data is recorded in a digital fashion in a non-volatile memory or the like (e.g., a flash memory) provided to the digital still camera.

The market of digital still cameras is huge and, accordingly, user needs for such digital still cameras continue to expand in various directions. In particular, high image quality and downsizing (i.e., reduction in camera size) are constantly required and share a relatively large part of the user needs. A zooming lens system used as an image pickup lens system is also needed to satisfy the needs for both performance enhancement and for downsizing.

Regarding downsizing, a total lens length, which is a distance from a plane of a lens closest to the subject to an image plane, needs to be reduced. Further, regarding performance enhancement, an ultra fine resolution is required through an entire zooming range to cover at least three- to six-million elements of the image pickup device.

In addition, many users demand wide-angle lenses having wider angles of view, and thus a half view angle at a short focal length limit in a zooming lens should preferably be greater than 38 degrees. A half view angle of 38 degrees corresponds to a focal length of 28 mm in a 35-mm silver-film camera. Further, higher scaling factor of a zooming lens is required. A zooming lens having a focal length from about 35-mm to 135-mm in a silver-film is enough for ordinary purposes. Such a zooming lens has a scaling factor of about 4.8. Therefore, a zooming lens in a digital still camera should have a scaling factor at least as high as 4.8.

There are many kinds of zooming lens systems available for digital still cameras. Among these is a zooming lens system which is suitable for a compact digital still camera system that includes, arranged sequentially from a subject side, a first optical lens group having a negative focal length, a second optical lens group having a positive focal length, and a third optical lens group having a positive focal length. This zooming lens system further includes an aperture diaphragm which is mounted to the subject side of the second optical lens group in a manner such that the aperture diaphragm and the second optical lens group are integrally movable. Further, when the scaling of the zooming lens system is changed, for example, from the short focal length limit to the long focal length limit, the second optical lens group moves away from the image side to the subject side and, at the same time, the first optical lens group moves in such a way that a displacement of the image plane caused by the scaling change is corrected. The above-described zooming lens system is described in Japanese Laid-Open Patent Application Publication Nos. 10-39214 and 10-104518, and in U.S. Pat. No. 6,498,687. However, such a zooming lens system is not suitable for a high scaling factor more than 4.0.

SUMMARY OF THE INVENTION

In view of the foregoing, it is an object of the present invention to provide a novel zooming lens apparatus which has a compact size, provides a relatively wider half angle of view over 38 degrees, and provides a reasonably fine resolution for a pickup device of a 3- to 5-million pixel range. The present invention also provides a mobile information device using such a zooming lens system.

In accordance with an exemplary aspect of the present invention, a zooming lens apparatus is provided. The zooming lens includes a first optical lens group having a positive refractive power, a second optical lens group having a negative refractive power, and an aperture diaphragm. The second optical lens group is arranged between the first optical lens group and the aperture diaphragm. The zooming lens apparatus further includes a third optical lens group having a positive refractive power, the aperture diaphragm being arranged between the second optical lens group and the third optical lens group. Also included is a fourth optical lens group having a positive refractive power, the third optical lens group being arranged between the aperture diaphragm and the fourth optical lens group. The zooming lens apparatus includes a frame assembly that is configured to support the first optical lens group, the second optical lens group, the third optical lens group, the fourth optical lens group, and the aperture diaphragm. The frame assembly is configured to move the first optical lens group and the third optical lens group in a first direction, and to move the fourth optical lens group in a second direction opposite to the first direction, when a scaling of the zooming lens apparatus is changed from a wide-angle limit to a telescopic limit. The zooming lens apparatus satisfies an inequality condition $0.60 < m_{4T} < 0.85$, where $m_{4T}$ represents an imaging magnification of the fourth optical lens group at the telescopic limit.

In addition to the novel zooming lens system as described, aspects of the present invention can be implemented in many other specific forms, including in a process or a computer program, as will be apparent to those skilled in the relevant art or arts, without departing from the spirit or scope of the invention.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 2A–2C are graphs of aberration curves corresponding to a spherical aberration, an astigmatic aberration, a distortion aberration, and a coma aberration measured at a short focal length limit (FIG. 2A), at a middle focal length (FIG. 2B), and at a long focal length limit (FIG. 2C) of the zooming lens apparatus of FIGS. 1A–1C;

FIGS. 3A–3C are schematic diagrams of a zooming lens apparatus according to a second embodiment of the present invention, at a short focal length limit (FIG. 3A), at a middle focal length (FIG. 3B), and at a long focal length limit (FIG. 3C);

FIGS. 4A–4C are graphs of aberration curves corresponding to a spherical aberration, an astigmatic aberration, a distortion aberration, and a coma aberration measured at a short focal length limit (FIG. 4A), at a middle focal length (FIG. 4B), and at a long focal length limit (FIG. 4C) of the zooming lens apparatus of FIGS. 3A–3C;

FIGS. 8A–8C are graphs of aberration curves corresponding to a spherical aberration, an astigmatic aberration, a distortion aberration, and a coma aberration measured at a short focal length limit (FIG. 8A), at a middle focal length (FIG. 8B), and at a long focal length limit (FIG. 8C) of the zoom lens apparatus of FIGS. 7A–7C;

FIGS. 10A–10C are graphs of aberration curves corresponding to a spherical aberration, an astigmatic aberration, a distortion aberration, and a coma aberration measured at a short focal length limit (FIG. 10A), at a middle focal length (FIG. 10B), and at a long focal length limit (FIG. 10C) of the zoom lens apparatus of FIGS. 9A–9C;

FIGS. 12A–12C are graphs of aberration curves corresponding to a spherical aberration, an astigmatic aberration, a distortion aberration, and a coma aberration measured at a short focal length limit (FIG. 12A), at a middle focal length (FIG. 12B), and at a long focal length limit (FIG. 12C) of the zoom lens apparatus of FIGS. 11A–11C;

FIGS. 14A–14C are graphs of aberration curves corresponding to a spherical aberration, an astigmatic aberration, a distortion aberration, and a coma aberration measured at a short focal length limit (FIG. 14A), at a middle focal length (FIG. 14B), and at a long focal length limit (FIG. 14C) of the zoom lens apparatus of FIGS. 13A–13C;

FIGS. 16A–16C are graphs of aberration curves corresponding to a spherical aberration, an astigmatic aberration, a distortion aberration, and a coma aberration measured at a short focal length limit (FIG. 16A), at a middle focal length (FIG. 16B), and at a long focal length limit (FIG. 16C) of the zoom lens apparatus of FIGS. 15A–15C;

DETAILED DESCRIPTION OF THE PREFERRED EMBODIMENTS

Figure 1A:
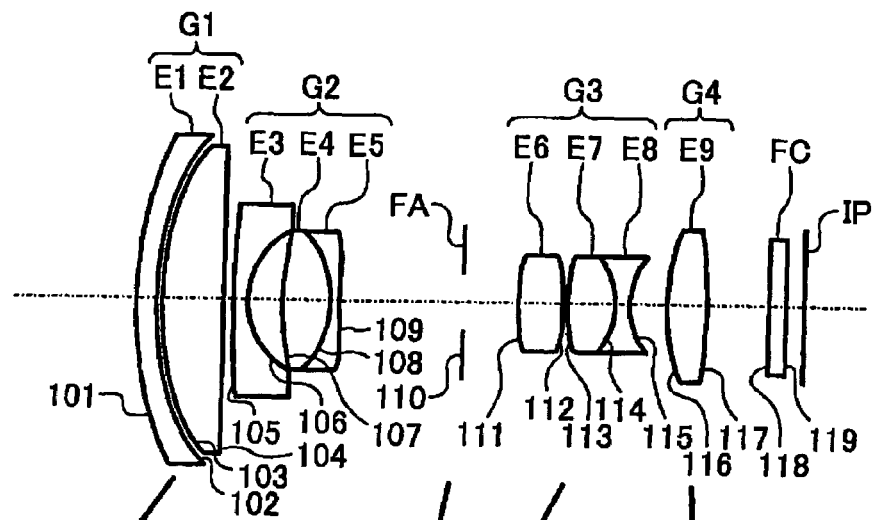
FIGS. 1A–1C are schematic diagrams of a zooming lens apparatus according to a first embodiment of the present invention, at a short focal length limit (FIG. 1A), at a middle focal length (FIG. 1B), and at a long focal length limit (FIG. 1C)

In describing preferred embodiments illustrated in the drawings, specific terminology is employed for the sake of clarity. However, the disclosure of this patent specification is not intended to be limited to the specific terminology selected and it is to be understood that each specific element includes all equivalents that operate in a similar manner.

In embodiments described below, an optical filter/cover includes an optical filter, such as an optical low-pass filter, an infrared-cut filter or the like, or cover glass of an image capturing device. The described lenses are made of optical glass or, alternatively, of optical plastic or the like. An aspheric lens can be made by molding its surface as an aspheric surface, or by attaching a plastic film to form an aspheric surface, i.e., a hybrid type aspheric lens. A maximum image height is 3.70 mm unless otherwise noted. The opening size of an aperture plate can be constant for purposes of simplification, or can be expandable when a scaling of the zooming lens system is changed from a wide-angle limit to a telescopic limit. The term "wide-angle limit" refers to a condition in which a zooming lens apparatus is fully retracted (allowing the widest viewing angle), while the term "telescopic limit" refers to a condition in which a zooming lens apparatus is fully extended (allowing the narrowest viewing angle).

In the description below, various characters are used with the following definitions:

f is a focal length of the zooming lens system;
F is an F-stop number;
ω is a half angle of view;
R is a radius of curvature;
D is a distance between surfaces;
$N_d$ is a refractive index;
$v_d$ is an Abbe number;
K is a conic constant of an aspheric surface;
$A_4$ is a fourth-order coefficient of an aspheric surface;
$A_6$ is a sixth-order coefficient of an aspheric surface;
$A_8$ is an eighth-order coefficient of an aspheric surface; and
$A_{10}$ is a tenth-order coefficient of an aspheric surface.

When an inverse of a paraxial curvature radius (i.e., a paraxial curvature) is C and a height from a light ray is H, an aspheric surface X is represented by a following equation.

$$X = CH^2/[1+\{1+(1+K)C^2H^2\}^{1/2}] + A_4H^4 + A_6H^6 + A_8H^8 + A_{10}H^{10}.$$

Figure 1B:
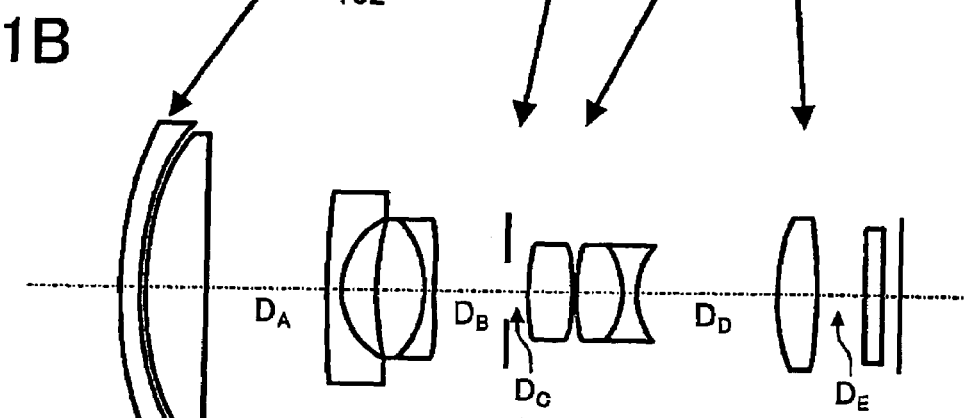
Figure 1C:
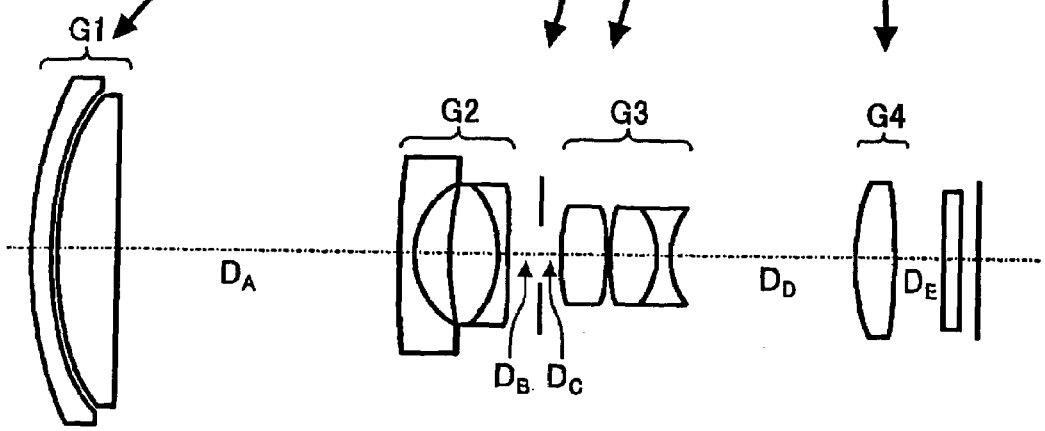

FIGS. 1A–1C show a first embodiment of a zooming lens system at a short focal length limit (i.e., a wide-angle limit), at a middle focal length, and at a long focal length limit (i.e. a telescopic limit), respectively. According to this embodiment of the present invention, the zooming lens system includes various optical elements including a first lens E1, a second lens E2, a third lens E3, a fourth lens E4, a fifth lens E5, a sixth lens E6, a seventh lens E7, an eighth lens E8, a ninth lens E9 that is made of optical plastic, an aperture plate FA, and an optical filter/cover FC. The first lens E1 and the second lens E2 form a first optical lens group G1. The third lens E3, the fourth lens E4, and the fifth lens E5 form a second optical lens group G2. The sixth lens E6, the seventh lens E7, and the eighth lens E8 form a third optical lens group G3. The ninth lens E9 forms a fourth optical lens group G4. The lenses included in each of the first, second, third and fourth optical lens groups G1–G4 are supported by a common supporting frame (e.g., frame assembly 18 in FIGS. 17A and 17B) or the like and are integrally moved during a zooming operation of the zooming lens system. To illustrate the zooming operation, FIGS. 1A–1C schematically shows with arrows the travel paths of the first, second, third and fourth optical lens groups G1–G4 from a limit of a short focal length (i.e., a wide-angle limit) to a limit of a long focal length (i.e., a telescopic limit) via a medium focal length.

In addition, FIGS. 1A–1C also shows optical surfaces of the above-mentioned optical elements. The first lens E1 includes an optical surface 101 on one side facing a subject positioned left of the zooming lens system, and an optical surface 102 on the other side. The second lens E2 has an optical surface 103 on one side facing the subject and an optical surface 104 on the other side. The third lens E3 has an optical surface 105 on one side facing the subject and an optical surface 106 on the other side. The fourth lens E4 has an optical surface 107 on one side facing the subject and an optical surface 108 on the other side. The fifth lens E5 has an optical surface which is conjoined with the optical surface 108, on one side facing the subject, and an optical surface 109 on the other side. The aperture plate FA has an optical surface 110 on one side facing the subject. The sixth lens E6 has an optical surface 111 on one side facing the subject, and an optical surface 112 on the other side. The seventh lens E7 has an optical surface 113 on one side facing the subject and an optical surface 114 on the other side. The eighth lens E8 has an optical surface which is conjoined with the optical surface 114, on one side facing the subject and an optical surface 115 on the other side. The ninth lens E9 has an optical surface 116 on one side facing the subject and an optical surface 117 on the other side. The optical filter/cover FC has an optical surface 118 on one side facing the subject and an optical surface 119 on the other side.

In the zooming lens system of FIGS. 1A–1C, the optical elements are arranged in order of increasing distance to a subject as follows: the first lens E1, the second lens E2, the third lens E3, the fourth lens E4, the fifth lens E5, the aperture plate FA, the sixth lens E6, the seventh lens E7, the eighth lens E8, the ninth lens E9 and the optical filter/cover FC. Through these optical elements, an image of the subject is formed at an image plane IP behind the optical filter/cover FC.

The first lens E1 is a negative meniscus lens having a convex surface (i.e., the optical surface 101) on one side facing the subject. The second lens E2 is a positive meniscus lens having a convex surface (i.e., the optical surface 103) on one side facing the subject. The first optical lens group G1 including the first and second lenses E1–E2 has a positive focal length as a whole.

The third lens E3 is a negative meniscus lens having an aspheric convex surface (i.e., the optical surface 105) on one side facing the subject and a deep concave surface (i.e., the optical surface 106) on the other side. The fourth lens E4 is a positive lens having a convex surface (i.e., the optical surface 107) on one side facing the subject and a high convex surface (i.e., the optical surface 108) on the other side. The fifth lens E5 is a negative lens having a deep concave surface (i.e., the optical surface 108) on one side facing the subject and an aspheric surface (i.e., the optical surface 109) on the other side. The fourth lens E4 and fifth lens E5 are jointed closely and form a cemented lens. The second optical lens group G2 including the fourth and fifth lenses E4–E5 has a negative focal length as a whole.

The sixth lens E6 is a positive lens having aspheric convex surfaces (i.e., the optical surfaces 111 and 112) on both sides. The seventh lens E7 is a positive lens having a convex surface (i.e., the optical surface 113) on one side facing the subject and a high convex surface (i.e., the optical surface 114) on the other side. The eighth lens E8 is a negative lens having concave surfaces (i.e., the optical surface 114 and 115) on both sides. The third optical lens group G3 including the sixth, seventh and eighth lenses E6–E8 has a positive focal length as a whole.

The ninth lens E9 is a positive lens having an aspheric high convex surface (i.e., the optical surface 116) on one side facing the subject and a convex surface (i.e., the optical surface 117). The fourth optical lens group G4 including the fourth lens E9 has a positive focal length.

In a scaling change from a short focal length limit to a long focal length limit, the distances between each optical lens group vary. A distance $D_A$ between the optical surface 104 and the optical surface 105 increases during a scaling change from a short focal length limit to a long focal length limit. In contrast, a distance $D_B$ between the optical surface 109 and the surface 110 of the aperture plate FA decreases during the same scaling change. A distance $D_C$ between the surface 110 of the aperture plate FA and the optical surface 111 also decreases. A distance $D_D$ between the optical surface 115 and the optical surface 116 increases during the scaling change. A distance DE between the optical surface 117 and the surface 118 of the optical filter/cover FC is smaller at a long focal length limit than at a short focal length limit. In other words, in a scaling change from a short focal length limit to a long focal length limit, each of the first optical lens group G1, the aperture plate and the third optical lens group G3 moves toward the subject, while the second optical lens group G2 and the optical filter/cover FC are fixed. The fourth optical lens group G4 is positioned closer to the image plane IP at long focal length limit than at a short focal length limit.

According to the first embodiment of the present invention, the focal length f of the entire system, the F-stop number F, and the half view angle ω are variable by zooming. The focal length f varies in a range from 4.74 to 21.59, the F-stop number F in a range from 3.32 to 4.98, and the half view angle ω in a range from 39.14 to 9.55. Optical characteristics of the above-mentioned optical surfaces 101–119 of the optical elements are as shown below in Table 1.

TABLE 1

| No. | R | D | $N_d$ | $v_d$ | Element |
|---|---|---|---|---|---|
| 101 | 23.330 | 1.00 | 1.84666 | 23.80 | 1st lens, 1st group |
| 102 | 15.002 | 0.26 | | | |
| 103 | 15.442 | 3.47 | 1.77250 | 49.60 | 2nd lens, 1st group |
| 104 | 135.649 | $D_A$ | | | |
| 105* | 91.446 | 0.84 | 1.83481 | 42.70 | 3rd lens, 2nd group |

TABLE 1-continued

| No. | R | D | $N_d$ | $v_d$ | Element |
|---|---|---|---|---|---|
| 106 | 4.439 | 1.77 | | | |
| 107 | 15.704 | 2.67 | 1.74077 | 27.80 | 4th lens, 2nd group |
| 108 | −6.205 | 0.74 | 1.83481 | 42.70 | 5th lens, 2nd group |
| 109* | 632.018 | $D_B$ | | | |
| 110 | aperture | $D_C$ | | | |
| 111* | 8.333 | 2.78 | 1.58913 | 61.15 | 6th lens, 3rd group |
| 112* | −8.607 | 0.10 | | | |
| 113 | 15.588 | 2.42 | 1.83481 | 42.70 | 7th lens, 3rd group |
| 114 | −4.691 | 0.80 | 1.69895 | 30.10 | 8th lens, 3rd group |
| 115 | 4.498 | $D_D$ | | | |
| 116* | 12.500 | 2.21 | 1.54340 | 56.00 | 9th lens, 4th group |
| 117 | −34.711 | $D_E$ | | | |
| 118 | ∞ | 0.90 | 1.51680 | 64.20 | filter/cover |
| 119 | ∞ | | | | |

In Table 1, numbers in the column "No." represent the numbers of the optical surfaces. The surfaces 105, 109, 111, 112, and 116 indicated with an asterisk mark (*) are aspheric, and their parameters are as indicated below in Table 1A

TABLE 1A

<the optical aspheric surface 105>

K = 0.0,
$A_4 = 2.42400 \times 10^{-4}$,
$A_6 = -2.92208 \times 10^{-6}$,
$A_8 = 9.40210 \times 10^{-9}$,
$A_{10} = -4.16456 \times 10^{-11}$
<the optical aspheric surface 109>

K = 0.0,
$A_4 = -5.16761 \times 10^{-4}$,
$A_6 = 1.81605 \times 10^{-6}$,
$A_8 = -1.01642 \times 10^{-6}$,
$A_{10} = -1.75699 \times 10^{-8}$
<the optical aspheric surface 111>

K = 0.0,
$A_4 = -1.08496 \times 10^{-3}$,
$A_6 = -2.17192 \times 10^{-5}$,
$A_8 = 5.79037 \times 10^{-6}$,
$A_{10} = -5.25493 \times 10^{-7}$
<the optical aspheric surface 112>

K = 0.0,
$A_4 = 4.85474 \times 10^{-4}$,
$A_6 = -4.49460 \times 10^{-5}$,
$A_8 = 8.98429 \times 10^{-6}$,
$A_{10} = -5.68154 \times 10^{-7}$
<the optical aspheric surface 116>

K = 0.0,
$A_4 = -5.46424 \times 10^{-5}$,
$A_6 = 1.80637 \times 10^{-5}$,
$A_8 = -9.17793 \times 10^{-7}$,
$A_{10} = 2.09899 \times 10^{-8}$ In Table 1, $D_A$ represents a distance of the first optical lens group G1 and the second optical lens group G2. Likewise, $D_B$ represents a distance between the second optical lens group G2 and the aperture plate FA. $D_C$ represents a distance between the aperture plate FA and the third optical lens group G3, and $D_D$ represents a distance between the third optical lens group G3 and the fourth optical lens group G4. $D_E$ is a distance between the fourth optical lens group G4 and the optical filter FC. These distances $D_A$, $D_B$, $D_C$, $D_D$ and $D_E$ are variable by zooming, as indicated below in Table 2.

TABLE 2

| | $f_S = 4.740$ | $f_M = 10.131$ | $f_L = 21.591$ |
|---|---|---|---|
| $D_A$ | 0.600 | 6.655 | 15.680 |
| $D_B$ | 7.051 | 4.217 | 1.200 |
| $D_C$ | 3.043 | 1.054 | 1.000 |
| $D_D$ | 2.000 | 7.725 | 10.995 |
| $D_E$ | 3.484 | 2.583 | 2.382 |

In Table 2, $f_S$ is a short focal length limit, $f_M$ is a medium focal length limit, and $f_L$ is a long focal length limit.

In addition, the optical elements of the zooming lens system satisfy the following equations;

$m_{4T} = 0.718$, $m_{4T}/m_{4W} = 1.098$, $X_1/f_T = 0.698$, $X_3/f_T = 0.366$, $|f_2|/f_3 = 0.792$, and $f_1/f_W = 8.44$.

The constant $m_{4T}$ represents an imaging magnification of the fourth optical lens group G4 at a telescopic limit, $m_{4W}$ represents a imaging magnification of the optical lens group G4 at a wide-angle limit, $X_1$ represents a total traveling distance of the first optical lens group G1 in zooming from a wide-angle limit to a telescopic limit, $f_T$ represents a focal length of the whole optical system at a telescopic limit, $X_3$ represents a total traveling distance of the third optical lens group G3 in zooming from a wide-angle limit to a telescopic limit, $f_1$ represents a focal length of the first optical lens group G1, $f_2$ represents a focal length of the second optical lens group G2, $f_3$ represents a focal length of the third optical lens group G3, and $f_W$ represents a focal length of the whole optical system at a wide-angle limit.

FIG. 2A show graphs of aberration curves that correspond to a spherical aberration (a), an astigmatic aberration (b), a distortion aberration (c), and a coma aberration (d), measured at the short focal length limit of the zooming lens system of FIG. 1A. Likewise, FIG. 2B shows these aberration curves at a medium focal length of FIG. 1B, and FIG. 2C shows the aberration curves at the long focal length limit of the zooming lens system of FIG. 1C. In each spherical aberration graph (a) of FIGS. 2A–2C, a thin solid line indicated by a letter "d" represents a spherical aberration curve of a d-line, a thick solid line indicated by a letter "g" represents a spherical aberration curve of a g-line, and a thin chain line represents a sine condition. In each astigmatic aberration graph (b) of FIGS. 2A–2C, a thin solid line indicated by the letter "d" represents an astigmatic aberration curve of the d-line and a thin dotted line indicated by the letter "g" represents an astigmatic aberration of a sagittal ray. Further, each graph (c) of FIGS. 2A–2C represents a distortion aberration. In each coma aberration graph (d) of FIGS. 2A–2C, a thin solid line indicated by the letter "d" represents a coma aberration curve of the d-line and a thick solid line indicated by the letter "g" represents a coma aberration curve of the g-line. Horizontal axes of the graphs (a)–(c) in FIGS. 2A–2C represent a relative value V of aberrations. Vertical axes of the graphs (a) in FIGS. 2A–2C and horizontal axes of the graphs (d) in FIGS. 2A–2C represent a ratio of a pupil height (i.e., the F-stop number). Vertical axes of the graphs (b)–(c) in FIGS. 2A–2C represent a ratio of image heights.

FIGS. 3A–3C show a second embodiment of a zooming lens system at a short focal length limit at a middle focal length, and at a long focal length limit, respectively. According to this embodiment, the zooming lens system includes various optical elements including a first lens E1, a second lens E2, a third lens E3, a fourth lens E4, a fifth lens E5, a sixth lens E6, a seventh lens E7, an eighth lens E8, a ninth lens E9, an aperture plate FA, and an optical filter/cover FC. The first lens E1 and the second lens E2 form a first optical lens group G1. The third lens E3, the fourth lens E4, and the fifth lens E5 form a second optical lens group G2. The sixth lens E6, the seventh lens E7, and the eighth lens E8 form a third optical lens group G3. The ninth lens E9 forms a fourth optical lens group G4. The lenses included in each of the first, second, third and fourth optical lens groups G1–G4 are supported by a common supporting frame or the like and are integrally moved during a zooming operation of the zooming lens system. To illustrate the zooming operation, FIGS. 3A–3C schematically shows with arrows the travel paths of the first, second, third and fourth optical lens groups G1–G4 from a limit of a short focal length (i.e., a wide-angle limit) to a limit of a long focal length (i.e., a telescopic limit) via a medium focal length.

In addition, FIGS. 3A–3C also shows optical surfaces of the above-mentioned optical elements. That is, the first lens E1 has an optical surface 301 on one side facing a subject, and an optical surface 302 on the other side. The second lens E2 has an optical surface which is conjoined with the optical surface 302 and an optical surface 303 on the other side. The third lens E3 has an optical surface 304 on one side facing the subject and an optical surface 305 on the other side. The fourth lens E4 has an optical surface 306 on one side facing the subject and an optical surface 307 on the other side. The fifth lens E5 has an optical surface which is conjoined with the optical surface 307, on one side facing the subject, and an optical surface 308 on the other side. The aperture plate FA has an optical surface 309 on one side facing the subject. The sixth lens E6 has an optical surface 310 on one side facing the subject, and an optical surface 311 on the other side. The seventh lens E7 has an optical surface 312 on one side facing the subject and an optical surface 313 on the other side. The eighth lens E8 has an optical surface which is conjoined with the optical surface 313, on one side facing the subject and an optical surface 314 on the other side. The ninth lens E9 has an optical surface 315 on one side facing the subject and an optical surface 316 on the other side. The optical filter/cover FC has an optical surface 317 on one side facing the subject and an optical surface 318 on the other side.

The first lens E1 is a negative meniscus lens having a convex surface (i.e., the optical surface 301) on one side facing the subject. The second lens E2 is a positive meniscus lens having a convex surface (i.e., the optical surface 302) on one side facing the subject. The first lens E1 and the second lens E2 are jointed closely and form a cemented lens. The first optical lens group G1 including the first and second lenses E1–E2 has a positive focal length as a whole.

The third lens E3 is a negative meniscus lens having an aspheric convex surface (i.e., the optical surface 304) on one side facing the subject and a deep concave surface (i.e., the optical surface 305) on the other side. The fourth lens E4 is a positive lens having a convex surface (i.e., the optical surface 306) on one side facing the subject and a high convex surface (i.e., the optical surface 307) on the other side. The fifth lens E5 is a negative lens having a deep concave surface (i.e., the optical surface 307) on one side facing the subject and an aspheric surface (i.e., the optical surface 308) on the other side. The fourth lens E4 and fifth lens E5 are jointed closely and form a cemented lens. The second optical lens group G2 including the fourth and fifth lenses E4–E5 has a negative focal length as a whole.

The sixth lens E6 is a positive lens having aspheric convex surfaces (i.e., the optical surfaces 310 and 311) on both sides. The seventh lens E7 is a positive lens having a convex surface (i.e., the optical surface 312) on one side facing the subject and a high convex surface (i.e., the optical surface 313) on the other side. The eighth lens E8 is a negative lens having concave surfaces (i.e., the optical surface 313 and 314) on both sides. The seventh lens E7 and eighth lens E8 are jointed closely and form a cemented lens. The third optical lens group G3 including the sixth, seventh and eighth lenses E6–E8 has a positive focal length as a whole.

The ninth lens E9 is a positive lens having an aspheric high convex surface (i.e., the optical surface 315) on one side facing the subject and a convex surface (i.e., the optical surface 316). The fourth optical lens group G4 including the fourth lens E9 has a positive focal length.

In a scaling change from a short focal length limit to a long focal length limit, distances between each optical lens group vary. A distance $D_A$ between the optical surface 303 and the optical surface 304 increases during a scaling change from a short focal length limit to a long focal length limit. A distance $D_B$ between the optical surface 308 and the surface 309 of the aperture plate decreases during the same scaling change. A distance $D_C$ between the surface 309 of the aperture plate FA and the optical surface 310 also decreases. A distance $D_D$ between the optical surface 314 and the optical surface 315 increases during the scaling change. A distance $D_E$ between the optical surface 316 and the surface 317 of the optical filter/cover FC is smaller at a long focal length limit than at a short focal length limit. In other words, in a scaling change from a short focal length limit to a long focal length limit, the first optical lens group G1, the aperture plate FA, and the third optical lens group G3 move toward the subject, while the second optical lens group G2 and the optical filter/cover FC are fixed. The fourth optical lens group G4 is positioned closer to the image plane IP at long focal length limit than at a short focal length limit.

According to the second embodiment of the present invention, the focal length f of the entire system, the F-stop number F, and the half view angle ω are variable by zooming. The focal length f varies in a range from 4.74 to 21.57, the F-stop number F in a range from 3.56 to 5.00, and the half view angle ω in a range from 39.15 to 9.57. Optical characteristics of the above-mentioned optical surfaces 301–318 of the optical elements are as shown below in Table 3.

TABLE 3

| No. | R | D | $N_d$ | $v_d$ | Element |
|---|---|---|---|---|---|
| 301 | 20.085 | 0.91 | 1.92286 | 18.9 | 1st lens, 1st group |
| 302 | 12.792 | 4.11 | 1.72047 | 34.7 | 2nd lens, 1st group |
| 303 | 98.998 | $D_A$ | | | |
| 304* | 63.441 | 0.84 | 1.83481 | 42.7 | 3rd lens, 2nd group |
| 305 | 4.533 | 2.09 | | | |
| 306 | 18.494 | 2.45 | 1.76182 | 26.5 | 4th lens, 2nd group |
| 307 | −8.13 | 0.74 | 1.83481 | 42.7 | 5th lens, 2nd group |
| 308* | 165.705 | $D_B$ | | | |
| 309 | aperture | $D_C$ | | | |

TABLE 3-continued

| No. | R | D | $N_d$ | $v_d$ | Element |
|---|---|---|---|---|---|
| 310* | 8.333 | 2.85 | 1.58913 | 61.15 | 6th lens, 3rd group |
| 311* | −10.6 | 0.1 | | | |
| 312 | 13 | 2.42 | 1.83481 | 42.7 | 7th lens, 3rd group |
| 313 | −4.942 | 0.8 | 1.69895 | 30.1 | 8th lens, 3rd group |
| 314 | 4.527 | $D_D$ | | | |
| 315* | 12.5 | 1.86 | 1.58913 | 61.15 | 9th lens, 4th group |
| 316 | −46.232 | $D_E$ | | | |
| 317 | ∞ | 0.9 | 1.5168 | 64.2 | filter/cover |
| 318 | ∞ | | | | |

In Table 3, numbers in the column "No." represent the numbers of the optical surfaces. The surfaces 304, 308, 310, 311, and 315 indicated with an asterisk mark (*) are aspheric, and their parameters are as indicated below in Table 3A

TABLE 3A

<the optical aspheric surface 304>

K = 0.0,
$A_4$ = 1.98102 × 10$^{-4}$,
$A_6$ = −3.68668 × 10$^{-6}$,
$A_8$ = 4.52405 × 10$^{-8}$,
$A_{10}$ = −2.67683 × 10$^{-10}$

<the optical aspheric surface 308>

K = 0.0,
$A_4$ = −4.56912 × 10$^{-4}$,
$A_6$ = −2.43635 × 10$^{-6}$,
$A_8$ = −7.31048 × 10$^{-7}$,
$A_{10}$ = −1.13163 × 10$^{-8}$

<the optical aspheric surface 310>

K = 0.0,
$A_4$ = −7.28261 × 10$^{-4}$,
$A_6$ = 5.77887 × 10$^{-6}$,
$A_8$ = 1.03208 × 10$^{-6}$,
$A_{10}$ = −1.81386 × 10$^{-7}$

<the optical aspheric surface 311>

K = 0.0,
$A_4$ = 4.65357 × 10$^{-4}$,
$A_6$ = 1.34799 × 10$^{-5}$,
$A_8$ = −4.37956 × 10$^{-7}$,
$A_{10}$ = 6.85503 × 10-8

<the optical aspheric surface 315>

K = 0.0,
$A_4$ = −6.80550 × 10-5,
$A_6$ = 1.42409 × 10-5,
$A_8$ = −6.37766 × 10$^{-7}$,
$A_{10}$ = 1.29041 × 10$^{-8}$

In Table 3, $D_A$ represents a distance between the first optical lens group G1 and the second optical lens group G2. Likewise, $D_B$ represents a distance between the second optical lens group G2 and the aperture plate FA. $D_C$ represents a distance between the aperture plate FA and the third optical lens group G3, and $D_D$ represents a distance between the third optical lens group G3 and the fourth optical lens group G4, and $D_E$ is a distance between the fourth optical lens group G4 and the optical filter FC. These distances $D_A$, $D_B$, $D_C$, $D_D$ and $D_E$ are varied by zooming, as indicated below in Table 4.

TABLE 4

| | $f_S$ = 4.737 | $f_M$ = 10.117 | $f_L$ = 21.575 |
|---|---|---|---|
| $D_A$ | 0.600 | 5.225 | 15.097 |
| $D_B$ | 7.709 | 4.171 | 1.269 |

TABLE 4-continued

| | $f_S$ = 4.737 | $f_M$ = 10.117 | $f_L$ = 21.575 |
|---|---|---|---|
| $D_C$ | 3.108 | 1.200 | 1.000 |
| $D_D$ | 2.000 | 8.520 | 11.831 |
| $D_E$ | 3.652 | 2.578 | 2.368 |

In Table 4, $f_S$ is a short focal length limit, $f_M$ is a medium focal length limit, and $f_L$ is a long focal length limit.

In addition, the optical elements of the zooming lens system satisfy the following equations;

$m_{4T}$=0.722, $m_{4T}/m_{4W}$=1.117, $X_1/f_T$=0.672, $X_3/f_T$=0.396, $|f_2|/f_3$=0.799, and $f_1/f_W$=8.84.

The constant $m_{4T}$ represents an imaging magnification of the fourth optical lens group G4 at a telescopic limit, $m_{4W}$ represents a imaging magnification of the optical lens group G4 at a wide-angle limit, $X_1$ represents a total traveling distance of the first optical lens group G1 in zooming from a wide-angle limit to a telescopic limit, $f_T$ represents a focal length of the whole optical system at a telescopic limit, $X_3$ represents a total traveling distance of the third optical lens group G3 in zooming from a wide-angle limit to a telescopic limit, $f_1$ represents a focal length of the first optical lens group G1, $f_2$ represents a focal length of the second optical lens group G2, $f_3$ represents a focal length of the third optical lens group G3, and $f_W$ represents a focal length of the whole optical system at a wide-angle limit.

Figure 4A:
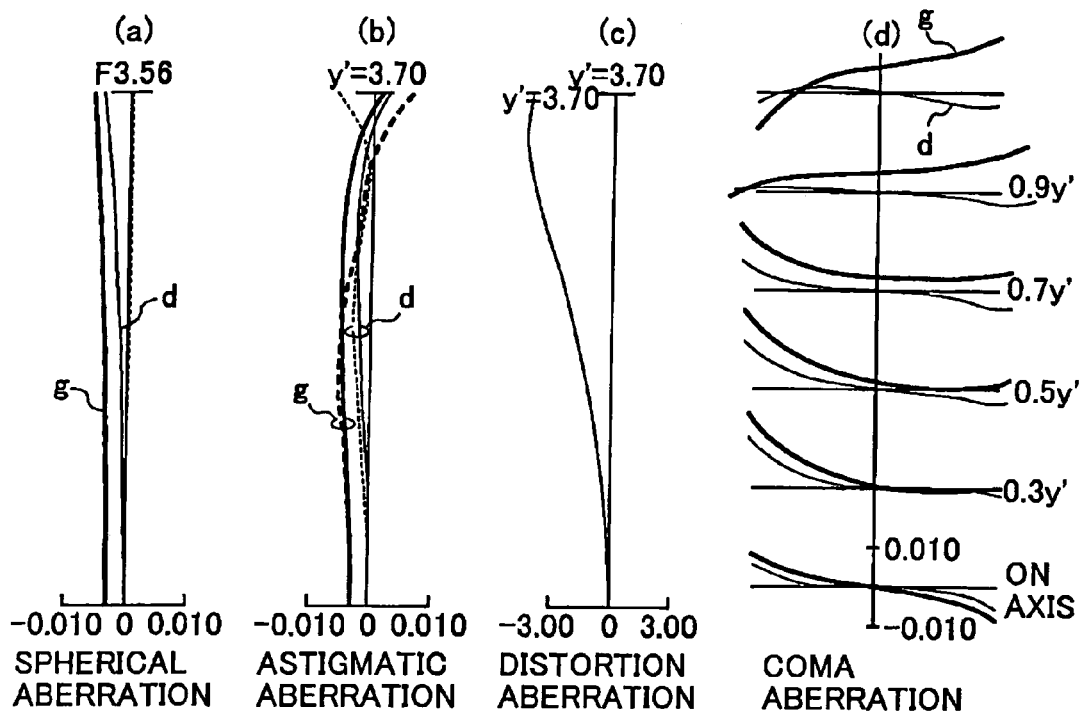
Figure 4B:
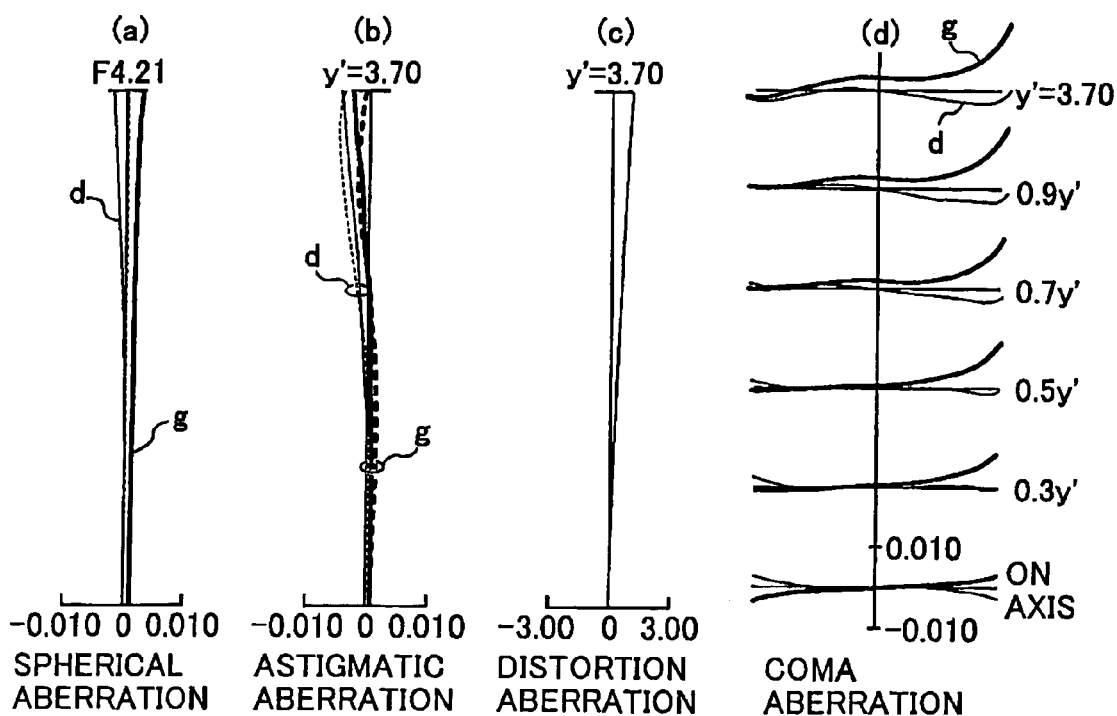

FIG. 4A show graphs of aberration curves that correspond to a spherical aberration (a), an astigmatic aberration (b), a distortion aberration (c), and a coma aberration (d), measured at the short focal length limit of the zooming lens system of FIG. 3A. Likewise, FIG. 4B shows these aberration curves at a medium focal length of FIG. 3B, and FIG. 4C shows the aberration curves at the long focal length limit of the zooming lens system of FIG. 3C. In each spherical aberration graph (a) of FIGS. 4A–4C, a thin solid line indicated by a letter "d" represents a spherical aberration curve of a d-line, a thick solid line indicated by a letter "g" represents a spherical aberration curve of a g-line, and a thin chain line represents a sine condition. In each astigmatic aberration graph (b) of FIGS. 4A–4C, a thin solid line indicated by the letter "d" represents an astigmatic aberration curve of the d-line and a thin dotted line indicated by the letter "g" represents an astigmatic aberration of a sagittal ray. Further, each graph (c) of FIGS. 4A–4C represents a distortion aberration. In each coma aberration graph (d) of FIGS. 4A–4C, a thin solid line indicated by the letter "d" represents a coma aberration curve of the d-line and a thick solid line indicated by the letter "g" represents a coma aberration curve of the g-line. Horizontal axes of the graphs (a)–(c) in FIGS. 4A–4C represent a relative value V of aberrations. Vertical axes of the graphs (a) in FIGS. 4A–4C and horizontal axes of the graphs (d) in FIGS. 4A–4C represent a ratio of a pupil height (i.e., the F-stop number). Vertical axes of the graphs (b)–(c) in FIGS. 4A–4C represent a ratio of image heights.

Figure 5A:
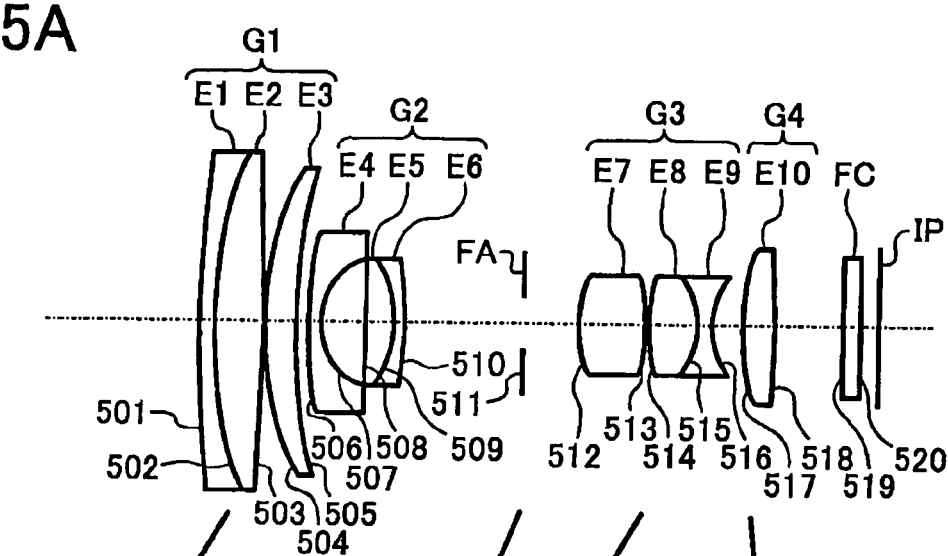
FIGS. 5A–5C are schematic diagrams of a zooming lens apparatus according to a third embodiment of the present invention, at a short focal length limit (FIG. 5A), at a middle focal length (FIG. 5B), and at a long focal length limit (FIG. 5C)
Figure 5B:
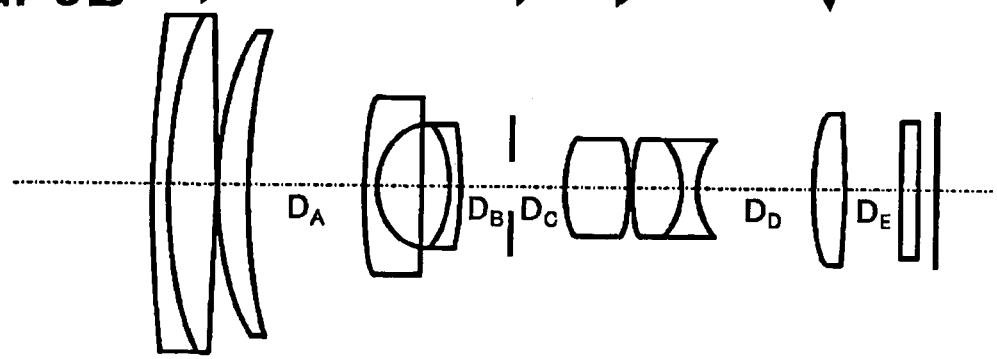
Figure 5C:
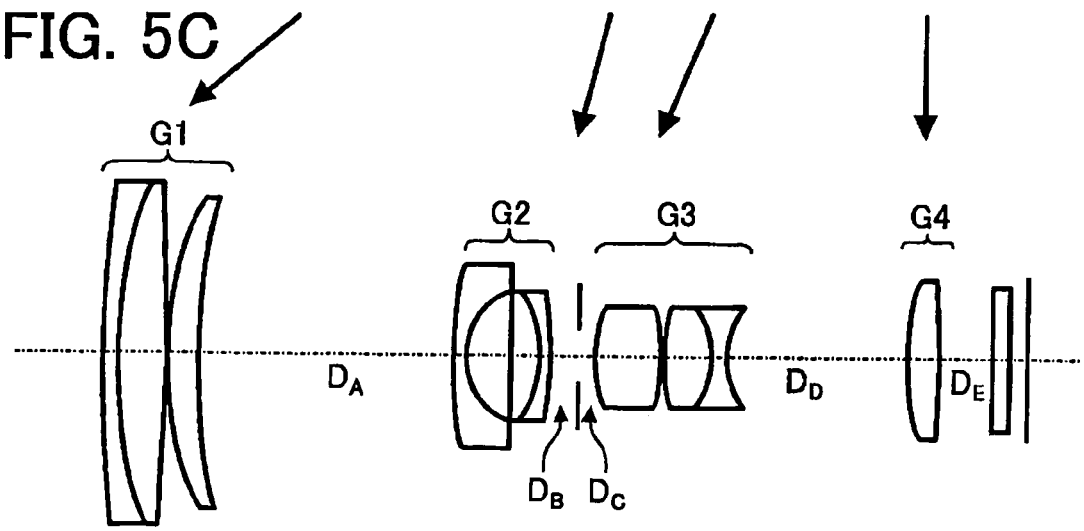

FIGS. 5A–5C show a third embodiment of a zooming lens system at a short focal length limit, at a middle focal length, and at a long focal length limit, respectively. According to the third embodiment of the present invention, the zooming lens system includes various optical elements including a first lens E1, a second lens E2, a third lens E3, a fourth lens E4, a fifth lens E5, a sixth lens E6, a seventh lens E7, an eighth lens E8, a ninth lens E9, a tenth lens E10 made of optical plastic, an aperture plate FA, and an optical filter/cover FC. In this example, the first lens E1, the second lens E2, and the third lens E3 form a first optical lens group G1. The fourth lens E4, the fifth lens E5, and the sixth lens E6 form a second optical lens group G2. The seventh lens E7, the eighth lens E8, and the ninth lens E9 form a third optical lens group G3. The tenth lens E10 forms a fourth optical lens group G4. The lenses included in each of the first, second, third and fourth optical lens groups G1–G4 are supported by a common supporting frame or the like and are integrally movable during a zooming operation of the zooming lens system. FIGS. 5A–5C schematically illustrate with arrows the travel paths of the first, second, third and fourth optical lens groups G1–G4 from a limit of a short focal length to a limit of a long focal length via a medium focal length.

In addition, FIGS. 5A–5C also shows optical surfaces of the above-mentioned optical elements. That is, the first lens E1 has an optical surface 501 on one side facing a subject, and an optical surface 502 on the other side. The second lens E2 has an optical surface which is conjoined with the optical surface 502 and an optical surface 503 on the other side. The third lens E3 has an optical surface 504 on one side facing the subject and an optical surface 505 on the other side. The fourth lens E4 has an optical surface 506 on one side facing the subject and an optical surface 507 on the other side. The fifth lens E5 has an optical surface 508 on one side facing the subject and an optical surface 509 on the other side. The sixth lens E6 has an optical surface which is conjoined with the optical surface 509 on one side facing the subject, and an optical surface 510 on the other side. The aperture plate FA has an optical surface 511 on one side facing the subject. The seventh lens E7 has an optical surface 512 on one side facing the subject and an optical surface 513 on the other side. The eighth lens E8 has an optical surface 514 on one side facing the subject and an optical surface 515 on the other side. The ninth lens E9 has an optical surface which is conjoined with the optical surface 515 on one side facing the subject and an optical surface 516 on the other side. The tenth lens E10 has an optical surface 517 on one side facing the subject and an optical surface 518 on the other side. The optical filter/cover FC has an optical surface 519 on one side facing the subject and an optical surface 520 on the other side.

The first lens E1 is a negative meniscus lens having a convex surface (i.e., the optical surface 501) on one side facing the subject. The second lens E2 is a positive lens having a high convex surface (i.e., the optical surface 502) on one side facing the subject and a convex surface (i.e., the optical surface 503) on the other side. The first lens E1 and the second lens E2 are jointed closely and form a cemented lens. The third lens E3 is a positive meniscus lens having a convex surface (i.e., the optical surface 504) on one side facing the subject. The first optical lens group G1 including the first, second and third lenses E1–E3 has a positive focal length as a whole.

The fourth lens E4 is a negative meniscus lens having an aspheric convex surface (i.e., the optical surface 506) on one side facing the subject and a deep concave surface (i.e., the optical surface 507) on the other side. The fifth lens E5 is a-positive lens having a plane surface (i.e., the optical surface 508) on one side facing the subject. The sixth lens E6 is a negative meniscus lens having an aspheric concave surface (i.e., the optical surfaces 509) on one side facing the subject and a convex surface (i.e., the optical surfaces 510) on the other side. The fifth lens E5 and the sixth lens E6 are jointed closely and form a cemented lens. The second optical lens group G2 including the fourth, fifth and sixth lenses E4–E6 has a negative focal length as a whole.

The seventh lens E7 is a positive lens having aspheric convex surfaces (i.e., the optical surface 512 and 513) on both sides. The eighth lens E8 is a positive lens having a convex surface (i.e., the optical surface 514) on one side facing the subject and a high convex surface (i.e., the optical surface 515) on the other side. The ninth lens E9 is a negative lens having concave surfaces (i.e., the optical surfaces 515 and 516) on both sides. The eighth lens E8 and ninth lens E9 are jointed closely and form a cemented lens. The third optical lens group G3 including the seventh, eighth and ninth lenses E7–E9 has a positive focal length as a whole.

The tenth lens E10 is a positive lens having a high aspheric convex surface (i.e., the optical surface 517) on one side facing the subject and a convex surface (i.e., the optical surface 517) on the other side. The fourth optical lens group G4 including the tenth lens E10 has a positive focal length.

In a scaling change from a short focal length limit to a long focal length limit, distances between each optical lens group vary. A distance $D_A$ between the optical surface 505 and the optical surface 506 increases during a scaling change from a short focal length limit to a long focal length limit. A distance $D_B$ between the optical surface 510 and the surface 511 of the aperture plate FA decrease during the same scaling change. A distance $D_C$ between a surface of the aperture plate FA and the optical surface 512 also decreases. A distance $D_D$ between the optical surface 516 and the optical surface 517 increases during the scaling distance. A distance $D_E$ between the optical surface 518 and the surface 519 is smaller at a long focal length limit than at a short focal length limit. In other words, in a scaling change from a short focal length limit to a long focal length limit, the first optical lens group G1, the aperture plate FA, and the third optical lens group G3 move toward the subject, while the second optical lens group G2 and the optical filter/cover FC are fixed. The fourth optical lens group G4 is positioned nearer to the image plane IP at long focal length limit than at a short focal length limit.

According to the third embodiment of the present invention, in the zooming lens system, the focal length f of the entire system, the F-stop number F, and the half view angle ω are variable by zooming. The focal length f varies in a range from 4.74 to 21.67, the F-stop number F in a range from 3.46 to 4.91, and the half view angle ω in a range from 39.15 to 9.50. Optical characteristics of the above-mentioned optical surfaces 501–520 of the optical elements are as shown below in Table 5.

TABLE 5

| No. | R | D | $N_d$ | $v_d$ | Element |
|---|---|---|---|---|---|
| 501 | 88.920 | 0.90 | 1.84666 | 23.78 | 1st lens, 1st group |
| 502 | 27.776 | 2.67 | 1.77250 | 49.62 | 2nd lens, 1st group |
| 503 | −397.862 | 0.10 | | | |
| 504 | 19.683 | 1.79 | 1.77250 | 49.62 | 3rd lens, 1st group |
| 505 | 37.587 | $D_A$ | | | |
| 506* | 19.021 | 0.79 | 1.83500 | 42.98 | 4th lens, 2nd group |
| 507 | 3.765 | 2.11 | 1.83500 | 42.98 | 5th lens, 2nd group |
| 508 | ∞ | 1.66 | | | |

TABLE 5-continued

| No. | R | D | $N_d$ | $v_d$ | Element |
|---|---|---|---|---|---|
| 509 | −7.904 | 0.64 | 1.80420 | 46.50 | 6th lens, 2nd group |
| 510* | −76.544 | $D_B$ | | | |
| 511 | aperture | $D_C$ | | | |
| 512* | 8.674 | 3.65 | 1.58913 | 61.25 | 7th lens, 3rd group |
| 513* | −8.132 | 0.10 | 1.58913 | 61.25 | 8th lens, 3rd group |
| 514 | 14.331 | 2.43 | | | |
| 515 | −6.459 | 0.80 | 1.69895 | 30.05 | 9th lens, 3rd group |
| 516 | 5.298 | $D_D$ | | | |
| 517* | 12.500 | 1.84 | 1.54340 | 56.00 | 10th lens, 4th group |
| 518 | −40.435 | DE | | | |
| 519 | ∞ | 0.90 | 1.51680 | 64.20 | filter/cover |
| 520 | ∞ | | | | |

In Table 5, numbers in the column "No." represent the numbers of the optical surfaces. The surfaces 506, 510, 512, 513, and 517 indicated with an asterisk mark (*) are aspheric, and their parameters are as indicated below in Table 5A

TABLE 5A

<the optical aspheric surface 506>

K = 0.0,
$A_4 = -1.22579 \times 10^{-4}$,
$A_6 = -2.98179 \times 10^{-7}$,
$A_8 = -1.93092 \times 10^{-8}$,
$A_{10} = -3.32554 \times 10^{-10}$
<the optical aspheric surface 510>

K = 0.0,
$A_4 = -8.28512 \times 10^{-4}$,
$A_6 = -1.82812 \times 10^{-5}$,
$A_8 = 8.50623 \times 10^{-8}$,
$A_{10} = -1.90374 \times 10^{-7}$
<the optical aspheric surface 512>

K = 0.0,
$A_4 = -8.08852 \times 10^{-4}$,
$A_6 = 1.58812 \times 10^{-5}$,
$A_8 = -1.00403 \times 10^{-6}$,
$A_{10} = 2.75151 \times 10^{-8}$
<the optical aspheric surface 513>

K = 0.0,
$A_4 = 4.07275 \times 10^{-4}$,
$A_6 = -7.86358 \times 10^{-6}$,
$A_8 = 1.60507 \times 10^{-6}$,
$A_{10} = -9.33131 \times 10^{-8}$
<the optical aspheric surface 517>

K = 0.0,
$A_4 = -1.29441 \times 10^{-5}$,
$A_6 = 5.93123 \times 10^{-6}$,
$A_8 = -3.01006 \times 10^{-7}$,
$A_{10} = 7.06450 \times 10^{-9}$ In Table 5, $D_A$ represents a distance between the first optical lens group G1 and the second optical lens group G2. Likewise, $D_B$ represents a distance between the second optical lens group G2 and the aperture plate FA. $D_C$ represents a distance between the aperture plate FA and the third optical lens group G3, and $D_D$ represents a distance between the third optical lens group G3 and the fourth optical lens group G4. $D_E$ is a distance between the fourth optical lens group G4 and the optical filter FC. These distances $D_A$, $D_B$, $D_C$, $D_D$ and $D_E$ are variable by zooming, as indicated below in Table 6.

TABLE 6

| | $f_S$ = 4.739 | $f_M$ = 10.145 | $f_L$ = 21.575 |
|---|---|---|---|
| $D_A$ | 0.600 | 7.011 | 14.600 |
| $D_B$ | 6.591 | 2.964 | 1.200 |
| $D_C$ | 3.223 | 2.372 | 1.000 |
| $D_D$ | 2.000 | 7.226 | 10.607 |
| $D_E$ | 3.805 | 3.057 | 2.812 |

In Table 6, $f_S$ is a short focal length limit, $f_M$ is a medium focal length limit, and $f_L$ is a long focal length limit.

In addition, the optical elements of the zooming lens system satisfy the following equations;

$m_{4T}=0.712$, $m_{4T}/m_{4W}=1.085$, $X_1/f_T=0.646$, $X_3/f_T=0.351$, $|f_2|/f_3=0.744$, and $f_1/f_W=7.49$.

The constant $m_{4T}$ represents an imaging magnification of the fourth optical lens group G4 at a telescopic limit, $m_{4W}$ represents a imaging magnification of the optical lens group G4 at a wide-angle limit, $X_1$ represents a total traveling distance of the first optical lens group G1 in zooming from a wide-angle limit to a telescopic limit, $f_T$ represents a focal length of the whole optical system at a telescopic limit, $X_3$ represents a total traveling distance of the third optical lens group G3 in zooming from a wide-angle limit to a telescopic limit, $f_1$ represents a focal length of the first optical lens group G1, $f_2$ represents a focal length of the second optical lens group G2, $f_3$ represents a focal length of the third optical lens group G3, and $f_W$ represents a focal length of the whole optical system at a wide-angle limit.

Figure 6A:
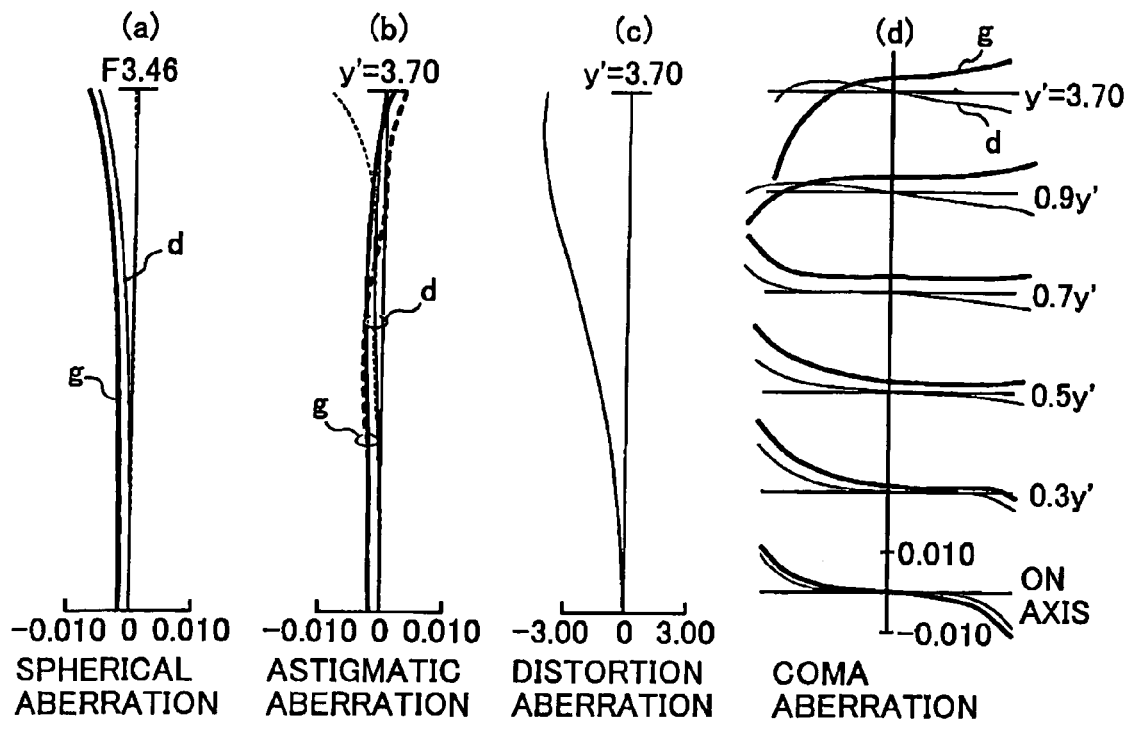
FIGS. 6A–6C are graphs of aberration curves corresponding to a spherical aberration, an astigmatic aberration, a distortion aberration, and a coma aberration measured at a short focal length limit (FIG. 6A), at a middle focal length (FIG. 6B), and at a long focal length limit (FIG. 6C) of the zooming lens apparatus of FIGS. 5A–5C.
Figure 6B:
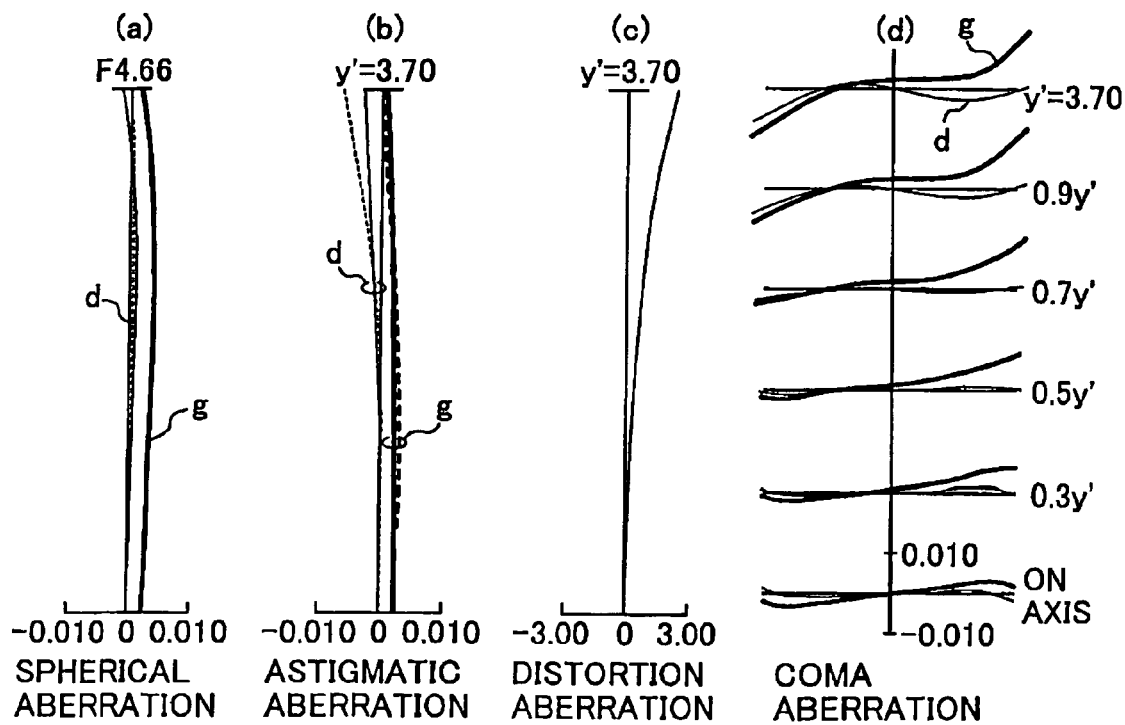
Figure 6C:
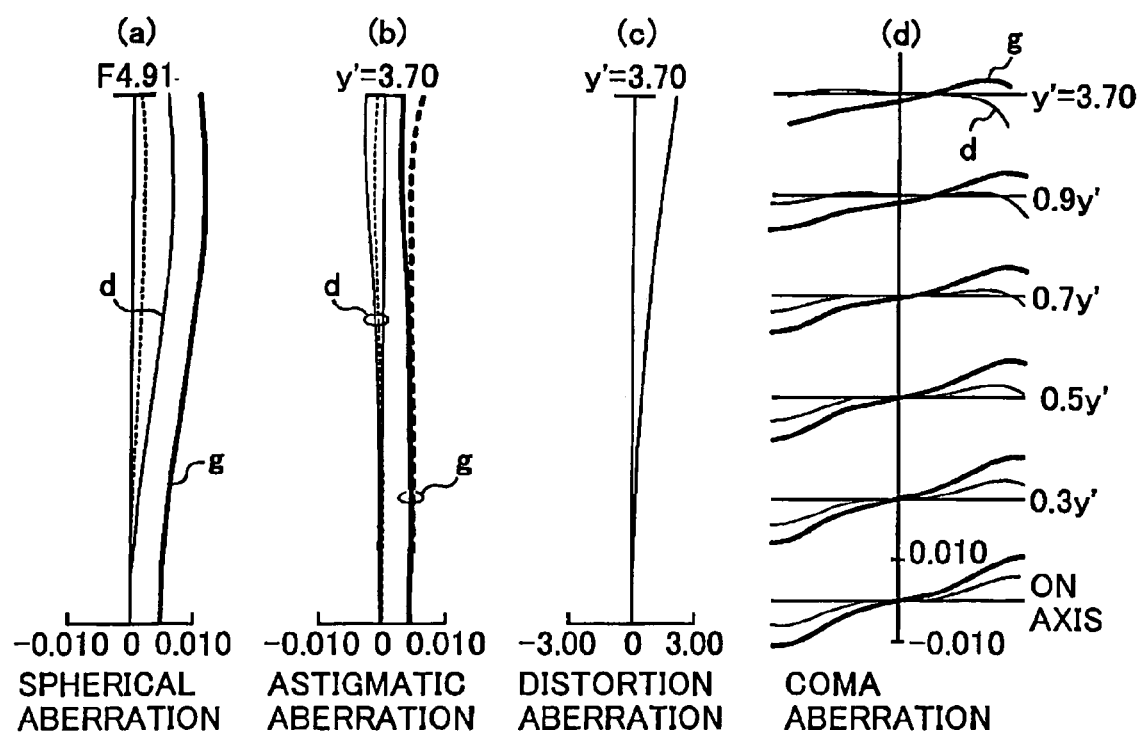

FIG. 6A show graphs of aberration curves that correspond to a spherical aberration (a), an astigmatic aberration (b), a distortion aberration (c), and a coma aberration (d), measured at the short focal length limit of the zooming lens system of FIG. 5A. Likewise, FIG. 6B shows these aberration curves at the medium focal length limit of FIG. 5B, and FIG. 6C shows the aberration curves at the long focal length limit of the zooming lens system of FIG. 5C. In each spherical aberration graph (a) of FIGS. 6A–6C, a thin solid line indicated by a letter "d" represents a spherical aberration curve of a d-line, a thick solid line indicated by a letter "g" represents a spherical aberration curve of a g-line, and a thin chain line represents a sine condition. In each astigmatic aberration graph (b) of FIGS. 6A–6C, a thin solid line indicated by the letter "d" represents an astigmatic aberration curve of the d-line and a thin dotted line indicated by the letter "g" represents an astigmatic aberration of a sagittal ray. Further, each graph (c) of FIGS. 6A–6C represents a distortion aberration. In each coma aberration graph (d) of FIGS. 6A–6C, a thin solid line indicated by the letter "d" represents a coma aberration curve of the d-line and a thick solid line indicated by the letter "g" represents a coma aberration curve of the g-line. Horizontal axes of the graphs (a)–(c) in FIGS. 6A–6C represent a relative value V of aberrations. Vertical axes of the graphs (a) in FIGS. 6A–6C and horizontal axes of the graphs (d) in FIGS. 6A–6C represent a ratio of a pupil height (i.e., the F-stop number). Vertical axes of the graphs (b)–(c) in FIGS. 6A–6C represent a ratio of image heights.

Figure 7A:
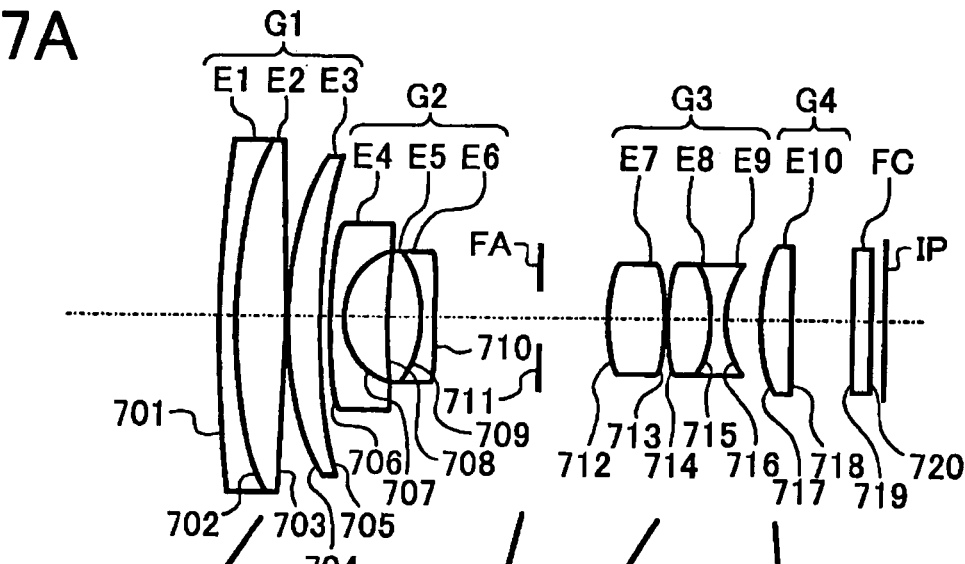
FIGS. 7A–7C are schematic diagrams of a zooming lens apparatus according to a fourth embodiment of the present invention, at a short focal length limit (FIG. 7A), at a middle focal length (FIG. 7B), and at a long focal length limit (FIG. 7C)
Figure 7B:
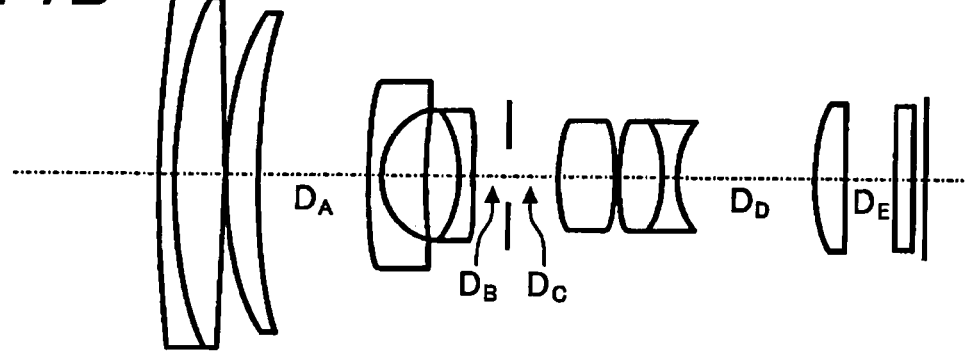
Figure 7C:
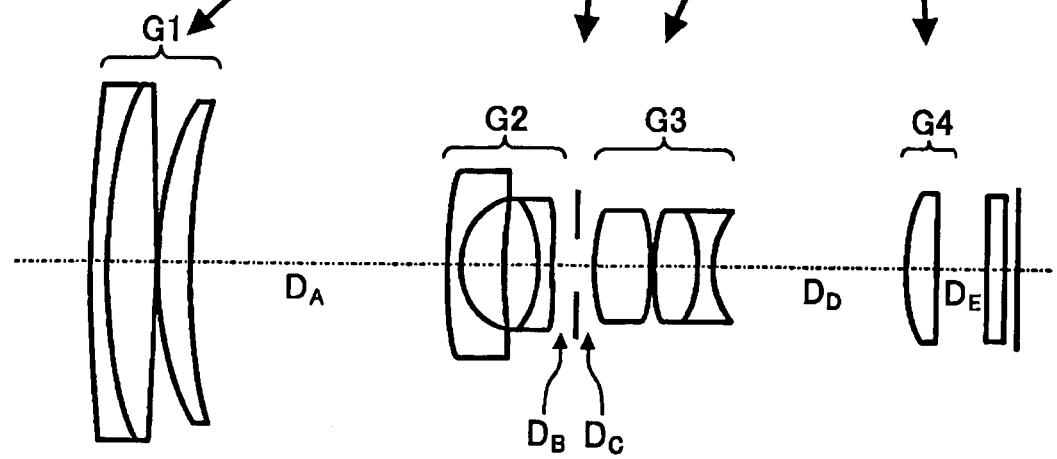

FIGS. 7A–7C show a fourth embodiment of a zooming lens system at a short focal length limit, at a middle focal length, and at a long focal length limit, respectively. According to the fourth embodiment of the present invention, the zooming lens system includes various optical elements including a first lens E1, a second lens E2, a third lens E3, a fourth lens E4, a fifth lens E5, a sixth lens E6, a seventh lens E7, an eighth lens E8, a ninth lens E9, a tenth lens E11, an aperture plate FA, and an optical filter/cover FC. In this example, the first lens E1, the second lens E2 and the third lens E3 form a first optical lens group G1. The fourth lens E4, the fifth lens E5 and the sixth lens E6 form a second optical lens group G2. The seventh lens E7, the eighth lens E8, and the ninth lens E9 form a third optical lens group G3. The tenth lens E10 forms a fourth optical lens group G4. The lenses included in each of the first, second, third and fourth optical lens groups G1–G4 are supported by a common supporting frame or the like and are integrally moved during a zooming operation of the zooming lens system. FIGS. 7A–7C schematically illustrate with arrows the travel paths of the first, second, third and fourth optical lens groups G1–G4 from a limit of a short focal length (i.e., a wide-angle limit) to a limit of a long focal length (i.e., a telescopic limit) via a medium focal length.

In addition, FIGS. 7A–7C also show optical surfaces of the above-mentioned optical elements. That is, the first lens E1 has an optical surface 701 on one side facing a subject, which is not shown but is positioned left in the drawing, and an optical surface 702 on the other side. The second lens E2 has an optical surface which is conjoined with the optical surface 702 and an optical surface 703 on the other side. The third lens E3 has an optical surface 704 on one side facing the subject and an optical surface 705 on the other side. The fourth lens E4 has an optical surface 706 on one side facing the subject and an optical surface 707 on the other side. The fifth lens E5 has an optical surface 708 on one side facing the subject and an optical surface 709 on the other side. The sixth lens E6 has an optical surface which is conjoined with the optical surface 709 on one side facing the subject, and an optical surface 710 on the other side. The aperture plate FA has an optical surface 711 on one side facing the subject. The seventh lens E7 has an optical surface 712 on one side facing the subject and an optical surface 713 on the other side. The eighth lens E8 has an optical surface 714 on one side facing the subject and an optical surface 715 on the other side. The ninth lens E9 has an optical surface which is conjoined with the optical surface 715 on one side facing the subject and an optical surface 716 on the other side. The tenth lens E10 has an optical surface 717 on one side facing the subject and an optical surface 718 on the other side. The optical filter/cover FC has an optical surface 719 on one side facing the subject and an optical surface 720 on the other side.

The first lens E1 is a negative meniscus lens having a convex surface (i.e., the optical surface 701) on one side facing the subject. The second lens E2 is a positive lens having a high convex surface (i.e., the optical surface 702) on one side facing the subject and a convex surface (i.e., the optical surface 703) on the other side. The first lens E1 and the second lens E2 are jointed closely and form a cemented lens. The third lens E3 is a positive meniscus lens having a convex surface (i.e., the optical surface 704) on one side facing the subject. The first optical lens group G1 including the first, second, and third lenses E1–E3 has a positive focal length as a whole.

The fourth lens E4 is a negative meniscus lens having an aspheric convex surface (i.e., the optical surface 706) on one side facing the subject and a deep concave surface (i.e., the optical surface 707) on the other side. The fifth lens E5 is a positive lens having a convex surface (i.e., the optical surface 708) on one side facing the subject and a high convex surface (i.e., the optical surface 709). The sixth lens E6 is a negative meniscus lens having a deep concave surface (i.e., the optical surfaces 709) on one side facing the subject and a concave surface (i.e., the optical surfaces 710) on the other side. The fifth lens E5 and the sixth lens E6 are jointed closely and form a cemented lens. The second optical lens group G2 including the fourth, fifth and sixth lenses E4–E6 has a negative focal length as a whole.

The seventh lens E7 is a positive lens having aspheric convex surfaces (i.e., the optical surface 712 and 713) on both sides. The eighth lens E8 is a positive lens having a convex surface (i.e., the optical surface 714) on one side facing the subject and a high convex surface (i.e., the optical surface 715) on the other side. The ninth lens E9 is a negative lens having concave surfaces (i.e., the optical surfaces 715 and 716) on both sides. The eighth lens E8 and ninth lens E9 are jointed closely and form a cemented lens. The third optical lens group G3 including the seventh, eighth and ninth lenses E7–E9 has a positive focal length as a whole.

The tenth lens E10 is a positive lens having a high aspheric convex surface (i.e., the optical surface 717) on one side facing the subject and a convex surface (i.e., the optical surface 718) on the other side. The fourth optical lens group G4 including the tenth lens E10 has a positive focal length.

In a scaling change from a short focal length limit to a long focal length limit, distances between each optical lens group vary. A distance $D_A$ between the optical surface 705 and the optical surface 706 increases in a scaling change from a short focal length limit to a long focal length limit. A distance $D_B$ between the optical surface 710 and the surface 711 of the aperture plate FA decreases during this same scaling change. A distance $D_C$ between the aperture plate FA and the optical surface 712 also decreases. A distance $D_D$ between the optical surface 716 and the optical surface 717 increases during the scaling change. A distance $D_E$ between the optical surface 718 and the surface. 719 is smaller at a long focal length limit than at a short focal length limit. In other words, in a scaling change from a short focal length limit to a long focal length limit, the first optical lens group G1, the aperture plate FA, and the third optical lens group G3 move toward the subject, while the second optical lens group G2 and the optical filter/cover FC are fixed. The fourth optical lens group G4 is positioned nearer to the image plane IP at long focal length limit than at a short focal length limit.

According to the fourth embodiment of the present invention, in the zooming lens system, the focal length f of the entire system, the F-stop number F, and the half view angle ω are variable by zooming. The focal length f varies in a range from 4.74 to 21.62, the F-stop number F in a range from 3.42 to 4.99, and the half view angle ω in a range from 39.12 to 9.50. Optical characteristics of the above-mentioned optical surfaces 701–720 of the optical elements are as shown below in Table 7.

TABLE 7

| No. | R | D | $N_d$ | $v_d$ | Element |
|---|---|---|---|---|---|
| 701 | 96.656 | 0.90 | 1.84666 | 23.78 | 1st lens, 1st group |
| 702 | 29.314 | 2.72 | 1.77250 | 49.62 | 2nd lens, 1st group |
| 703 | −219.341 | 0.10 | | | |
| 704 | 20.153 | 1.80 | 1.77250 | 49.62 | 3rd lens, 1st group |
| 705 | 33.538 | DA | | | |
| 706* | 18.011 | 0.84 | 1.83500 | 42.98 | 4th lens, 2nd group |
| 707 | 3.936 | 2.07 | 1.83500 | 42.98 | 5th lens, 2nd group |
| 708 | 74.837 | 1.95 | | | |
| 709 | −9.146 | 0.74 | 1.80420 | 46.50 | 6th lens, 2nd group |
| 710* | 759.807 | DB | | | |
| 711 | Aperture | DC | | | |
| 712* | 8.333 | 3.34 | 1.58913 | 61.25 | 7th lens, 3rd group |
| 713* | −8.827 | 0.10 | 1.58913 | 61.25 | 8th lens, 3rd group |
| 714 | 12.236 | 2.45 | | | |
| 715 | −7.054 | 0.80 | 1.69895 | 30.05 | 9th lens, 3rd group |
| 716 | 4.892 | DD | | | |
| 717* | 10.651 | 1.83 | 1.58913 | 61.25 | 10th lens, 4th group |
| 718 | −261.223 | DE | | | |
| 719 | ∞ | 0.90 | 1.51680 | 64.20 | filter/cover |
| 720 | ∞ | | | | |

In Table 7, numbers in the column "No." represent the numbers of the optical surfaces. The surfaces 706, 710, 712, 713 and 717 indicated with a suffix of an asterisk mark (*) are aspheric, and their parameters are as indicated below in Table 5A

TABLE 7A

<the optical aspheric surface 706>

K = 0.0,
$A_4 = -8.08791 \times 10^{-5}$,
$A_6 = -2.03124 \times 10^{-6}$,
$A_8 = 6.26638 \times 10^{-9}$,
$A_{10} = -6.12352 \times 10^{-11}$ <the optical aspheric surface 710>

K = 0.0,
$A_4 = -7.52609 \times 10^{-4}$,
$A_6 = -124401 \times 10^{-5}$,
$A_8 = -9.65466 \times 10^{-7}$,
$A_{10} = -8.33332 \times 10^{-8}$ <the optical aspheric surface 712>

K = 0.0,
$A_4 = -7.07947 \times 10^{-4}$,
$A_6 = -1.16179 \times 10^{-6}$,
$A_8 = 6.72505 \times 10^{-8}$,
$A_{10} = -2.53913 \times 10^{-8}$ <the optical aspheric surface 713>

K = 0.0,
$A_4 = 3.43658 \times 10^{-4}$,
$A_6 = -1.44022 \times 10^{-6}$,
$A_8 = -1.33484 \times 10^{-7}$,
$A_{10} = -1.40822 \times 10^{-8}$ <the optical aspheric surface 717>

K = 0.0,
$A_4 = -4.75410 \times 10^{-5}$,
$A_6 = 1.15429 \times 10^{-5}$,
$A_8 = -4.87258 \times 10^{-7}$,
$A_{10} = 9.54084 \times 10^{-9}$ In Table 7, $D_A$ represents a distance between the first optical lens group G1 and the second optical lens group G2. Likewise, $D_B$ represents a distance between the second optical lens group G2 and the aperture plate FA. $D_C$ represents a distance between the aperture plate FA and the third optical lens group G3, and $D_D$ represents a distance between the third optical lens group G3 and the fourth optical lens group G4. $D_E$ is a distance between the fourth optical lens group G4 and the optical filter FC. These distances $D_A$, $D_B$, $D_C$, $D_D$ and $D_E$ are variable by zooming, as indicated below in Table 8.

TABLE 8

| | $f_S = 4.741$ | $f_M = 10.112$ | $f_L = 21.624$ |
|---|---|---|---|
| $D_A$ | 0.600 | 6.160 | 15.040 |
| $D_B$ | 6.288 | 2.111 | 1.200 |
| $D_C$ | 3.888 | 3.173 | 1.000 |
| $D_D$ | 2.000 | 7.785 | 11.065 |
| $D_E$ | 3.440 | 2.547 | 2.351 |

In Table 8, $f_S$ is a short focal length limit, $f_M$ is a medium focal length limit, and $f_L$ is a long focal length limit.

In addition, the optical elements of the zooming lens system satisfy the following equations;

$m_{4T} = 0.721$, $m_{4T}/m_{4W} = 1.095$, $X_1/f_T = 0.668$, $X_3/f_T = 0.369$, $|f_2|/f_3 = 0.795$, and $f_1/f_W = 8.14$.

The constant $m_{4T}$ represents an imaging magnification of the fourth optical lens group G4 at a telescopic limit, $m_{4W}$ represents a imaging magnification of the optical lens group G4 at a wide-angle limit, $X_1$ represents a total traveling distance of the first optical lens group G1 in zooming from a wide-angle limit to a telescopic limit, $f_T$ represents a focal length of the whole optical system at a telescopic limit, $X_3$ represents a total traveling distance of the third optical lens group G3 in zooming from a wide-angle limit to a telescopic limit, $f_1$ represents a focal length of the first optical lens group G1, $f_2$ represents a focal length of the second optical lens group G2, $f_3$ represents a focal length of the third optical lens group G3, and $f_W$ represents a focal length of the whole optical system at a wide-angle limit.

Figure 8A:
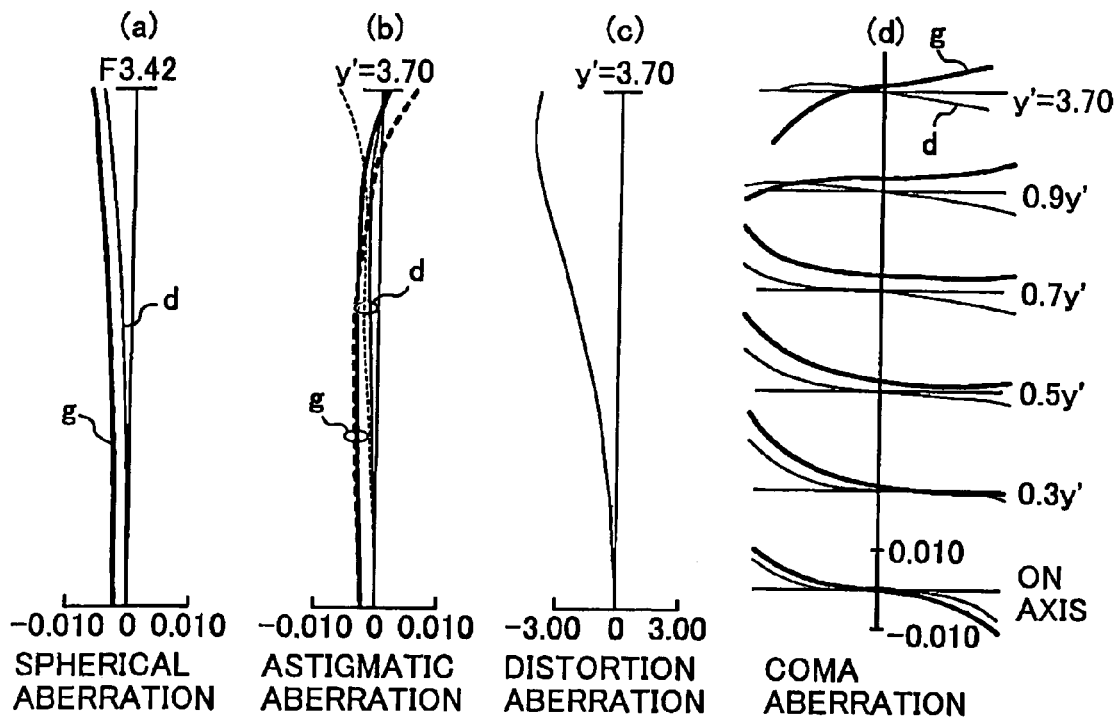
Figure 8B:
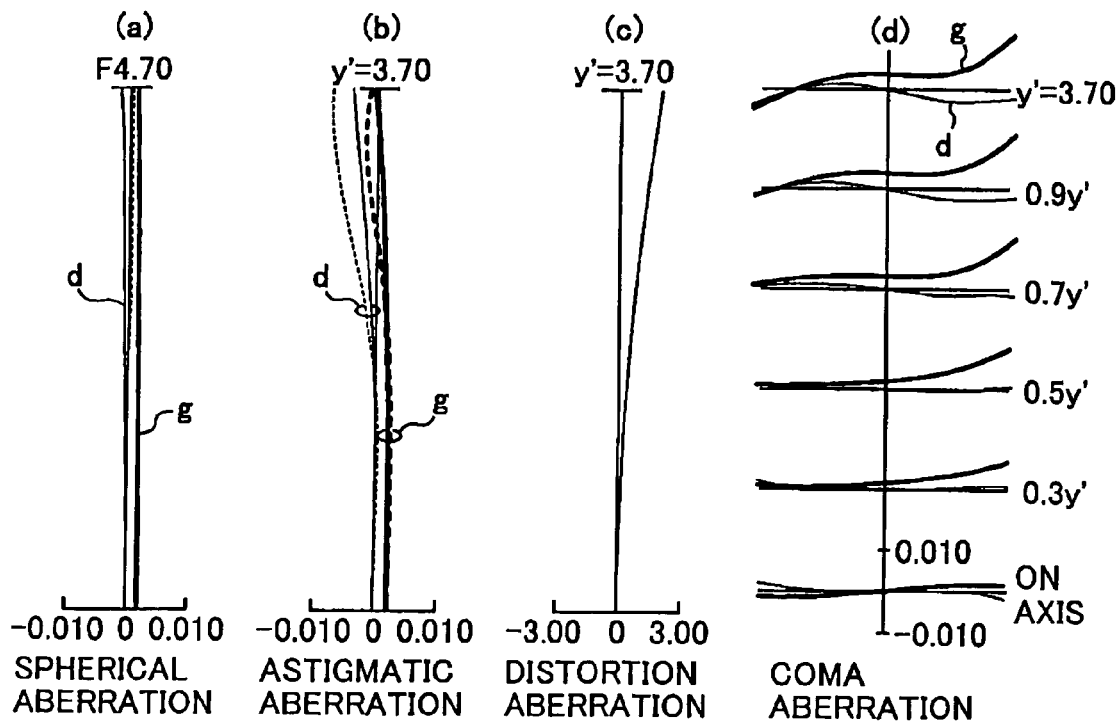

FIG. 8A show graphs of aberration curves that correspond to a spherical aberration (a), an astigmatic aberration (b), a distortion aberration (c), and a coma aberration (d), measured at the short focal length limit of the zooming lens system of FIG. 7A. Likewise, FIG. 8B shows these aberration curves at the medium focal length limit of FIG. 7B, and FIG. 8C shows the aberration curves at the long focal length limit of the zooming lens system of FIG. 7C. In each spherical aberration graph (a) of FIGS. 8A–8C, a thin solid line indicated by a letter "d" represents a spherical aberration curve of a d-line, a thick solid line indicated by a letter "g" represents a spherical aberration curve of a g-line, and a thin chain line represents a sine condition. In each astigmatic aberration graph (b) of FIGS. 8A–8C, a thin solid line indicated by the letter "d" represents an astigmatic aberration curve of the d-line and a thin dotted line indicated by the letter "g" represents an astigmatic aberration of a sagittal ray. Further, each distortion aberration graph (c) of FIGS. 8A–8C represents a distortion aberration. In each coma aberration graph (d) of FIGS. 8A–8C, a thin solid line indicated by the letter "d" represents a coma aberration curve of the d-line and a thick solid line indicated by the letter "g" represents a coma aberration curve of the g-line. Horizontal axes of the graphs (a)–(c) in FIGS. 8A–8C represent a relative value V of aberrations. Vertical axes of the graphs (a) in FIGS. 8A–8C and horizontal axes of the graphs (d) in FIGS. 8A–8C represent a ratio of a pupil height (i.e., the F-stop number). Vertical axes of the graphs (b)–(c) in FIGS. 8A–8C represent a ratio of image heights.

Zooming lens systems as described in accordance with the above embodiments have several advantageous characteristics and effects, as described below. In each of these four embodiments, the second optical lens group G2 is fixed, which results in a simple lens body structure and reduces decentering between the optical lens groups. During a zooming-in operation (i.e., from a wide-angle configuration to a telescopic configuration), the first optical lens group G1 and the third optical lens group G3 move gradually toward the subject, and a distance between the first optical lens group G1 and the second optical lens group G2 gradually increases while a distance between the second optical lens group G2 and the third optical lens group G3 gradually decreases. The scaling factors of the second and third optical lens groups G2 and G3 both increase when a scaling of the zooming lens system is changed from a wide-angle limit to a telescopic limit, and this configuration allows sharing of a single scaling action. During zooming-in, the fourth optical lens group G4 moves toward an image plane IP, and its scaling factor also increases when a scaling of the zooming lens system is changed from a wide-angle limit to a telescopic limit. In this way, the fourth lens group G4 also shares in the scaling action, and the lens structure described above allows effective lens scale zooming.

Additionally, the zooming lens system as described above satisfies an inequality condition $0.60<m_{4T}<0.85$, more preferably $0.65<m_{4T}<0.80$, in which $m_{4T}$ represents an imaging magnification of the fourth optical lens group at a telescopic limit. If the $m_{4T}$ is less than 0.60, then light flux from the third lens group G3 approaches a focal light flux, which makes it difficult for the third lens group G3 to effectively contribute to scaling or to correcting a distortion aberration or a field curvature. On the other hand, if $m_{4T}$ is more than 0.60, then the fourth optical lens group G4 is too close to the imaging surface, which can make securing enough back focusing difficult and/or make the refractive power of the fourth optical lens group G4 too small. Refractive power that is too small can cause a lack of sufficient light on a peripheral portion of an image capturing device.

Furthermore, the zooming lens apparatus satisfies an inequality condition $1.0<m_{4T}/m_{4W}<1.3$, more preferably $1.05<m_{4T}/m_{4W}<1.2$, in which $m_{4T}$ represents an imaging magnification of the fourth optical lens group G4 at a telescopic limit, and $m_{4W}$ represents a imaging magnification of the fourth optical lens group G4 at a wide-angle limit. If $m_{4T}/m_{4W}$ is less than 1.0, then the fourth optical lens group G4 may not contribute to a scaling action, and the scaling of the second and third optical lens groups G2 and G3 may increase in an unbalanced manner. Also, if $m_{4T}/m_{4W}$ is more than 1.3, then the scaling share of the fourth optical lens group G4 may be too large to correct an aberration.

As discussed in each of the above embodiments, the second lens group G2 is fixed during a scaling change. Therefore, only linear translation of the first optical lens group G1 determines a distance between the first and second lens groups G1 and G2. Accordingly, the zooming lens system preferably satisfies an inequality condition $0.50<X_1/f_T<0.85$, more preferably $0.60<X_1/f_T<0.75$, in which $X_1$ represents a total traveling distance of the first optical lens group G1 in zooming from a wide-angle limit to a telescopic limit, and $f_T$ represents a focal length of the whole optical system at a telescopic limit. If $X_1/f_T$ is less than 0.50, then the scaling share of the second optical lens group G2 decreases, and, consequently, the third optical lens group G3 will have more scaling share, or the first and second optical lens group G1 and G2 will have more refractive power. Either aberration is detrimental to effective zooming and is undesirable. Additionally, such a condition would require the length of the zooming lens system to be longer at a wide-angle limit, and makes the height of light flux passage through the first optical lens group G1 higher. Further, the size of the first optical lens group G1 would also need to be larger. On the other hand, if $X_1/f_T$ is more than 0.85, then the length of the zooming lens system becomes too short at the wide-angle limit or too long at the telescopic limit. Too short of a length can limit a travel distance of the third optical lens group G3 and can make a scaling share of the third optical group G3 too small to correct an aberration. Too long of a length can result in equipment using the zooming lens to be of an undesirably large size.

The distance between the second and third lens groups G2 and G3 are determined solely by linear translation of the third optical lens group G3. The zooming lens system preferably satisfies an inequality condition $0.25<X_3/f_T<0.50$, more preferably $0.30<X_3/f_T<0.45$, in which $X_3$ represents a total traveling distance of the third optical lens group G3 in zooming from a wide-angle limit to a telescopic limit, and $f_T$ represents a focal length of the whole optical system at a telescopic limit. If $X_3/f_T$ is less than 0.25, then the scaling share of the third optical lens group G3 decreases. Consequently, the scaling share of the second optical lens group G2 increases or the third optical lens group has more refractive power, and neither of these aberrations is desirable.

On the other band, if $X_3/f_T$ is more than 0.25, then the length of the zooming lens system becomes too long at the wide-angle limit, which can make the height of light flux passage through the first optical lens group G1 higher and require that the first optical lens group G1 be bigger.

For correction of aberrations, the zooming lens system preferably satisfies inequality conditions $0.6<-f_2/F3<1.0$ and $6.0<f_1/f_W<12.0$, in which $f_2$ represents a the second optical lens group G2, $f_3$ represents a focal length of the third optical lens group G3, $f_1$ represents a focal length of the first optical lens group G1, and $f_W$ represents a focal length of the whole optical system at a wide-angle limit. If $|f_2|/F3$ is less than 0.6, then the refractive power of the second optical lens group G2 is too strong. If $|f_2|/F3$ is more than 1.0, then the refractive power of the third optical lens group G2 is too strong. In either case, the fluctuation of an aberration can become large in scaling. If $f_1/f_W$ is less than 6.0, then the imaging magnification of the second optical lens group G2 approaches a same magnification and thereby increases its efficiency of scaling (i.e., a high scaling rate is achieved). However, each lens of the first optical lens group G1 will need to have more refractive power, which can cause color aberration and make each lens larger. On the other hand, if $f_1/f_W$ is more than 12.0, then the scaling share of the second optical lens group G2 becomes too small to scale at a high rate.

For correction of a color aberration, the second optical lens group G2 preferably includes lenses made of materials satisfying the following inequality conditions:

$1.75<N_{21}<1.90$, $35<v_{21}<50$,
$1.65<N_{22}<1.90$, $20<v_{22}<35$, and
$1.75<N_{23}<1.90$, $35<v_{23}<50$, where $N_{2i}$ represents a refractive index of a lens at an i-th position i-th closest to the subject in the second optical lens group G2, and $v_{2i}$ represents an Abbe number of a lens at an i-th position i-th closest to the subject in the second optical lens group G2.

Figure 9A:
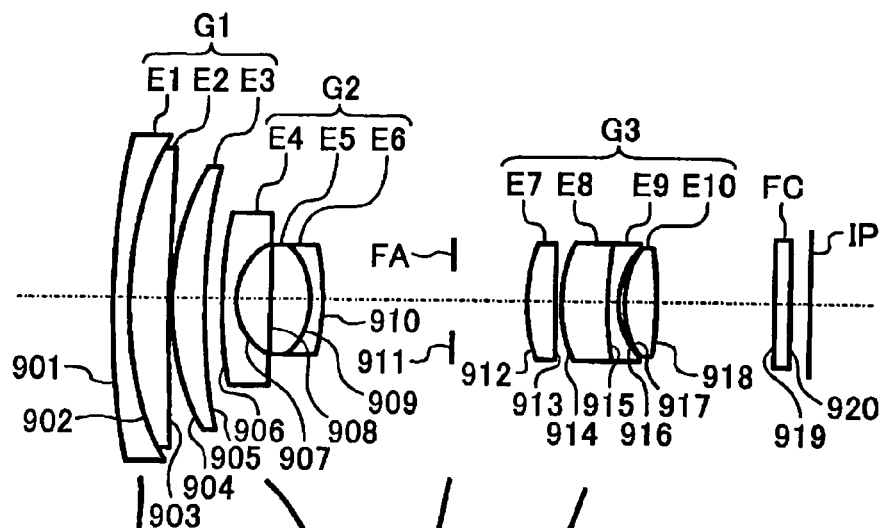
FIGS. 9A–9C are schematic diagrams of a zooming lens apparatus according to a fifth embodiment of the present invention, at a short focal length limit (FIG. 9A), at a middle focal length (FIG. 9B), and at a long focal length limit (FIG. 9C)
Figure 9B:
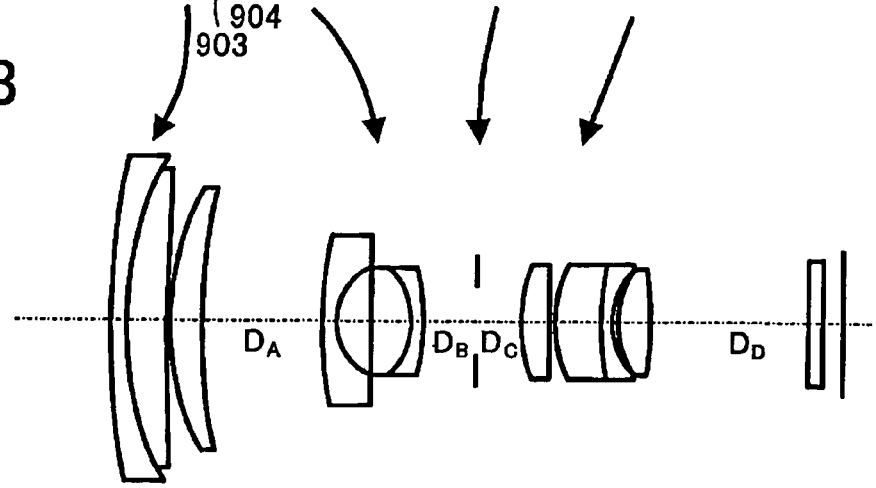
Figure 9C:
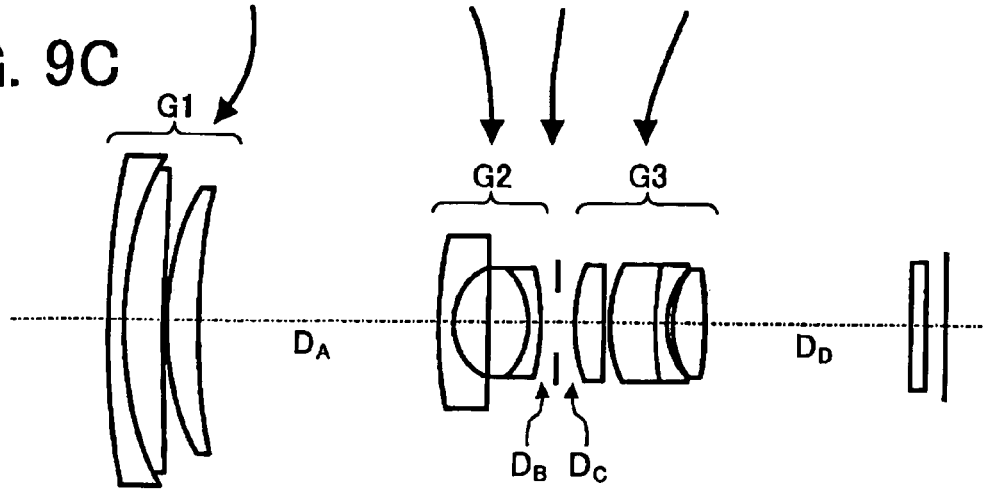

FIGS. 9A–9C show a fifth embodiment of a zooming lens system at a short focal length limit, at a middle focal length, and at a long focal length limit, respectively. According to the fifth embodiment of the present invention, the zooming lens system includes various optical elements including a first lens E1, a second lens E2, a third lens E3, a fourth lens E4, a fifth lens E5, a sixth lens E6, a seventh lens E7, an eighth lens E8, a ninth lens E9, a tenth lens E10, an aperture plate FA, and an optical filter/cover FC. In this example, the first lens E1, the second lens E2 and the third lens E3 form a first optical lens group G1. The fourth lens E4, the fifth lens E5 and the sixth lens E6 form a second optical lens group G2. The seventh lens E7, the eighth lens E8, the ninth lens E9 and the tenth lens E10 form a third optical lens group G3. The lenses included in each of the first, second and third optical lens groups. G1–G3 are supported by a common supporting frame or the like and are integrally moved during a zooming operation of the zooming lens system. FIGS. 9A–9C schematically shows with arrows the travel paths of the first, second, and third optical lens groups G1–G3 from a limit of a short focal length to a limit of a long focal length via a medium focal length.

In addition, FIGS. 9A–9C also show optical surfaces of the above-mentioned optical elements. That is, the first lens E1 has an optical surface 901 on one side facing a subject, and an optical surface 902 on the other side. The second lens E2 has an optical surface which is conjoined with the optical surface 902 and an optical surface 903 on the other side. The third lens E3 has an optical surface 904 on one side facing the subject and an optical surface 905 on the other side. The fourth lens E4 has an optical surface 906 on one side facing the subject and an optical surface 907 on the other side. The fifth lens E5 has an optical surface 908 on one side facing the subject and an optical surface 909 on the other side. The sixth lens E6 has an optical surface which is conjoined with the optical surface 909 on one side facing the subject, and an optical surface 910 on the other side. The aperture plate FA has an optical surface 911 on one side facing the subject. The seventh lens E7 has an optical surface 912 on one side facing the subject and an optical surface 913 on the other side. The eighth lens E8 has an optical surface 914 on one side facing the subject and an optical surface 915 on the other side. The ninth lens E9 has an optical surface which is conjoined with the optical surface 915 on one side facing the subject and an optical surface 916 on the other side. The tenth lens E10 has an optical surface 917 on one side facing the subject and an optical surface 918 on the other side. The optical filter/cover FC has an optical surface 919 on one side facing the subject and an optical surface 920 on the other side.

The first lens E1 is a negative meniscus lens having a convex surface (i.e., the optical surface 901) on one side facing the subject. The second lens E2 is a positive lens having a high convex surface (i.e., the optical surface 902) on one side facing the subject and a convex surface (i.e., the optical surface 903) on the other side. The first lens E1 and the second lens E2 are jointed closely and form a cemented lens. The third lens E3 is a positive meniscus lens having a convex surface (i.e., the optical surface 904) on one side facing the subject. The first optical lens group G1 including the first, second, and third lenses E1–E3 has a positive focal length as a whole.

The fourth lens E4 is a negative meniscus lens having an aspheric convex surface (i.e., the optical surface 906) on one side facing the subject and a deep concave surface (i.e., the optical surface 907) on the other side. The fifth lens E5 is a positive lens having a plane surface (i.e., the optical surface 908) on one side facing the subject. The sixth lens E6 is a negative meniscus lens having an aspheric concave surface (i.e., the optical surfaces 909) on one side facing the subject and a convex surface (i.e., the optical surfaces 910) on the other side. The fifth lens E5 and the sixth lens E6 are jointed closely and form a cemented lens. The second optical lens group G2 including the fourth, fifth, and sixth lenses E4–E6 has a negative focal length as a whole.

The seventh lens E7 is a positive lens having an aspheric convex surface (i.e., the optical surface 912) on one side facing the subject a positive lens having a convex surface (i.e., the optical surface 913) on the other side. The eighth lens E8 is a positive lens having a convex surface (i.e., the optical surface 914) on one side facing the subject and a concave surface (i.e., the optical surface 915) on the other side. The ninth lens E9 is a negative meniscus lens having a convex surface (i.e., the optical surface 915) on one side facing the subject and a concave surface (i.e., the optical surface 916) on the other side. The eighth lens E8 and ninth lens E9 are jointed closely and form a cemented lens. The tenth lens is a positive lens having a high convex surface (i.e., the optical surface 917) on one side facing the subject and an aspheric convex surface (i.e., the optical surface 918) on the other side. The third optical lens group G3 including the seventh, eighth, ninth, and tenth lenses E7–E10 has a positive focal length as a whole.

In a scaling change from a short focal length limit to a long focal length limit, distances between each optical lens group vary. A distance $D_A$ between the optical surface 905 and the optical surface 906 increases in a scaling change from a short focal length limit to a long focal length limit. A distance $D_B$ between the optical surface 910 and the surface 911 of the aperture plate FA decreases during the same scaling change. A distance $D_C$ between the aperture plate FA and the optical surface 912 also decreases. A distance $D_D$ between the optical surface 918 and the surface 919 of the optical filter/cover FC is smaller at a long focal length limit than at a short focal length limit. In other words, in a scaling change from a short focal length limit to a long focal length limit, the first optical lens group G1, the aperture plate FA, and the third optical lens group G3 move toward the subject, while the second optical lens group. G2 and the optical filter/cover FC are fixed.

According to the fifth embodiment of the present invention, in the zooming lens system, the focal length f of the entire system, the F-stop number F, and the half view angle ω are variable by zooming. The focal length f varies in a range from 4.42 to 20.35, the F-stop number F in a range from 2.89 to 4.62, and the half view angle ω in a range from 39.55 to 9.62. Optical characteristics of the above-mentioned optical surfaces 901–920 of the optical elements are as shown below in Table 9.

TABLE 9

| No. | R | D | $N_d$ | $v_d$ | Element |
|---|---|---|---|---|---|
| 901 | 56.183 | 0.90 | 1.84666 | 23.78 | 1st lens, 1st group |
| 902 | 22.306 | 2.46 | 1.77250 | 49.62 | 2nd lens, 1st group |
| 903 | 129.168 | 0.10 | | | |
| 904 | 19.540 | 1.90 | 1.77250 | 49.62 | 3rd lens, 1st group |
| 905 | 44.088 | $D_A$ | | | |
| 906* | 31.255 | 0.84 | 1.83500 | 42.98 | 4th lens, 2nd group |
| 907 | 3.826 | 2.10 | 1.83500 | 42.98 | 5th lens, 2nd group |
| 908 | 143.581 | 2.45 | | | |
| 909 | −5.555 | 0.74 | 1.83500 | 42.98 | 6th lens, 2nd group |

TABLE 9-continued

| No. | R | D | $N_d$ | $v_d$ | Element |
|---|---|---|---|---|---|
| 910* | −39.380 | $D_B$ | | | |
| 911 | aperture | $D_C$ | | | |
| 912* | 8.333 | 1.80 | 1.58913 | 61.25 | 7th lens, 3rd group |
| 913 | −152.107 | 0.23 | | | |
| 914 | 7.167 | 2.74 | 1.48749 | 70.44 | 8th lens, 3rd group |
| 915 | 14.162 | 0.85 | 1.84666 | 23.78 | 9th lens, 3rd group |
| 916 | 4.894 | 0.24 | | | |
| 917 | 5.782 | 2.02 | 1.48749 | 70.44 | 10th lens, 3rd group |
| 918* | −13.873 | $D_D$ | | | |
| 919 | ∞ | 0.90 | 1.51680 | 64.20 | filter/cover |
| 920 | ∞ | | | | |

In Table 9, numbers in the column "No." represent the numbers of the optical surfaces. The surfaces 906, 910, 912, and 918 indicated with an asterisk mark (*) are aspheric, and their parameters are as indicated below in Table 5A

TABLE 9A

<the optical aspheric surface 906>

K = 0.0,
$A_4$ = 1.84029 × 10$^{-4}$,
$A_6$ = −4.83681 × 10$^{-6}$,
$A_8$ = 1.03688 × 10$^{-7}$,
$A_{10}$ = −1.32922 × 10$^{-9}$

<the optical aspheric surface 910>

K = 0.0,
$A_4$ = −5.53512 × 10$^{-4}$,
$A_6$ = −2.57934 × 10$^{-5}$,
$A_8$ = 1.05288 × 10$^{-6}$,
$A_{10}$ = −1.31801 × 10$^{-7}$

<the optical aspheric surface 912>

K = 0.0,
$A_4$ = −2.23709 × 10$^{-4}$,
$A_6$ = −8.77690 × 10$^{-7}$,
$A_8$ = 3.19167 × 10$^{-7}$,
$A_{10}$ = −1.93115 × 10$^{-8}$

<the optical aspheric surface 918>

K = 0.0,
$A_4$ = 8.00477 × 10$^{-4}$,
$A_6$ = 2.50817 × 10$^{-6}$,
$A_8$ = 5.14171 × 10$^{-7}$,
$A_{10}$ = −1.09665 × 10$^{-7}$

In Table 5, $D_A$ represents a distance between the first optical lens group G1 and the second optical lens group G2. Likewise, $D_B$ represents a distance between the second optical lens group G2 and the aperture plate FA. $D_C$ represents a distance between the aperture plate FA and the third optical lens group G3, and $D_D$ represents a distance between the third optical lens group G3 and the optical filter FC. These distances $D_A$, $D_B$, $D_C$, and $D_D$ are variable by zooming, as indicated below in Table 10.

TABLE 10

| | $f_S$ = 4.425 | $f_M$ = 9.488 | $f_L$ = 20.350 |
|---|---|---|---|
| $D_A$ | 1.000 | 7.240 | 14.505 |
| $D_B$ | 8.095 | 3.256 | 1.200 |
| $D_C$ | 4.494 | 2.617 | 1.000 |
| $D_D$ | 7.045 | 9.488 | 12.498 |

In Table 10, $f_S$ is a short focal length limit, $f_M$ is a medium focal length limit, and $f_L$ is a long focal length limit.

In addition, the optical elements of the zooming lens system satisfy the following equations:

$Y'_{max}/f_W$=0.791, $((1-N_{2I}) \times X_{2I}(H_{0.8}))/Y'_{max}$=0.00732, $((N_{2O}-1) \times X_{2O}(H_{0.8})+(1-N_{2I}) \times X_{2I}(H_{0.8}))/Y'_{max}$=0.01593, $(D_{12T}-D_{12W})/f_T$=0.664, $(D_{23W}-D_{23T})/f_T$=0.510, $|f_2|/f_3$=0.689, and $|f_1|/f_W$=8.00, where $Y'_{max}$ represents a maximum image height (for example, 3.50 mm), $f_W$ represents an image magnification of the whole optical system at a wide-angle limit, $N_{2I}$ represents a refractive index of the meniscus lens on the image side in the second optical lens group G2 (i.e., the sixth lens E6), $X_{2I}(H_{0.8})$ represents an aspheric mount on 80% of maximum light effective height on the surface on the most image side in the second optical lens group G2 (i.e., the optical surface 910), $N_{2O}$ represents a refractive index of the meniscus lens on the subject side in the second optical lens group G2 (i.e., the fourth lens E4), $X_{2O}(H_{0.8})$ represents an aspheric mount on 80% of maximum light effective height on the surface on the most subject side in the second optical lens group G2 (i.e., the optical surface 906), $D_{12T}$ represents a distance between the first optical lens group G1 and the second optical lens group G2 at a telescopic limit, $D_{12W}$ represents a distance between the first optical lens group G1 and the second optical lens group G2 at a wide-angle limit, $D_{23W}$ represents a distance between the second optical lens group G2 and the third optical lens group G3 at a wide-angle limit, $D_{23T}$ represents a distance between the second optical lens group G2 and the third optical lens group G3 at a telescopic limit, $f_T$ represents a focal length of the whole optical system at a telescopic limit, f1 represents a focal length of the first optical lens group G1, f2 represents a focal length of the second optical lens group G2, and f3 represents a focal length of the third optical lens group G3.

Figure 10A:
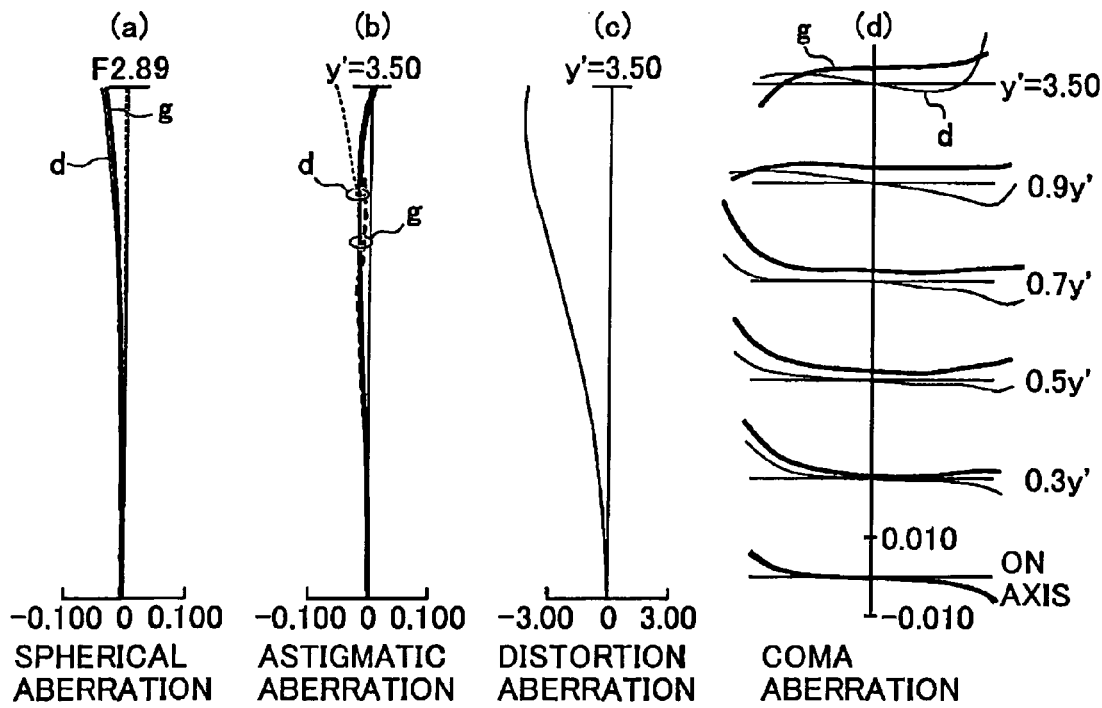
Figure 10B:
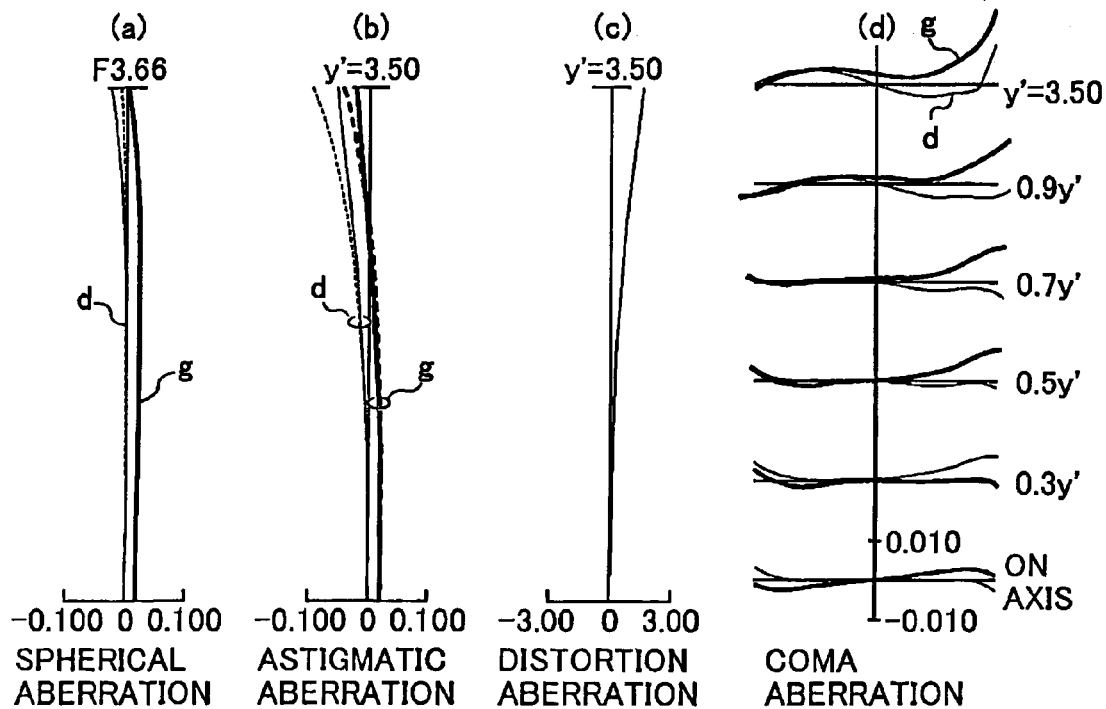

FIG. 10A show graphs of aberration curves that correspond to a spherical aberration (a), an astigmatic aberration (b), a distortion aberration (c), and a coma aberration (d), measured at the short focal length limit of the zooming lens system of FIG. 9A. Likewise, FIG. 10B shows these aberration curves at the medium focal length limit of FIG. 9B, and FIG. 10C shows the aberration curves at the long focal length limit of the zooming lens system of FIG. 9C. In each spherical aberration graph (a) of FIGS. 10A–10C, a thin solid line indicated by a letter "d" represents a spherical aberration curve of a d-line, a thick solid line indicated by a letter "g" represents a spherical aberration curve of a g-line, and a thin chain line represents a sine condition. In each astigmatic aberration graph (b) of FIGS. 10A–10C, a thin solid line indicated by the letter "d" represents an astigmatic aberration curve of the d-line and a thin dotted line indicated by the letter "g" represents an astigmatic aberration of a sagittal ray. Further, each distortion aberration graph (c) of FIGS. 10A–10C represents a distortion aberration. In each coma aberration graph (d) of FIGS. 6A–6C, a thin solid line indicated by the letter "d" represents a coma aberration curve of the d-line and a thick solid line indicated by the letter "g" represents a coma aberration curve of the g-line. Horizontal axes of the graphs (a)–(c) in FIGS. 10A–10C represent a relative value V of aberrations. Vertical axes of the graphs (a) in FIGS. 10A–10C and horizontal axes of the graphs (d) in FIGS. 10A–10C represent a ratio of a pupil height (i.e., the F-stop number). Vertical axes of the graphs (b)–(c) in FIGS. 10A–10C represent a ratio of image heights.

Figure 11A:
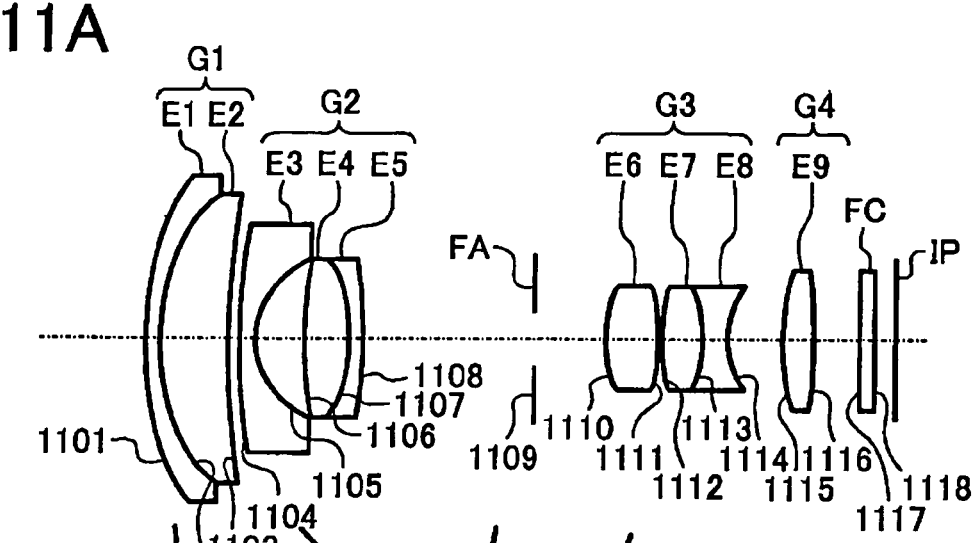
FIGS. 11A–11C are schematic diagrams of a zooming lens apparatus according to a sixth embodiment of the present invention, at a short focal length limit (FIG. 11A), at a middle focal length (FIG. 11B), and at a long focal length limit (FIG. 11C)
Figure 11B:
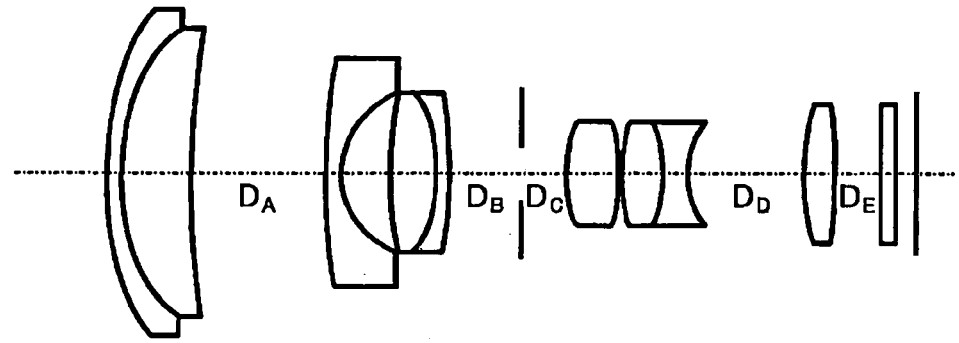
Figure 11C:
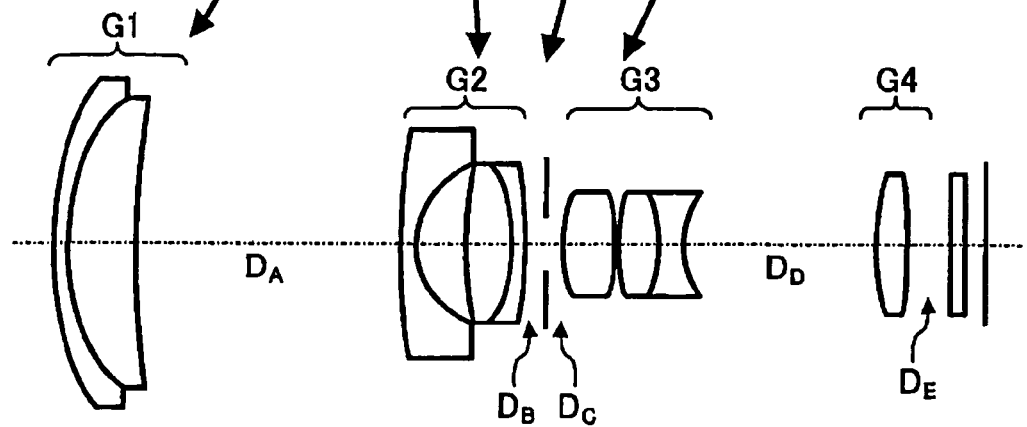

FIGS. 11A–11C show a sixth embodiment of a zooming lens system at a short focal length limit, at a middle focal length, and at a long focal length limit, respectively. According to the sixth embodiment of the present invention, the zooming lens system includes various optical elements including a first lens E1, a second lens E2, a third lens E3, a fourth lens E4, a fifth lens E5, a sixth lens E6, a seventh lens E7, an eighth lens E8, a ninth lens E9, an aperture plate FA, and an optical filter/cover FC. In this example, the first lens E1 and the second lens E2 form a first optical lens group G1. The third lens E3, the fourth lens E4 and the fifth lens E5 form a second optical lens group G2. The sixth lens E6, the seventh lens E7 and the eighth lens E8 form a third optical lens group G3. The ninth lens E9 forms a fourth optical lens group G4. The lenses included in each of the first, second, third and fourth optical lens groups G1–G4 are supported by a common supporting frame or the like and are integrally moved during a zooming operation of the zooming lens system. FIGS. 11A–11C schematically show with arrows the travel path of the first, second, third and fourth optical lens groups G1–G4 from a limit of a short focal length (i.e., a wide-angle limit) to a limit of a long focal length (i.e., a telescopic limit) via a medium focal length.

In addition, FIGS. 11A–11C also show optical surfaces of the above-mentioned optical elements. That is, the first lens E1 has an optical surface 1101 on one side facing a subject, which is not shown but is positioned left in the drawing, and an optical surface 1102 on the other side. The second lens E2 has an optical surface which is conjoined with the optical surface 1102 and an optical surface 1103 on the other side. The third lens E3 has an optical surface 1104 on one side facing the subject and an optical surface 1105 on the other side. The fourth lens E4 has an optical surface 1106 on one side facing the subject and an optical surface 1107 on the other side. The fifth lens E5 has an optical surface which is conjoined with the optical surface 1107, on one side facing the subject, and an optical surface 1108 on the other side. The aperture plate FA has an optical surface 1109 on one side facing the subject. The sixth lens E6 has an optical surface 1110 on one side facing the subject, and an optical surface 1111 on the other side. The seventh lens E7 has an optical surface 1112 on one side facing the subject and an optical surface 1113 on the other side. The eighth lens E8 has an optical surface which is conjoined with the optical surface 1113 on one side facing the subject and an optical surface 1114 on the other side. The ninth lens E9 has an optical surface 1115 on one side facing the subject and an optical surface 1116 on the other side. The optical filter/cover FC has an optical surface 1117 on one side facing the subject and an optical surface 1118 on the other side.

The first lens E1 is a negative meniscus lens having a convex surface (i.e., the optical surface 1101) on one side facing the subject. The second lens E2 is a positive meniscus lens having a convex surface (i.e., the optical surface 1102) on one side facing the subject. The first lens E1 and the second lens E2 are jointed closely and form a cemented lens. The first optical lens group G1 including the first and second lenses E1–E2 has a positive focal length as a whole.

The third lens E3 is a negative meniscus lens having an aspheric convex surface (i.e., the optical surface 1104) on one side facing the subject and a deep concave surface (i.e., the optical surface 1105) on the other side. The fourth lens E4 is a positive lens having a convex surface (i.e., the optical surface 1106) on one side facing the subject and a high convex surface (i.e., the optical surface 1107) on the other side. The fifth lens E5 is a negative lens having a deep concave surface (i.e., the optical surface 1107) on one side facing the subject and an aspheric surface (i.e., the optical surface 1108) on the other side. The fourth lens E4 and fifth lens E5 are jointed closely and form a cemented lens. The second optical lens group G2 including the fourth and fifth lenses E4–E5 has a negative focal length as a whole.

The sixth lens E6 is a positive lens having aspheric convex surfaces (i.e., the optical surfaces 1110 and 1111) on both sides. The seventh lens E7 is a positive lens having a convex surface (i.e., the optical surface 1112) on one side facing the subject and a high convex surface (i.e., the optical surface 1113) on the other side. The eighth lens E8 is a negative lens having concave surfaces (i.e., the optical surface 1113 and 1114) on both sides. The seventh lens E7 and eighth lens E8 are jointed closely and form a cemented lens. The third optical lens group G3 including the sixth, seventh and eighth lenses E6–E8 has a positive focal length as a whole.

The ninth lens E9 is a positive lens having an aspheric high convex surface (i.e., the optical surface 1115) on one side facing the subject and a convex surface (i.e., the optical surface 1116). The fourth optical lens group G4 including the fourth lens E9 has a positive focal length.

In a scaling change from a short focal length limit to a long focal length limit, distances between each optical lens group vary. A distance $D_A$ between the optical surface 1103 and the optical surface 1104 increases in a scaling change from a short focal length limit to a long focal length limit. In contrast, a distance $D_B$ between the optical surface 1108 and the surface 1109 of the aperture plate decreases during the same scaling change. A distance $D_C$ between the aperture plate FA and the optical surface 1110 also decreases. A distance $D_D$ between the optical surface 1114 the optical surface 1115 increases during the scaling change. A distance $D_E$ between the optical surface 1116 and the surface 1117 of the optical filter/cover FC is smaller at a long focal length limit than at a short focal length limit. In a scaling change from a short focal length limit to a long focal length limit, the first optical lens group G1, the aperture plate FA, and the third optical lens group G3 move toward the subject constantly. The second optical lens group G2 moves towards the image plane EP, while the optical filter/cover FC is fixed. The fourth lens group G4 is positioned nearer to the image plane IP at long focal length limit than at a short focal length limit.

According to the sixth embodiment of the present invention, in the zooming lens system, the focal length f of the entire system, the F-stop number F, and the half view angle ω are variable by zooming. The focal length f varies in a range from 4.74 to 21.55, the F-stop number F in a range from 3.61 to 4.80, and the half view angle ω in a range from 39.16 to 9.64. Optical characteristics of the above-mentioned optical surfaces 1101–1118 of the optical elements are as shown below in Table 11.

TABLE 11

| No. | R | D | $N_d$ | $v_d$ | Element |
|---|---|---|---|---|---|
| 1101 | 18.565 | 0.90 | 1.92286 | 20.88 | 1st lens, 1st group |
| 1102 | 12.194 | 3.90 | 1.72342 | 37.99 | 2nd lens, 1st group |
| 1103 | 58.393 | $D_A$ | | | |

TABLE 11-continued

| No. | R | D | $N_d$ | $v_d$ | Element |
|---|---|---|---|---|---|
| 1104* | 70.501 | 0.84 | 1.83500 | 42.98 | 3rd lens, 2nd group |
| 1105 | 4.859 | 2.42 | | | |
| 1106 | 24.219 | 2.54 | 1.76182 | 26.61 | 4th lens, 2nd group |
| 1107 | −9.529 | 0.74 | 1.83500 | 42.98 | 5th lens, 2nd group |
| 1108* | −247.508 | $D_B$ | | | |
| 1109 | aperture | $D_C$ | | | |
| 1110* | 8.333 | 3.01 | 1.58913 | 61.25 | 6th lens, 3rd group |
| 1111* | −10.376 | 0.10 | | | |
| 1112 | 12.420 | 2.34 | 1.75500 | 52.32 | 7th lens, 3rd group |
| 1113 | −7.111 | 1.35 | 1.68893 | 31.16 | 8th lens, 3rd group |
| 1114 | 4.591 | $D_D$ | | | |
| 1115* | 13.631 | 1.66 | 1.58913 | 61.25 | 9th lens, 4th group |
| 1116 | −45.606 | $D_E$ | | | |
| 1117 | ∞ | 0.90 | 1.51680 | 64.20 | filter/cover |
| 1118 | ∞ | | | | |

In Table 3, numbers in the column "No." represent the numbers of the optical surfaces. The surfaces 1104, 1108, 1110, 1111, and 1115 indicated with a suffix of an asterisk mark (*) are aspheric, and their parameters are as indicated below in Table 3A

TABLE 11A

<the optical aspheric surface 1104>

K = 0.0,
$A_4$ = 1.78565 × 10$^{-4}$,
$A_6$ = −1.75390 × 10$^{-6}$,
$A_8$ = 6.61261 × 10$^{-9}$,
$A_{10}$ = 1.23143 × 10$^{-11}$
<the optical aspheric surface 1108>

K = 0.0,
$A_4$ = −3.04000 × 10$^{-4}$,
$A_6$ = −7.18126 × 10$^{-6}$,
$A_8$ = 1.05398 × 10$^{-7}$,
$A_{10}$ = −2.21354 × 10$^{-8}$
<the optical aspheric surface 1110>

K = 0.0,
$A_4$ = −6.40609 × 10$^{-4}$,
$A_6$ = −7.03343 × 10$^{-6}$,
$A_8$ = 8.98513 × 10$^{-7}$,
$A_{10}$ = −9.73391 × 10$^{-8}$
<the optical aspheric surface 1111>

K = 0.0,
$A_4$ = 2.20124 × 10$^{-4}$,
$A_6$ = −8.24086 × 10$^{-6}$,
$A_8$ = 1.09927 × 10$^{-6}$,
$A_{10}$ = −1.05069 × 10$^{-7}$
<the optical aspheric surface 1115>

K = 0.0,
$A_4$ = −5.79936 × 10$^{-5}$,
$A_6$ = 8.76394 × 10$^{-6}$,
$A_8$ = −2.58155 × 10$^{-7}$,
$A_{10}$ = 4.31238 × 10$^{-9}$

In Table 11, $D_A$ represents a distance between the first optical lens group G1 and the second optical lens group G2. Likewise, $D_B$ represents a distance between the second optical lens group G2 and the aperture plate FA. $D_C$ represents a distance between the aperture plate FA and the third optical lens group G3, and $D_D$ represents a distance between the third optical lens group G3 and the fourth optical lens group G4, and $D_E$ is a distance between the fourth optical lens group G4 and the optical filter FC. These distances $D_A$, $D_B$, $D_C$, $D_D$ and $D_E$ are varied by zooming, as indicated below in Table 4.

TABLE 12

| | $f_S$ = 4.738 | $f_M$ = 10.103 | $f_L$ = 21.545 |
|---|---|---|---|
| $D_A$ | 0.600 | 7.679 | 15.059 |
| $D_B$ | 10.083 | 4.179 | 1.200 |
| $D_C$ | 4.076 | 2.608 | 1.000 |
| $D_D$ | 3.075 | 6.493 | 10.666 |
| $D_E$ | 2.597 | 2.591 | 2.553 |

In Table 12, $f_S$ is short focal length limit, $f_M$ is a medium focal length limit, and $f_L$ is a long focal length limit.

In addition, the optical elements of the zooming lens system satisfy the following equations;

$Y'_{max}/f_W = 0.781$, $((1-N_{2I}) \times X_{2I}(H_{0.8}))/Y'_{max} = 0.00923$, $((N_{2O}-1) \times X_{2O}(H_{0.8}) + (1-N_{2I}) \times X_{2I}(H_{0.8}))/Y'_{max} = 0.02940$, $(D_{12T}-D_{12W})/f_T = 0.671$, $(D_{23W}-D_{23T})/f_T = 0.555$, $|f_2|/f_3 = 0.860$, and $|f_1|/f_W = 9.35$, where $Y'_{max}$ represents a maximum image height (for example, 3.70 mm), $f_W$ represents an image magnification of the whole optical system at a wide-angle limit, $N_{2I}$ represents a refractive index of the meniscus lens on the image side in the second optical lens group G2 (i.e., the fifth lens E5), $X_{2I}(H_{0.8})$ represents an aspheric mount on 80% of maximum light effective height on the surface on the most image side in the second optical lens group G2 (i.e., the optical surface 1108), $N_{2O}$ represents a refractive index of the meniscus lens on the subject side in the second optical lens group G2 (i.e., the third lens E3), $X_{2O}(H_{0.8})$ represents an aspheric mount on 80% of maximum light effective height on the surface on the most subject side in the second optical lens group G2 (i.e., the optical surface 1104), $D_{12T}$ represents a distance between the first optical lens group G1 and the second optical lens group G2 at a telescopic limit, $D_{12W}$ represents a distance between the first optical lens group G1 and the second optical lens group G2 at a wide-angle limit, $D_{23W}$ represents a distance between the second optical lens group G2 and the third optical lens group G3 at a wide-angle limit, $D_{23T}$ represents a distance between the second optical lens group G2 and the third optical lens group G3 at a telescopic limit, $f_T$ represents a focal length of the whole optical system at a telescopic limit, f1 represents a focal length of the first optical lens group G1, f2 represents a focal length of the second optical lens group G2, and f3 represents a focal length of the third optical lens group G3.

Figure 12A:
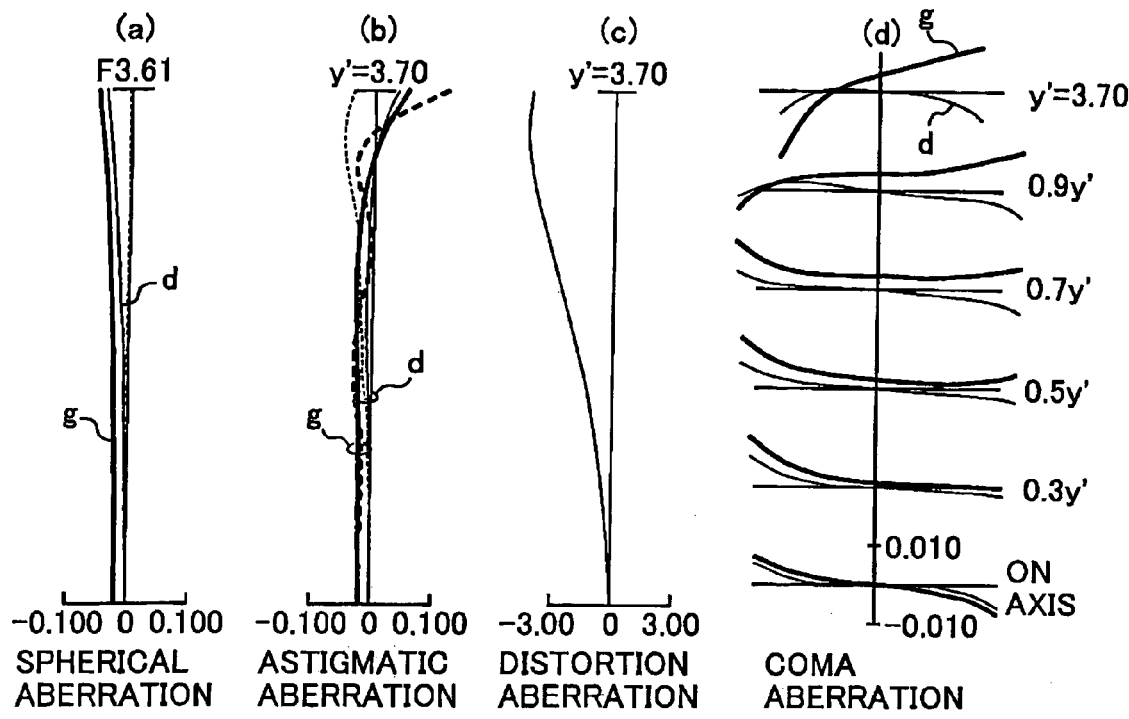
Figure 12B:
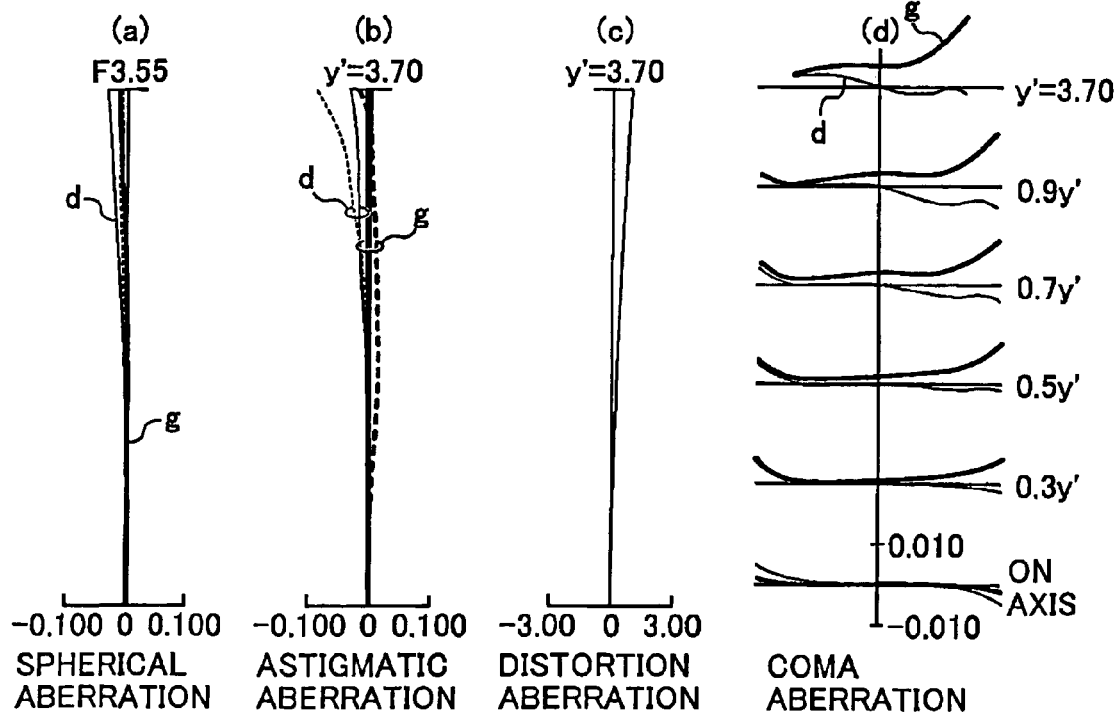

FIG. 12A show graphs of aberration curves that correspond to a spherical aberration (a), an astigmatic aberration (b), a distortion aberration (c), and a coma aberration (d), measured at the short focal length limit of the zooming lens system of FIG. 11A. Likewise, FIG. 12B shows these aberration curves at the medium focal length limit of FIG. 11B, and FIG. 12C shows the aberration curves at the long focal length limit of the zooming lens system of FIG. 11C. In each spherical aberration graph (a) of FIGS. 12A–12C, a thin solid line indicated by a letter "d" represents a spherical aberration curve of a d-line, a thick solid line indicated by a letter "g" represents a spherical aberration curve of a g-line, and a thin chain line represents a sine condition. In each astigmatic aberration graph (b) of FIGS. 12A–12C, a thin solid line indicated by the letter "d" represents an astigmatic aberration curve of the d-line and a thin dotted line indicated by the letter "g" represents an astigmatic aberration of a sagittal ray. Further, each graph (c) of FIGS. 12A–12C represents a distortion aberration. In each coma aberration graph (d) of FIGS. 12A–12C, a thin solid line indicated by the letter "d" represents a coma aberration curve of the d-line and a thick solid line indicated by the letter "g" represents a coma aberration curve of the g-line. Horizontal axes of the graphs (a)–(c) in FIGS. 12A–12C represent a relative value V of aberrations. Vertical axes of the graphs (a) in FIGS. 12A–12C and horizontal axes of the graphs (d) in FIGS. 12A–12C represent a ratio of a pupil height (i.e., the F-stop number). Vertical axes of the graphs (b)–(c) in FIGS. 12A–12C represent a ratio of image heights.

Figure 13A:
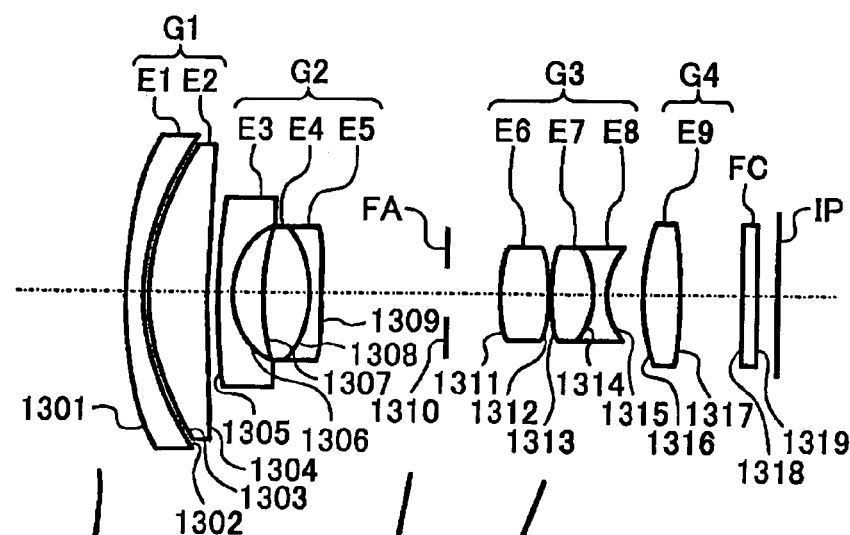
FIGS. 13A–13C are schematic diagrams of a zooming lens apparatus according to a seventh embodiment of the present invention, at a short focal length limit (FIG. 13A), at a middle focal length (FIG. 13B), and at a long focal length limit (FIG. 13C)
Figure 13B:
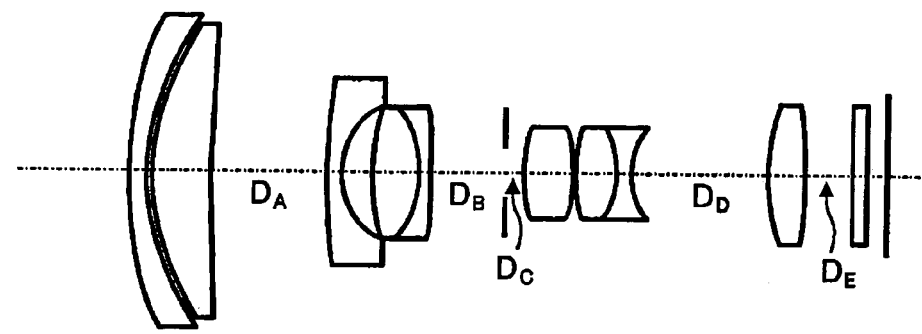
Figure 13C:
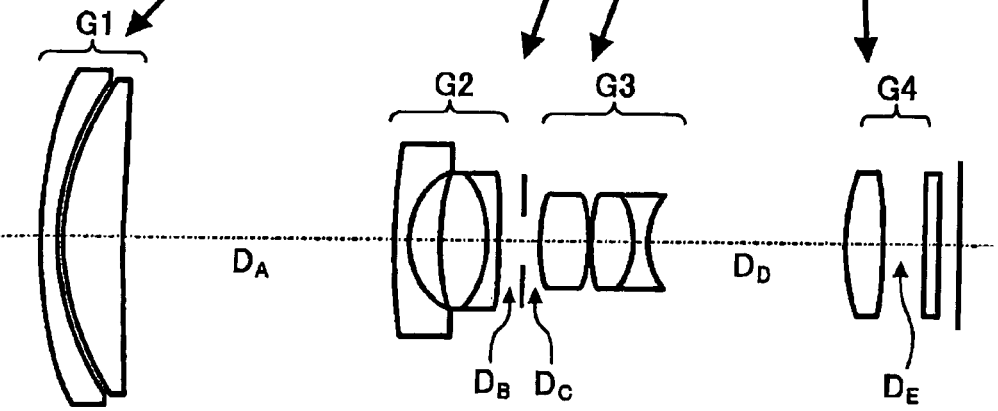

FIGS. 13A–13C show a seventh embodiment of a zooming lens system at a short focal length limit, at a middle focal length, and at a long focal length limit, respectively. According to the seventh embodiment of the present invention, the zooming lens system includes various optical elements including a first lens E1, a second lens E2, a third lens E3, a fourth lens E4, a fifth lens E5, a sixth lens E6, a seventh lens E7, an eighth lens E8, a ninth lens E9 made of optical plastic, an aperture plate FA, and an optical filter/cover FC. In this example, the first lens E1 and the second lens E2 form a first optical lens group G1. The third lens E3, the fourth lens E4, and the fifth lens E5 form a second optical lens group G2. The sixth lens E6, the seventh lens E7, and the eighth lens E8 form a third optical lens group G3. The ninth lens E9 forms a fourth optical lens group G4. The lenses included in each of the first, second, third and fourth optical lens groups G1–G4 are supported by a common supporting frame or the like and are integrally movable during a zooming operation of the zooming lens system. FIGS. 13A–13C schematically shows with arrows the travel paths of the first, second, third, and fourth optical lens groups G1–G4 from a limit of a short focal length to a limit of a long focal length via a medium focal length.

In addition, FIGS. 13A–13C also shows optical surfaces of the above-mentioned optical elements. That is, the first lens E1 has an optical surface 1301 on one side facing a subject, and an optical surface 1302 on the other side. The second lens E2 has an optical surface 1303 on one side facing the subject and an optical surface 1304 on the other side. The third lens E3 has an optical surface 1305 on one side facing the subject and an optical surface 1306 on the other side. The fourth lens E4 has an optical surface 1307 on one side facing the subject and an optical surface 1308 on the other side. The fifth lens E5 has an optical surface which is conjoined with the optical surface 1308, on one side facing the subject, and an optical surface 1309 on the other side. The aperture plate FA has an optical surface 1310 on one side facing the subject. The sixth lens E6 has an optical surface 1311 on one side facing the subject, and an optical surface 1312 on the other side. The seventh lens E7 has an optical surface 1313 on one side facing the subject and an optical surface 1314 on the other side. The eighth lens E8 has an optical surface which is conjoined with the optical surface 1314, on one side facing the subject and an optical surface 1315 on the other side. The ninth lens E9 has an optical surface 1316 on one side facing the subject and an optical surface 1317 on the other side. The optical filter/ cover FC has an optical surface 1318 on one side facing the subject and an optical surface 1319 on the other side.

In the zooming lens system of FIGS. 13A–13C, the optical elements are arranged in order of increasing distance to a subject; the first lens E1, the second lens E2, the third lens E3, the fourth lens E4, the fifth lens E5, the aperture plate FA, the sixth lens E6, the seventh lens E7, the eighth lens E8, the ninth lens E9, and the optical filter/cover FC. Through these optical elements, an image of the subject is formed at the image plane IP behind the optical filter/cover FC.

The first lens E1 is a negative meniscus lens having a convex surface (i.e., the optical surface 1301) on one side facing the subject. The second lens E2 is a positive meniscus lens having a convex surface (i.e., the optical surface 1303) on one side facing the subject. The first optical lens group G1 including the first and second lenses E1–E2 has a positive focal length as a whole.

The third lens E3 is a negative meniscus lens having an aspheric convex surface (i.e., the optical surface 1305) on one side facing the subject and a deep concave surface (i.e., the optical surface 1306) on the other side. The fourth lens E4 is a positive lens having a convex surface (i.e., the optical surface 1307) on one side facing the subject and a high convex surface (i.e., the optical surface 1308) on the other side. The fifth lens E5 is a negative lens having a deep concave surface (i.e., the optical surface 1308) on one side facing the subject and an aspheric surface (i.e., the optical surface 1309) on the other side. The fourth lens E4 and fifth lens E5 are jointed closely and form a cemented lens. The second optical lens group G2 including the fourth and fifth lenses E4–E5 has a negative focal length as a whole.

The sixth lens E6 is a positive lens having aspheric convex surfaces (i.e., the optical surfaces 1311 and 1312) on both sides. The seventh lens E7 is a positive lens having a convex surface (i.e., the optical surface 1313) on one side facing the subject and a high convex surface (i.e., the optical surface 1314) on the other side. The eighth lens E8 is a negative lens having concave surfaces (i.e., the optical surface 1314 and 1315) on both sides. The fourth lens E4 and fifth lens E5 are jointed closely and form a cemented lens. The third optical lens group G3 including the sixth, seventh, and eighth lenses E6–E8 has a positive focal length as a whole.

The ninth lens E9 is a positive lens having an aspheric high convex surface (i.e., the optical surface 1316) on one side facing the subject and a convex surface (i.e., the optical surface 1317). The fourth optical lens group G4 including the fourth lens E9 has a positive focal length.

In a scaling change from a short focal length limit to a long focal length limit, distances between each optical lens group vary. A distance $D_A$ between the optical surface 1304 and the optical surface 1305 increases in a scaling change from a short focal length limit to a long focal length limit. A distance $D_B$ the optical surface 1309 and the surface 1310 of the aperture plate FA decreases during the same scaling change. A distance $D_C$ between the aperture plate FA and the optical surface 1311 also decreases. A distance $D_D$ between the optical surface 1315 and the optical surface 1316 increases during the scaling change. A distance $D_E$ between the optical surface 1317 and surface 1318 is smaller at a long focal length limit than at a short focal length limit. In other words, in a scaling change from a short focal length limit to a long focal length limit, the first optical lens group G1, the aperture plate, and the third optical lens group G3 move toward the subject constantly. Meanwhile, the second optical lens group G2 and the optical filter/cover FC are fixed. The fourth lens group G4 is positioned nearer to the image plane IP at the long focal length limit than at the short focal length limit.

According to the seventh embodiment of the present invention, in the zooming lens system, the focal length f of the entire system, the F-stop number F, and the half view angle ω are variable by zooming. The focal length f varies in a range from 4.74 to 21.59, the F-stop number F in a range from 3.32 to 4.98, and the half view angle ω in a range from 39.14 to 9.55. Optical characteristics of the above-mentioned optical surfaces 1301–1319 of the optical elements are as shown below in Table 13.

TABLE 13

| No. | R | D | $N_d$ | $v_d$ | Element |
|---|---|---|---|---|---|
| 1301 | 23.330 | 1.00 | 1.84666 | 23.80 | 1st lens, 1st group |
| 1302 | 15.002 | 0.26 | | | |
| 1303 | 15.442 | 3.47 | 1.77250 | 49.60 | 2nd lens, 1st group |
| 1304 | 135.649 | $D_A$ | | | |
| 1305* | 91.446 | 0.84 | 1.83481 | 42.70 | 3rd lens, 2nd group |
| 1306 | 4.439 | 1.77 | | | |
| 1307 | 15.704 | 2.67 | 1.74077 | 27.80 | 4th lens, 2nd group |
| 1308 | −6.205 | 0.74 | 1.83481 | 42.70 | 5th lens, 2nd group |
| 1309* | 632.018 | $D_B$ | | | |
| 1310 | aperture | $D_C$ | | | |
| 1311* | 8.333 | 2.78 | 1.58913 | 61.15 | 6th lens, 3rd group |
| 1312* | −8.607 | 0.10 | | | |
| 1313 | 15.588 | 2.42 | 1.83481 | 42.70 | 7th lens, 3rd group |
| 1314 | −4.691 | 0.80 | 1.69895 | 30.10 | 8th lens, 3rd group |
| 1315 | 4.498 | $D_D$ | | | |
| 1316* | 12.500 | 2.21 | 1.54340 | 56.00 | 9th lens, 4th group |
| 1317 | −34.711 | $D_E$ | | | |
| 1318 | ∞ | 0.90 | 1.51680 | 64.20 | filter/cover |
| 1319 | ∞ | | | | |

In Table 13, numbers in the column "No." represent the numbers of the optical surfaces, and the surfaces 1305, 1309, 1311, 1312 and 1316 indicated with a suffix of an asterisk mark (*) are aspheric and their parameters are as indicated below in Table 1A

TABLE 13A

<the optical aspheric surface 1305>

$K = 0.0$,
$A_4 = 2.42400 \times 10^{-4}$,
$A_6 = -2.92208 \times 10^{-6}$,
$A_8 = 9.40210 \times 10^{-9}$,
$A_{10} = -4.16456 \times 10^{-11}$ <the optical aspheric surface 1309>

$K = 0.0$,
$A_4 = -5.16761 \times 10^{-4}$,
$A_6 = 1.81605 \times 10^{-6}$,
$A_8 = -1.01642 \times 10^{-6}$,
$A_{10} = -1.75699 \times 10^{-8}$ <the optical aspheric surface 1311>

$K = 0.0$,
$A_4 = -1.08496 \times 10^{-3}$,
$A_6 = -2.17192 \times 10^{-5}$,
$A_8 = 5.79037 \times 10^{-6}$,
$A_{10} = -5.25493 \times 10^{-7}$ <the optical aspheric surface 1312>

$K = 0.0$,
$A_4 = 4.85474 \times 10^{-4}$,
$A_6 = -4.49460 \times 10^{-5}$,
$A_8 = 8.98429 \times 10^{-6}$,
$A_{10} = -5.68154 \times 10^{-7}$ <the optical aspheric surface 1316>

$K = 0.0$,
$A_4 = -5.46424 \times 10^{-5}$,
$A_6 = 1.80637 \times 10^{-5}$,

TABLE 13A-continued $A_8 = -9.17793 \times 10^{-7}$,
$A_{10} = 2.09899 \times 10^{-8}$ In Table 13, $D_A$ represents a distance between the first optical lens group G1 and the second optical lens group G2. Likewise, $D_B$ represents a distance between the second optical lens group G2 and the aperture plate FA. $D_C$ represents a distance between the aperture plate FA and the third optical lens group G3, and $D_D$ represents a distance between the third optical lens group G3 and the fourth optical lens group G4, and $D_E$ is a distance between the fourth optical lens group G4 and the optical filter FC. These distances $D_A$, $D_B$, $D_C$, $D_D$, and $D_E$ are varied by zooming, as indicated below in Table 14.

TABLE 14

| | $f_S = 4.740$ | $f_M = 10.131$ | $f_L = 21.591$ |
|---|---|---|---|
| $D_A$ | 0.600 | 6.655 | 15.680 |
| $D_B$ | 7.051 | 4.217 | 1.200 |
| $D_C$ | 3.043 | 1.054 | 1.000 |
| $D_D$ | 2.000 | 7.725 | 10.995 |
| $D_E$ | 3.484 | 2.583 | 2.382 |

In Table 2, $f_S$ is a short focal length limit, $f_M$ is a medium focal length limit, and $f_L$ is a long focal length limit.

In addition, the optical elements of the zooming lens system satisfy the following equations;

$Y'_{max}/f_W = 0.781$, $((1-N_{2I}) \times X_{2I}(H_{0.8}))/Y'_{max} = 0.00536$, $((N_{2O}-1) \times X_{2O}(H_{0.8}) + (1-N_{2I}) \times X_{2I}(H_{0.8}))/Y'_{max} = 0.01951$, $(D_{12T}-D_{12W})/f_T = 0.698$, $(D_{23W}-D_{23T})/f_T = 0.366$, $|f_2|/f_3 = 0.792$, and $|f_1|/f_W = 8.44$, where $Y'_{max}$ represents a maximum image height (for example, 3.70 mm), $f_W$ represents an image magnification of the whole optical system at a wide-angle limit, $N_{2I}$ represents a refractive index of the meniscus lens on the image side in the second optical lens group G2 (i.e., the fifth lens E5), $X_{2I}(H_{0.8})$ represents an aspheric mount on 80% of maximum light effective height on the surface on the most image side in the second optical lens group G2 (i.e., the optical surface 1309), $N_{2O}$ represents a refractive index of the meniscus lens on the subject side in the second optical lens group G2 (i.e., the third lens E3), $X_{2O}(H_{0.8})$ represents an aspheric mount on 80% of maximum light effective height on the surface on the most subject side in the second optical lens group G2 (i.e., the optical surface 1305), $D_{12T}$ represents a distance between the first optical lens group G1 and the second optical lens group G2 at a telescopic limit, $D_{12W}$ represents a distance between the first optical lens group G1 and the second optical lens group G2 at a wide-angle limit, $D_{23W}$ represents a distance between the second optical lens group G2 and the third optical lens group G3 at a wide-angle limit, $D_{23T}$ represents a distance between the second optical lens group G2 and the third optical lens group G3 at a telescopic limit, $f_T$ represents a focal length of the whole optical system at a telescopic limit, f1 represents a focal length of the first optical lens group G1, f2 represents a focal length of the second optical lens group G2, and f3 represents a focal length of the third optical lens group G3.

Figure 14A:
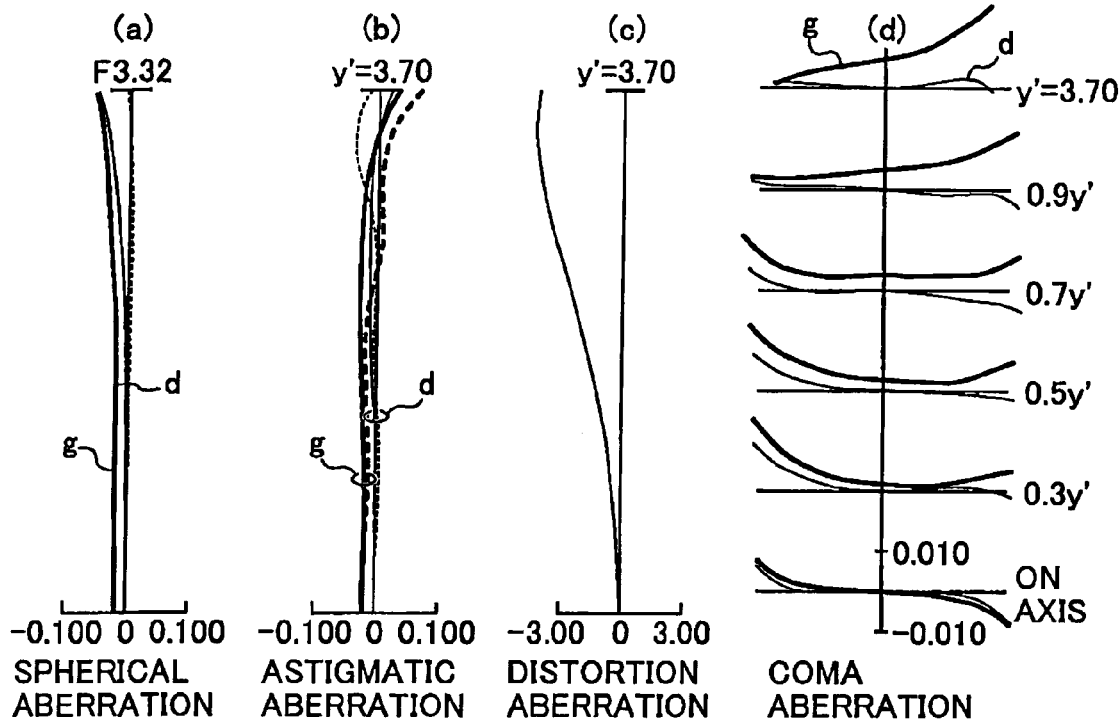
Figure 14B:
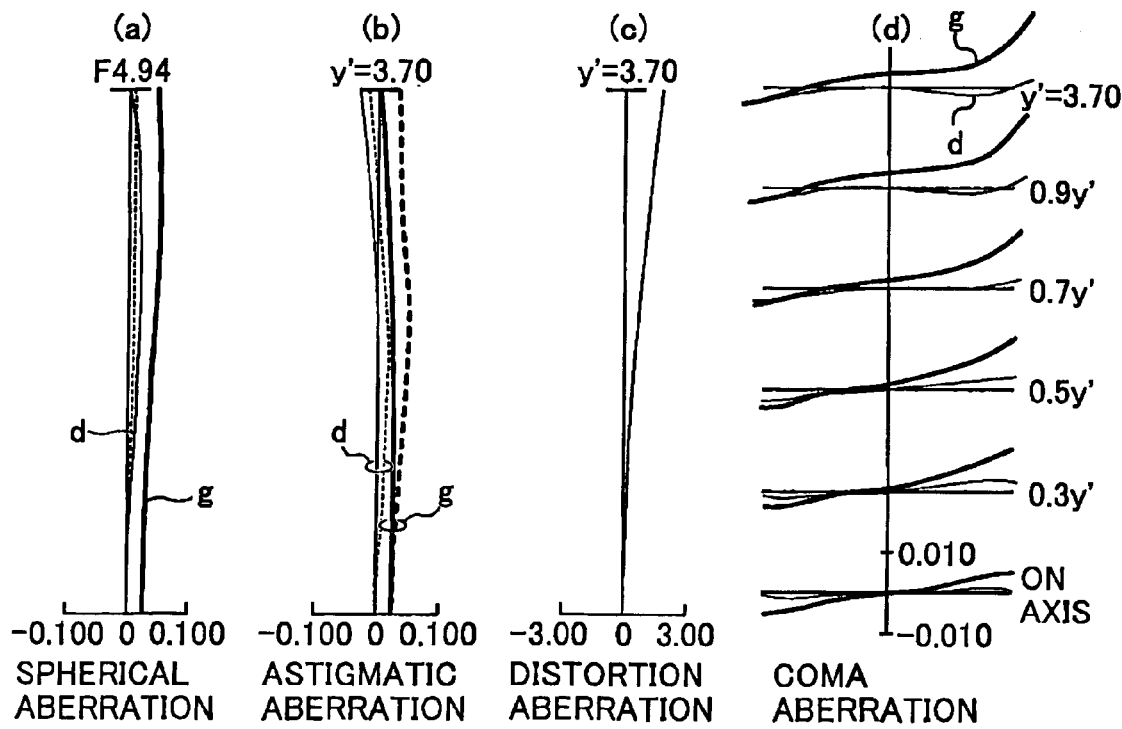

FIG. 14A show graphs of aberration curves that correspond to a spherical aberration (a), an astigmatic aberration (b), a distortion aberration (c), and a coma aberration (d), measured at the short focal length limit of the zooming lens system of FIG. 13A. Likewise, FIG. 14B show these aberration curves at the medium focal length limit of FIG. 13B, and FIG. 14C show the aberration curves at the long focal length limit of the zooming lens system of FIG. 13C. In each spherical aberration graph (a) of FIGS. 14A–14C, a thin solid line indicated by a letter "d" represents a spherical aberration curve of a d-line, a thick solid line indicated by a letter "g" represents a spherical aberration curve of a g-line, and a thin chain line represents a sine condition. In each astigmatic aberration graph (b) of FIGS. 14A–14C, a thin solid line indicated by the letter "d" represents an astigmatic aberration curve of the d-line and a thin dotted line indicated by the letter "g" represents an astigmatic aberration of a sagittal ray. Further, each graph (c) of FIGS. 14A–14C represents a distortion aberration. In each coma aberration graph (d) of FIGS. 14A–14C, a thin solid line indicated by the letter "d" represents a coma aberration curve of the d-line and a thick solid line indicated by the letter "g" represents a coma aberration curve of the g-line. Horizontal axes of the graphs (a)–(c) in FIGS. 14A–14C represent a relative value V of aberrations. Vertical axes of the graphs (a) in FIGS. 14A–14C and horizontal axes of the graphs (d) in FIGS. 14A–14C represent a ratio of a pupil height (i.e., the F-stop number). Vertical axes of the graphs (b)–(c) in FIGS. 14A–14C represent a ratio of image heights.

Figure 15A:
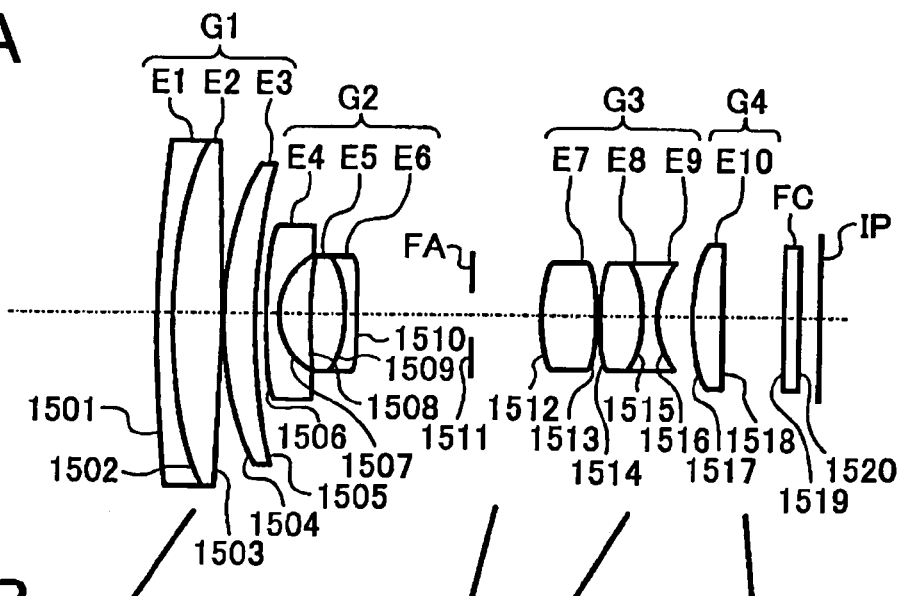
FIGS. 15A–15C are schematic diagrams of a zooming lens apparatus according to an eighth embodiment of the present invention, at a short focal length limit (FIG. 15A), at a middle focal length (FIG. 15B), and at a long focal length limit (FIG. 15C)
Figure 15B:
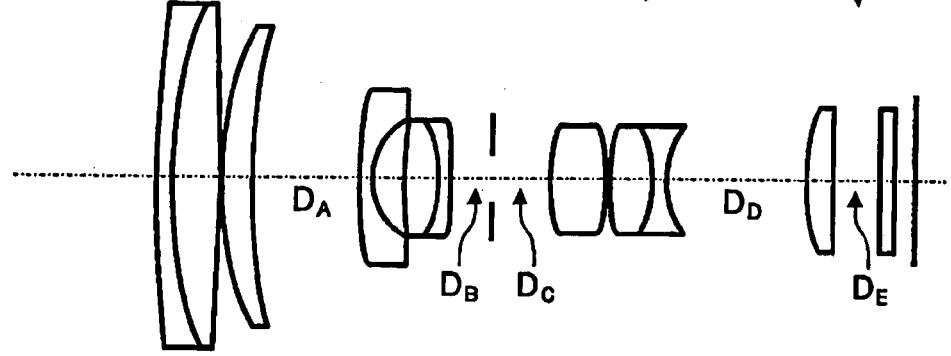
Figure 15C:
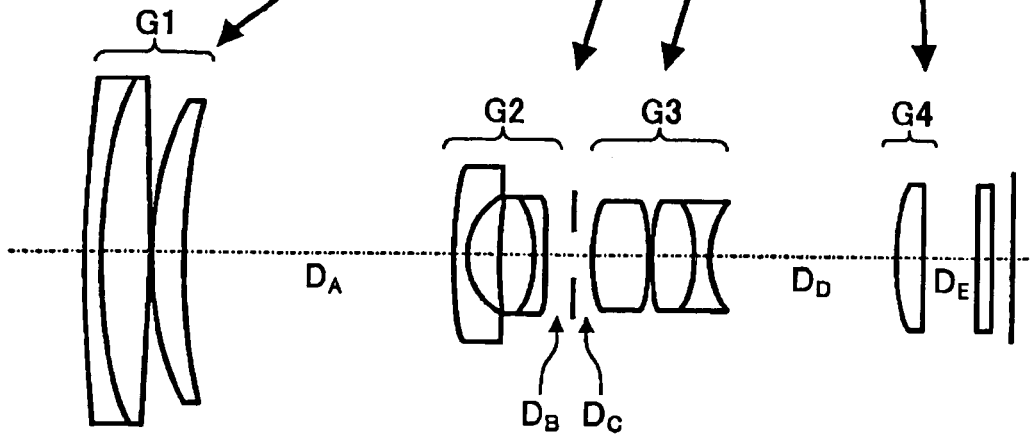

FIGS. 15A–15C show a eighth embodiment of a zooming lens system at a short focal length limit, at a middle focal length, and at a long focal length limit, respectively. According to the eighth embodiment of the present invention, the zooming lens system includes various optical elements including a first lens E1, a second lens E2, a third lens E3, a fourth lens E4, a fifth lens E5, a sixth lens E6, a seventh lens E7, an eighth lens E8, a ninth lens E9, a tenth lens E10, an aperture plate FA, and an optical filter/cover FC. In this example, the first lens E1, the second lens E2, and the third lens E3 form a first optical lens group G1. The fourth lens E4, the fifth lens E5, and the sixth lens E6 form a second optical lens group G2. The seventh lens E7, the eighth lens E8, and the ninth lens E9 form a third optical lens group G3. The tenth lens E10 forms a fourth optical lens group G4. The lenses included in each of the first, second, third and fourth optical lens groups G1–G4 are supported by a common supporting frame or the like and are integrally moved during a zooming operation of the zooming lens system. FIGS. 15A–15C schematically shows with arrows travel paths of the first, second, third, and fourth optical lens groups G1–G4 from a limit of a short focal length (i.e., a wide-angle limit) to a limit of a long focal length (i.e., a telescopic limit) via a medium focal length.

In addition, FIGS. 15A–15C also shows optical surfaces of the above-mentioned optical elements. That is, the first lens E1 has an optical surface 1501 on one side facing a subject, which is not shown but is positioned left in the drawing, and an optical surface 1502 on the other side. The second lens E2 has an optical surface which is conjoined with the optical surface 1502 and an optical surface 1503 on the other side. The third lens E3 has an optical surface 1504 on one side facing the subject and an optical surface 1505 on the other side. The fourth lens E4 has an optical surface 1506 on one side facing the subject and an optical surface 1507 on the other side. The fifth lens E5 has an optical surface 1508 on one side facing the subject and an optical surface 1509 on the other side. The sixth lens E6 has an optical surface which is conjoined with the optical surface 1509 on one side facing the subject, and an optical surface 1510 on the other side. The aperture plate FA has an optical surface 1511 on one side facing the subject. The seventh lens E7 has an optical surface 1512 on one side facing the subject and an optical surface 1513 on the other side. The eighth lens E8 has an optical surface 1514 on one side facing the subject and an optical surface 1515 on the other side. The ninth lens E9 has an optical surface which is conjoined with the optical surface 1515 on one side facing the subject and an optical surface 1516 on the other side. The tenth lens E10 has an optical surface 1517 on one side facing the subject and an optical surface 1518 on the other side. The optical filter/cover FC has an optical surface 1519 on one side facing the subject and an optical surface 1520 on the other side.

The first lens E1 is a negative meniscus lens having a convex surface (i.e., the optical surface 1501) on one side facing the subject. The second lens E2 is a positive lens having a high convex surface (i.e., the optical surface 1502) on one side facing the subject and a convex surface (i.e., the optical surface 1503) on the other side. The first lens E1 and the second lens E2 are jointed closely and form a cemented lens. The third lens E3 is a positive meniscus lens having a convex surface (i.e., the optical surface 1504) on one side facing the subject. The first optical lens group G1 including the first, second, and third lenses E1–E3 has a positive focal length as a whole.

The fourth lens E4 is a negative meniscus lens having an aspheric convex surface (i.e., the optical surface 1506) on one side facing the subject and a deep concave surface (i.e., the optical surface 1507) on the other side. The fifth lens E5 is a positive lens having a convex surface (i.e., the optical surface 1508) on one side facing the subject and a high convex surface (i.e., the optical surface 1509). The sixth lens E6 is a negative meniscus lens having a deep concave surface (i.e., the optical surfaces 1509) on one side facing the subject and a concave surface (i.e., the optical surfaces 1510) on the other side. The fifth lens E5 and the sixth lens E6 are jointed closely and form a cemented lens. The second optical lens group G2 including the fourth, fifth and sixth lenses E4–E6 has a negative focal length as a whole.

The seventh lens E7 is a positive lens having aspheric convex surfaces (i.e., the optical surface 1512 and 1513) on both sides. The eighth lens E8 is a positive lens having a convex surface (i.e., the optical surface 1514) on one side facing the subject and a high convex surface (i.e., the optical surface 1515) on the other side. The ninth lens E9 is a negative lens having concave surfaces.(i.e., the optical surfaces 1515 and 1516) on both sides. The eighth lens E8 and ninth lens E9 are jointed closely and form a cemented lens. The third optical lens group G3 including the seventh, eighth, and ninth lenses E7–E9 has a positive focal length as a whole.

The tenth lens is a positive lens having a high aspheric convex surface (i.e., the optical surface 1517) on one side facing the subject and a convex surface (i.e., the optical surface 1517) on the other side. The fourth optical lens group G4 including the tenth lens E10 has a positive focal length.

In a scaling change from a short focal length limit to a long focal length limit, distances between each optical lens group vary. A distance $D_A$ between the optical surface 1505 and the optical surface 1506 increases in a scaling change from a short focal length limit to a long focal length limit. A distance $D_B$ between the optical surface 1510 and the surface 1511 of the aperture plate FA decreases during the same scaling change. A distance $D_C$ between the aperture plate FA and the optical surface 1512 also decreases. A distance $D_D$ between the optical surface 1516 and the optical surface 1517 increases during the scaling change. A distance $D_E$ between the optical surface 1518 and the surface 1519, is smaller at a long focal length limit than at a short focal length limit. In other words, in a scaling change from a short focal length limit to a long focal length limit, the first optical lens group G1, the aperture plate FA, and the third optical lens group G3 move toward the subject constantly. The second optical lens group G2 and the optical filter/cover FC are fixed. The fourth lens group G4 is positioned nearer to the image plane IP at long focal length limit than at a short focal length limit.

According to the eighth embodiment of the present invention, in the zooming lens system, the focal length f of the entire system, the F-stop number F, and the half view angle ω are variable by zooming. The focal length f varies in a range from 4.74 to 21.62, the F-stop number F in a range from 3.42 to 4.99, and the half view angle ω in a range from 39.12 to 9.50. Optical characteristics of the above-mentioned optical surfaces 1501–1520 of the optical elements are as shown below in Table 15.

TABLE 15

| No. | R | D | $N_d$ | $v_d$ | Element |
|---|---|---|---|---|---|
| 1501 | 96.656 | 0.90 | 1.84666 | 23.78 | 1st lens, 1st group |
| 1502 | 29.314 | 2.72 | 1.77250 | 49.62 | 2nd lens, 1st group |
| 1503 | −219.341 | 0.10 | | | |
| 1504 | 20.153 | 1.80 | 1.77250 | 49.62 | 3rd lens, 1st group |
| 1505 | 33.538 | DA | | | |
| 1506* | 18.011 | 0.84 | 1.83500 | 42.98 | 4th lens, 2nd group |
| 1507 | 3.936 | 2.07 | 1.83500 | 42.98 | 5th lens, 2nd group |
| 1508 | 74.837 | 1.95 | | | |
| 1509 | −9.146 | 0.74 | 1.80420 | 46.50 | 6th lens, 2nd group |
| 1510* | 759.807 | DB | | | |
| 1511 | Aperture | DC | | | |
| 1512* | 8.333 | 3.34 | 1.58913 | 61.25 | 7th lens, 3rd group |
| 1513* | −8.827 | 0.10 | 1.58913 | 61.25 | 8th lens, 3rd group |
| 1514 | 12.236 | 2.45 | | | |
| 1515 | −7.054 | 0.80 | 1.69895 | 30.05 | 9th lens, 3rd group |
| 1516 | 4.892 | DD | | | |
| 1517* | 10.651 | 1.83 | 1.58913 | 61.25 | 10th lens, 4th group |
| 1518 | −261.223 | DE | | | |
| 1519 | ∞ | 0.90 | 1.51680 | 64.20 | filter/cover |
| 1520 | ∞ | | | | |

In Table 15, numbers in the column "No." represent the numbers of the optical surfaces. The surfaces 1506, 1510, 1512, 1513, and 1517 indicated with a suffix of an asterisk mark (*) are aspheric, and their parameters are as indicated below in Table 5A

TABLE 15A

<the optical aspheric surface 1506>

$K = 0.0$,
$A_4 = -8.08791 \times 10^{-5}$,
$A_6 = -2.03124 \times 10^{-6}$,
$A_8 = 6.26638 \times 10^{-9}$,
$A_{10} = -6.12352 \times 10^{-11}$
<the optical aspheric surface 1510>

$K = 0.0$,
$A_4 = -7.52609 \times 10^{-4}$,
$A_6 = -124401 \times 10^{-5}$,
$A_8 = -9.65466 \times 10^{-7}$,
$A_{10} = -8.33332 \times 10^{-8}$ TABLE 15A-continued <the optical aspheric surface 1512>

$K = 0.0$,
$A_4 = -7.07947 \times 10^{-4}$,
$A_6 = -1.16179 \times 10^{-6}$,
$A_8 = 6.72505 \times 10^{-8}$,
$A_{10} = -2.53913 \times 10^{-8}$
<the optical aspheric surface 1513>

$K = 0.0$,
$A_4 = 3.43658 \times 10^{-4}$,
$A_6 = -1.44022 \times 10^{-6}$,
$A_8 = -1.33484 \times 10^{-7}$,
$A_{10} = -1.40822 \times 10^{-8}$
<the optical aspheric surface 1517>

$K = 0.0$,
$A_4 = -4.75410 \times 10^{-5}$,
$A_6 = 1.15429 \times 10^{-5}$,
$A_8 = -4.87258 \times 10^{-7}$,
$A_{10} = 9.54084 \times 10^{-9}$ In Table 15, $D_A$ represents a distance between the first optical lens group G1 and the second optical lens group G2. Likewise, $D_B$ represents a distance between the second optical lens group G2 and the aperture plate FA. $D_C$ represents a distance between the aperture plate FA and the third optical lens group G3, and $D_D$ represents a distance between the third optical lens group G3 and the fourth optical lens group G4, and $D_E$ is a distance between the fourth optical lens group G4 and the optical filter FC. These distances $D_A$, $D_B$, $D_C$, $D_D$, and $D_E$ are variable by zooming, as indicated below in Table 16.

TABLE 16

| | $f_S = 4.741$ | $f_M = 10.112$ | $f_L = 21.624$ |
|---|---|---|---|
| $D_A$ | 0.600 | 6.160 | 15.040 |
| $D_B$ | 6.288 | 2.111 | 1.200 |
| $D_C$ | 3.888 | 3.173 | 1.000 |
| $D_D$ | 2.000 | 7.785 | 11.065 |
| $D_E$ | 3.440 | 2.547 | 2.351 |

In Table 16, $f_S$ is a short focal length limit, $f_M$ is a medium focal length limit, and $f_L$ is a long focal length limit.

In addition, the optical elements of the zooming lens system satisfy the following equations;

$Y'_{max}/f_W = 0.780$, $((1-N_{2I}) \times X_{2I}(H_{0.8}))/Y'_{max} = 0.00728$, $((N_{2O}-1) \times X_{2O}(H_{0.8}) + (1-N_{2I}) \times X_{2I}(H_{0.8}))/Y'_{max} = 0.00080$, $(D_{12T}-D_{12W})/f_T = 0.668$, $(D_{23W}-D_{23T})/f_T = 0.369$, $|f_2|/f_3 = 0.795$, and $|f_1|/f_W = 8.14$, where $Y'_{max}$ represents a maximum image height (for example, 3.70 mm), $f_W$ represents an image magnification of the whole optical system at a wide-angle limit, $N_{2I}$ represents a refractive index of the meniscus lens on the image side in the second optical lens group G2 (i.e., the fifth lens E5), $X_{2I}(H_{0.8})$ represents an aspheric mount on 80% of maximum light effective height on the surface on the most image side in the second optical lens group G2 (i.e., the optical surface 1509), $N_{2O}$ represents a refractive index of the meniscus lens on the subject side in the second optical lens group G2 (i.e., the third lens E3), $X_{2O}(H_{0.8})$ represents an aspheric mount on 80% of maximum light effective height on the surface on the most subject side in the second optical lens group G2 (i.e., the optical surface 1505), $D_{12T}$ represents a distance between the first optical lens group G1 and the second optical lens group G2 at a telescopic limit, $D_{12W}$ represents a distance between the first optical lens group G1 and the second optical lens group G2 at a wide-angle limit, $D_{23W}$ represents a distance between the second optical lens group G2 and the third optical lens group G3 at a wide-angle limit, $D_{23T}$ represents a distance between the second optical lens group G2 and the third optical lens group G3 at a telescopic limit, $f_T$ represents a focal length of the whole optical system at a telescopic limit, $f_1$ represents a focal length of the first optical lens group G1, $f_2$ represents a focal length of the second optical lens group G2, and $f_3$ represents a focal length of the third optical lens group G3.

Figure 16A:
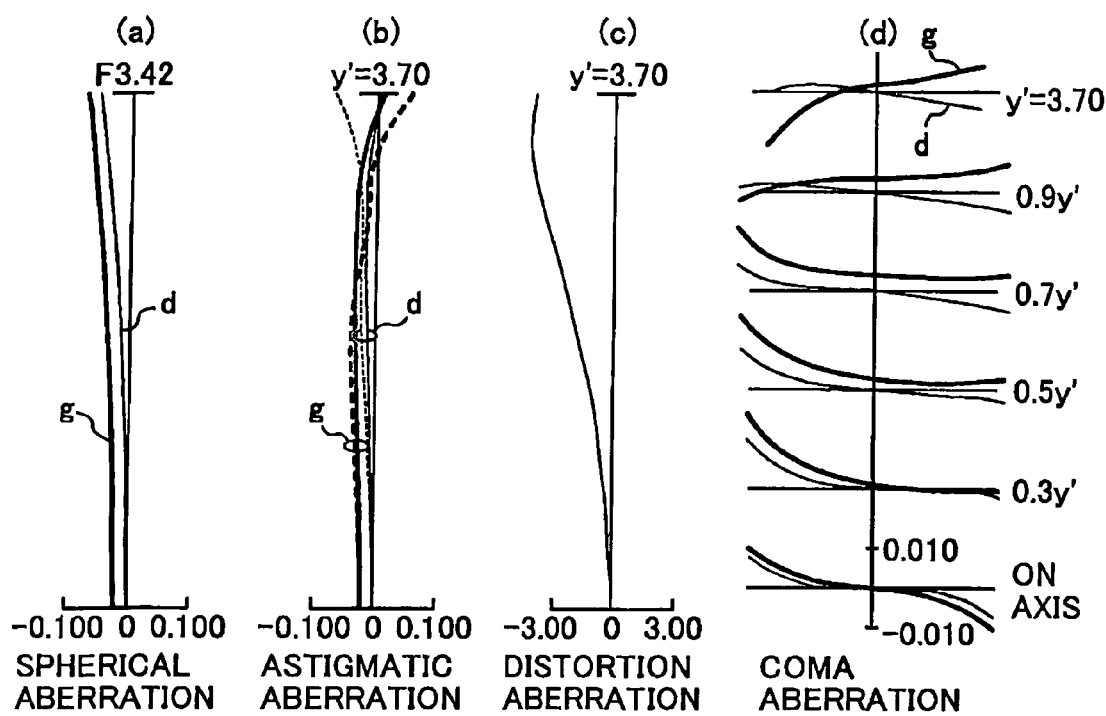
Figure 16B:
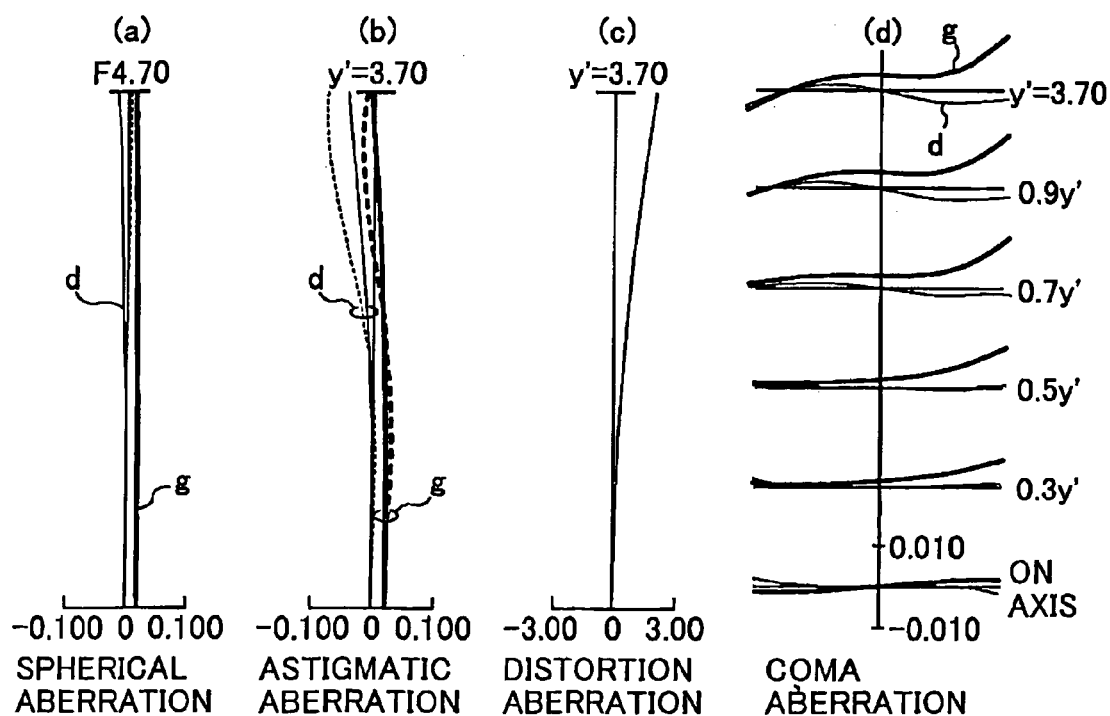

FIG. 16A show graphs of aberration curves that correspond to a spherical aberration (a), an astigmatic aberration (b), a distortion aberration (c), and a coma aberration (d), measured at the short focal length limit of the zooming lens system of FIG. 15A. Likewise, FIG. 16B shows these aberration curves at the medium focal length limit of FIG. 15B, and FIG. 16C shows the aberration curves at the long focal length limit of the zooming lens system of FIG. 15C. In each spherical aberration graph (a) of FIGS. 16A–16C, a thin solid line indicated by a letter "d" represents a spherical aberration curve of a d-line, a thick solid line indicated by a letter "g" represents a spherical aberration curve of a g-line, and a thin chain line represents a sine condition. In each astigmatic aberration graph (b) of FIGS. 16A–16C, a thin solid line indicated by the letter "d" represents an astigmatic aberration curve of the d-line and a thin dotted line indicated by the letter "g" represents an astigmatic aberration of a sagittal ray. Further, each graph (c) of FIGS. 16A–16C represents a distortion aberration. In each coma aberration graph (d) of FIGS. 16A–16C, a thin solid line indicated by the letter "d" represents a coma aberration curve of the d-line and a thick solid line indicated by the letter "g" represents a coma aberration curve of the g-line. Horizontal axes of the graphs (a)–(c) in FIGS. 16A–16C represent a relative value V of aberrations. Vertical axes of the graphs (a) in FIGS. 16A–16C and horizontal axes of the graphs (d) in FIGS. 16A–16C represent a ratio of a pupil height (i.e., the F-stop number). Vertical axes of the graphs (b)–(c) in FIGS. 16A–16C represent a ratio of image heights.

The zooming lens systems of the fifth embodiment to the eighth embodiment have several advantageous characteristics and effects, as described below. The zooming lens apparatus preferably satisfies an inequality condition $0.70 < Y'_{max}/f_W < 1.00$, where $Y'_{max}$ represents a maximum image height, and $f_W$ represents an image magnification of the whole optical system at a wide-angle limit. If $Y'_{max}/f_W$ is less than 0.70, then a half angle view of more than 30 degree at a wide-angle limit is difficult to achieve. If $Y'_{max}/f_W$ is more than 1.00, then off-axis aberrations become difficult to correct, and the first optical lens group G1 must be of a larger size.

The zoom lens apparatus preferably satisfies an inequality condition $0.0010 < (1-N_{2I}) \times X_{2I}(H_{0.8})/Y'_{max} < 0.0500$, wherein $N_{2I}$ represents a refractive index of the meniscus lens on the image side in the second optical lens group G2, $X_{2I}(H_{0.8})$ represents an aspheric mount on 80% of maximum light effective height on the surface on the most image side in the second optical lens group G2, and $Y'_{max}$ represents a maximum image height. If $(1-N_{2I}) \times X_{2I}(H_{0.8})/Y'_{max}$ is less than 0.0010 or more than 0.0500, then it becomes difficult to correct a spherical aberration, an astigmatic aberration, a distortion aberration, and a coma aberration in a balanced manner. Also, high focusing ability at a wide-angle limit becomes impaired.

The zoom lens system preferably satisfies an inequality condition $-0.0500 < \{(N_{2O}-1) \times X_{2O}(H_{0.8}) + (1-N_{2I}) \times X_{2I}(H_{0.8})\}/Y'_{max} < 0.1500$, where $N_{2O}$ represents a refractive index of the meniscus lens on the subject side in the second optical lens group G2, $X_{2O}(H_{0.8})$ represents an aspheric mount on 80% of maximum light effective height on the surface on the most subject side in the second optical lens group G2, $N_{2I}$ represents a refractive index of the meniscus lens on the image side in the second optical lens group G2, $X_{2I}(H_{0.8})$ represents an aspheric mount on 80% of maximum light effective height on the surface on the most image side in the second optical lens group G2, and $Y'_{max}$ represents a maximum image height. If $\{(N_{2O}-1) \times X_{2O}(H_{0.8}) + (1-N_{2I}) \times X_{2I}(H_{0.8})\}/Y'_{max}$ is less than 0.0500, then a distortion aberration may exist, resulting in a lack of correction or unnatural shape having an inflection point. If $\{(N_{2O}-1) \times X_{2O}(H_{0.8}) + (1-N_{2I}) \times X_{2I}(H_{0.8})\}/Y'_{max}$ is more than 0.1500, then a distortion aberration becomes over-corrected, and an off-axis aberrations also becomes difficult to correct.

For correction of color aberration, the zooming lens system satisfies the following inequality conditions:

$1.76 < N_{21} < 1.90$, $35 < v_{21} < 50$,
$1.65 < N_{22} < 1.90$, $20 < v_{22} < 35$, and
$1.75 < N_{23} < 1.90$, $35 < v_{23} < 50$, where $N_{2i}$ represents a refractive index of a lens at an i-th position i-th closest to the subject in the second optical lens group G2, and $v_{2i}$ represents an Abbe number of a lens at an i-th position i-th closest to the subject in said second optical lens group G2.

The zooming lens system preferably satisfies an inequality condition $-3.5 < R_{2c}/Y'_{max} < -1.0$, wherein $R_{2c}$ represents a curvature radius of the jointed surface of said jointed lenses, and $Y'_{max}$ represents a maximum image height. If $R_{2c}/Y'_{max}$ is less than $-3.5$, then a curvature of the jointed surface may become more moderate, and a flexibility of generating an aberration on the jointed surface becomes smaller. On the other hand, if $R_{2c}/Y'_{max}$ is more than $-1.0$, then a curnature of the jointed surface become too strong, and off-axis aberrations may occur to correct aberrations in other lens.

The zoom lens system preferably satisfies an inequality condition $0.50 < (D_{12T}-D_{12W})/f_T < 0.85$, and more preferably $0.60 < (D_{12T}-D_{12W})/f_T < 0.75$, where $D_{12T}$ represents a distance between the first optical lens group G1 and the second optical lens group G2 at a telescopic limit, $D_{12W}$ represents a distance between the first optical lens group G1 and the second optical lens group G2 at a wide-angle limit, and $f_T$ represents a focal length of the whole optical system at a telescopic limit. If $(D_{12T}-D_{12W})/f_T$ is less than 0.50, then the scaling share of the second optical lens group G2 decreases, which requires the third optical lens group to have more scaling share, or requires the first and second optical lens group to have more refractive power. Either situation is undesirable. Additionally, this condition would make the height of light flux passage through the first optical lens group G1 higher, which requires the first optical lens group G1 to be bigger. On the other hand, if $(D_{12T}-D_{12W})/f_T$ is more than 0.85, then the length of the zooming lens system may become too short at the wide-angle limit or too long at the telescopic limit. A length that is too short can limit a travel distance of the third optical lens group G3 and can make a scaling share of the third optical lens group G3 too small to correct an aberration. A length that is too long can require the equipment using the zooming lens to be larger in size.

The zoom lens system preferably satisfies an inequality condition $0.25<(D_{23W}-D_{23T})/f_T<0.65$, and more preferably $0.30<(D_{23W}-D_{23T})/f_T<0.60$, wherein $D_{23W}$ represents a distance between the second optical lens group G2 and the third optical lens group G3 at a wide-angle limit, $D_{23T}$ represents a distance between the second optical lens group G2 and the third optical, lens group G3 at a telescopic limit, and $f_T$ represents a focal length of the whole optical system at a telescopic limit. If $(D_{23W}-D_{23T})/f_T$ is less than 0.25, then the scaling share of the third optical lens group G3 decreases and, consequently, the second optical lens group would be required to have more scaling share, or the third optical lens group G3 would need more refractive power. In any case, aberrations may be become more serious. If $(D_{23W}-D_{23T})/f_T$ is more than 0.65, then the length of the zooming lens system becomes longer, and the height of light flux passage through the first optical lens group becomes higher, which requires the first optical lens group G1 to be larger.

The zoom lens system satisfies an inequality condition $0.5<|f_2|/f_3<0.65$, where f2 represents a focal length of the second optical lens group G2, and f3 represents a focal length of the third optical lens group G3.

The zoom lens system preferably satisfies an inequality condition $6.0<f_1/f_W<12.0$, where $f_1$ represents a focal length of the first optical lens group G1, and $f_W$ represents an image magnification of the whole optical system at a wide-angle limit. If $f_1/f_W$ is less than 6.0, then an imaging magnification of the second optical lens group G2 approaches a same magnification and increases its efficiency of scaling, which is beneficial for a high scaling rate. However, such a condition may require each lens in the first optical lens group to have more refractive power, which can worsen color aberrations and make lenses undesirably large. On the other hand, if $f_1/f_W$ is more than 12.0, then a scaling share of the second optical lens group G2 may become too small to scale at a high rate.

Figure 17A:
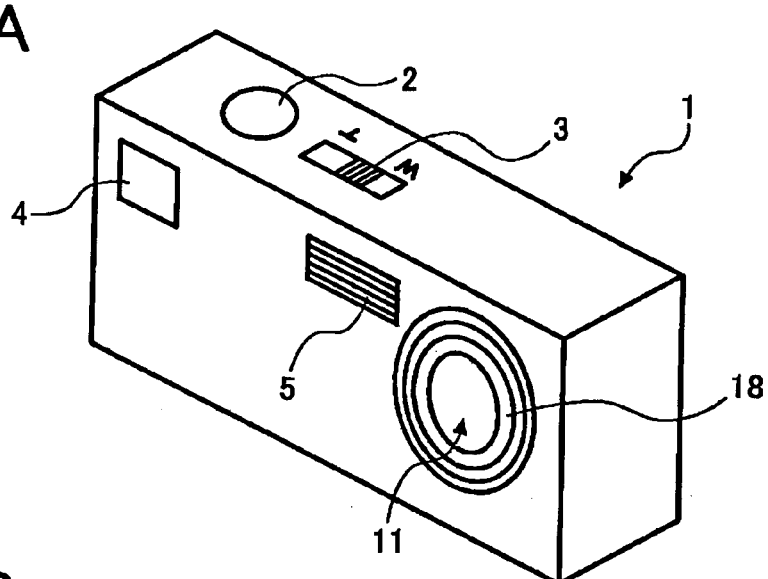
FIGS. 17A–17C are perspective diagrams of a digital camera according to an embodiment of the present invention.
Figure 17B:
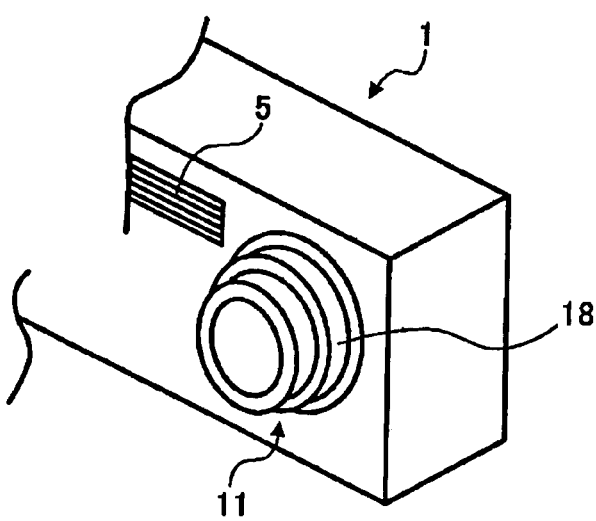
Figure 17C:
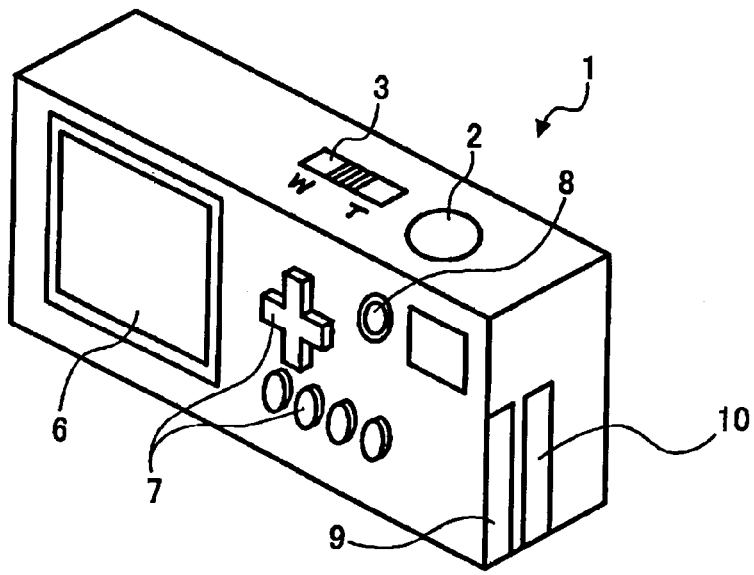
Figure 18:
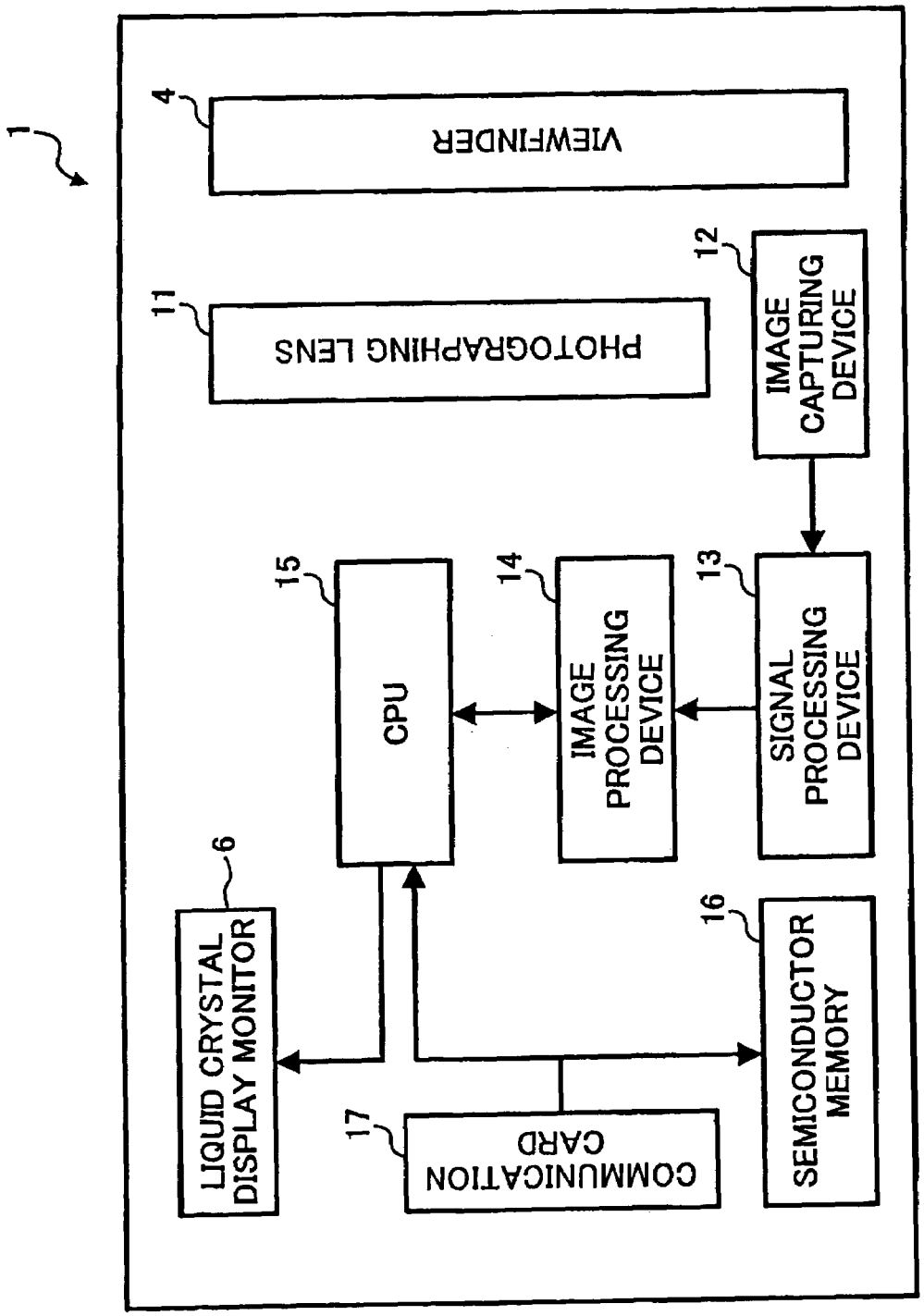
FIG. 18 is a schematic block diagram of the digital camera of FIGS. 17A–17C.

Referring to FIGS. 17A–17C and 18, a digital still camera 1 according to an exemplary embodiment of the present invention is explained. FIG. 17A is a perspective view of the digital still camera 1 seen from a subject side. FIG. 17B is a perspective partial view of the digital still camera 1 with the zooming lens system of different embodiments described above at its extension state. FIG. 17C shows a perspective view of the digital still camera 1 seen from an opposite side relative to the subject side. FIG. 18 shows a block diagram of the digital still camera 1.

Although device 1 is herein discussed as a camera including a zooming lens system of the present invention, other types of devices can alternatively be used. For example, device 1 can represent a portion of a personal computer, a video camera, or a mobile information device (such as a personal digital assistant device or a cellular phone) that includes a zooming lens system in accordance with an aspect of the present invention.

As shown in FIGS. 17A–17C, the digital still camera 1 includes a zooming lens system 11, which is arranged as one of the zooming lens systems described above and which includes a frame assembly 18. The frame assembly 18 is configured as a telescoping structure that supports the lens groups, aperture plate, and other sub-components of the zooming lens system 11. The frame assembly 18 also allows linear translation of the sub-components of the zooming lens system 11 along an axis during zooming-in and zooming-out operations, in accordance with the aspects of the present invention described above. The digital still camera 1 also includes a shutter button 2, a zoom lever 3, a viewfinder 4, an electronic flash 5, an LCD (liquid crystal display) monitor 6, a plurality of operation keys 7, a power switch 8, a memory card slot 9, and a communications card slot 10. Further, as shown in FIG. 18, the digital still camera 1 includes an image capturing device 12, a signal processing device 13, an image processing device 14, a CPU (central processing unit) 15, a semiconductor memory 16, and a communications card 17.

In the digital still camera 1, the zooming lens system 11 picks up an image of a subject, and the image capturing device 12 includes CCD (charge-coupled device) elements, for example, for serving as an area sensor that reads the image of the subject picked up by the zooming lens system 11.

As shown in FIG. 18, an output from the image capturing device 12 is processed and is converted into digital image information by the signal processing unit 13 which is controlled by the CPU 15. The digital image information output from the signal processing unit 13 is then subjected to a predetermined image processing process performed by the image processing unit 14 which is also controlled by the CPU 15. After the image processing process, the digital image information is stored in the semiconductor memory 16 which is either a memory card inserted in the memory card slot 9 or a memory unit built in the digital still camera 1. The LCD monitor 6 displays an image that is picked up and an image being stored in the semiconductor memory 16. The image stored in the semiconductor memory 16 can be transmitted to external equipment through the communications card 17 inserted in the communications card slot 10.

The zooming lens system 11 is in a retracted state, as shown in FIG. 17A, when the digital still camera 1 is not in an operation state. When the power switch 8 is depressed, the digital still camera 1 is powered on and a zooming mechanism of the zooming lens system 11 is activated so that the zooming lens system 11 is projected from a camera body by movement of the frame assembly 18, as shown in FIG. 17B. At this time, the optical lens groups in the zooming lens system 1 are set to a predetermined arrangement of the short focal length limit, for example, and such arrangement can be changed towards an arrangement of the long focal length limit by manipulating the zoom lever 3. Preferably, the scaling of the viewfinder 4 is also changed according to the change of a view angle of the zooming lens system 11. Alternatively, in the retracted state, all optical lens groups are not necessary set on a same optical axis of the frame assembly 18. For instance, the third optical lens group G3 can be retracted from the optical axis to a position parallel to the first optical lens group G1 and/or the first optical lens group G2 in the retracted state and set onto the optical axis only in the activated state. Such a mechanism can allow for a thinner apparatus when in a retracted configuration.

Focusing is obtained by a half-depression of the shutter button 2. More specifically, focusing is achieved by moving the first optical lens group G1 or the second optical lens group G2, or the image capturing device 12. When the shutter button 2 is further depressed, image shooting is carried out.

The operation keys 7 are used to manipulate the image stored in the semiconductor memory 16 to display it on the LCD monitor 6, or to transmit it to external equipment through the communications card 17, for example.

A novel zoom lens apparatus described above can be arranged in a compact size, for example, having a diagonal size of the image capturing device 12 to be between 6 mm to 9 mm, having a relatively wider half angle of view over 38 degrees, and achieving a reasonably fine resolution for a image capturing device of a 3- to 5-million pixel range.

Numerous additional modifications and variations are possible in light of the above teachings. It is therefore to be understood that within the scope of the appended claims, the disclosure of this patent specification may be practiced otherwise than as specifically described herein. For example, elements and/or features of different illustrative embodiments may be combined with each other and/or substituted for each other within the scope of this disclosure and appended claims.

This patent specification is based on Japanese patent application No. 2004-053631, filed on Feb. 27, 2004, and No. 2004-146191, filed on May 17, 2004, the entire contents of which are incorporated by reference herein.

The invention claimed is:

1. A zooming lens apparatus, comprising:
a first optical lens group having a positive refractive power;
a second optical lens group having a negative refractive power;
an aperture diaphragm, the second optical lens group being arranged between the first optical lens group and the aperture diaphragm;
a third optical lens group having a positive refractive power, the aperture diaphragm being arranged between the second optical lens group and the third optical lens group;
a fourth optical lens group having a positive refractive power, the third optical lens group being arranged between the aperture diaphragm and the fourth optical lens group; and
a frame assembly configured to support the first optical lens group, the second optical lens group, the third optical lens group, the fourth optical lens group, and the aperture diaphragm, the frame assembly being configured to move the first optical lens group and the third optical lens group in a first direction, and to move the fourth optical lens group in a second direction opposite to the first direction, when a scaling of the zooming lens apparatus is changed from a wide-angle limit to a telescopic limit, and the zooming lens apparatus satisfying an inequality condition $0.60<m_{4T}<0.85$, where $m_{4T}$ represents an imaging magnification of the fourth optical lens group at the telescopic limit.

2. The zooming lens apparatus according to claim 1, wherein the zooming lens apparatus satisfies an inequality condition $1.0<m_{4T}/m_{4W}<1.3$, where $m_{4T}$ represents an imaging magnification of the fourth optical lens group at the telescopic limit, and $m_{4W}$ represents an imaging magnification of the fourth optical lens group at the wide-angle limit.

3. The zooming lens apparatus according to claim 1, wherein the zooming lens apparatus satisfies an inequality condition $0.50<X_1/f_T<0.85$, where $X_1$ represents a total traveling distance of the first optical lens group in zooming from the wide-angle limit to the telescopic limit, and $f_T$ represents a focal length of the entire zooming lens apparatus at the telescopic limit.

4. The zooming lens apparatus according to claim 1, wherein the zooming lens apparatus satisfies an inequality condition $0.25<X_3/f_T<0.50$, where $X_3$ represents a total traveling distance of the third optical lens group in zooming from the wide-angle limit to the telescopic limit, and $f_T$ represents a focal length of the entire zooming lens apparatus at the telescopic limit.

5. The zooming lens apparatus according to claim 1, wherein the zooming lens apparatus satisfies an inequality condition $0.6<|f2|/F3<1.0$, wherein $f_2$ represents a focal length of the second optical lens group, and $f_3$ represents a focal length of the third optical lens group.

6. The zooming lens apparatus according to claim 1, wherein the zooming lens apparatus satisfies an inequality condition $6.0<f_1/f_W<12.0$, wherein $f_1$ represents a focal length of the first optical lens group G1, and $f_W$ represents a focal length of the entire zooming lens apparatus at the wide-angle limit.

7. The zooming lens apparatus according to claim 1, wherein,
the frame assembly is configured such that the aperture diaphragm is movable independently of the second and third optical lens groups, and
a distance between the aperture diaphragm and the third optical lens group is at a maximum distance at the wide-angle limit and is at a minimum distance at the telescopic limit.

8. The zooming lens apparatus according to claim 1, wherein the second optical lens groups includes,
a first negative lens including an optical surface having a curvature larger than a curvature of another optical surface of the first negative lens, the optical surface being arranged to face the aperture diaphragm,
a positive lens including an optical surface having a curvature larger than a curvature of another optical surface of the positive lens, the optical surface being arranged to face the aperture diaphragm, and the positive lens being arranged between the first negative lens and the aperture diaphragm, and
a second negative lens including an optical surface having a curvature larger than a curvature of another optical surface of the second negative lens, the optical surface being arranged to face the first optical lens group, and the second negative lens being arranged between the positive lens and the aperture diaphragm.

9. The zooming lens apparatus according to claim 8, wherein the second optical lens group satisfies inequality conditions:
$1.77<N_{21}<1.90, 35<v_{21}<50,$
$1.65<N_{22}<1.90, 20<v_{22}<35,$ and
$1.75<N_{23}<1.90, 35<v_{23}<50,$
where $N_{2i}$ represents a refractive index of a lens at an i-th position i-th closest to a subject in the second optical lens group, and $v_{2i}$ represents an Abbe number of a lens at an i-th position i-th closest to the subject in the second optical lens group.

10. The zooming lens apparatus according to claim 1, wherein an opening size of the aperture diaphragm is constant during the scaling change of the zooming lens apparatus from the wide-angle limit to the telescopic limit.

11. The zooming lens apparatus according to claim 1, wherein an opening size of the aperture diaphragm increases during the scaling change of the zooming lens apparatus from the wide-angle limit to the telescopic limit.

12. The zooming lens apparatus according to claim 1, wherein the frame assembly is arranged as a cylindrical telescoping frame.

13. A camera, comprising:
an optical filter/cover; and
a zooming lens apparatus including, a first optical lens group having a positive refractive power, a second optical lens group having a negative refractive power and arranged between the first optical lens group and the optical filter/cover, a third optical lens group having a positive refractive power and arranged between the second optical lens group and the optical filter/cover, an aperture diaphragm arranged between the second optical lens group and the third optical lens group, a fourth optical lens group having a positive refractive power and arranged between the third optical lens group and the optical filter/cover, and a frame assembly configured to support the first optical lens group, the second optical lens group, the third optical lens group, the fourth optical lens group, and the aperture diaphragm, the frame assembly being configured to move the first optical lens group and the third optical lens group away from the optical filter/cover, and to move the fourth optical lens group toward the optical filter/cover, when a scaling of the zooming lens apparatus is changed from a wide-angle limit to a telescopic limit, and the zooming lens apparatus satisfying an inequality condition $0.60 < m_{4T} < 0.85$, where $m_{4T}$ represents an imaging magnification of the fourth optical lens group at the telescopic limit.

14. A mobile information device, comprising:

an optical filter/cover; and a zooming lens apparatus including, a first optical lens group having a positive refractive power, a second optical lens group having a negative refractive power and arranged between the first optical lens group and the optical filter/cover, a third optical lens group having a positive refractive power and arranged between the second optical lens group and the optical filter/cover, an aperture diaphragm arranged between the second optical lens group and the third optical lens group, a fourth optical lens group having a positive refractive power and arranged between the third optical lens group and the optical filter/cover, and a frame assembly configured to support the first optical lens group, the second optical lens group, the third optical lens group, the fourth optical lens group, and the aperture diaphragm, the frame assembly being configured to move the first optical lens group and the third optical lens group away from the optical filter/cover, and to move the fourth optical lens group toward the optical filter/cover, when a scaling of the zooming lens apparatus is changed from a wide-angle limit to a telescopic limit, and the zooming lens apparatus satisfying an inequality condition $0.60 < m_{4T} < 0.85$, where $m_{4T}$ represents an imaging magnification of the fourth optical lens group at the telescopic limit.

15. A zooming lens apparatus, comprising:

a first optical lens group having a positive refractive power;

a second optical lens group having a negative refractive power;

an aperture diaphragm, the second optical lens group being arranged between the first optical lens group and the aperture diaphragm;

a third optical lens group having a positive refractive power, the aperture diaphragm being arranged between the second optical lens group and the third optical lens group;

a fourth optical lens group having a positive refractive power, the third optical lens group being arranged between the aperture diaphragm and the fourth optical lens group; and a frame assembly configured to support the first optical lens group, the second optical lens group, the third optical lens group, the fourth optical lens group, and the aperture diaphragm, the frame assembly being configured to move the first optical lens group and the third optical lens group in a first direction, and to move the fourth optical lens group in a second direction opposite of the first direction, when a scaling of the zooming lens apparatus is changed from a wide-angle limit to a telescopic limit, and the zooming lens apparatus satisfying an inequality condition $0.50 < X_1/f_T < 0.85$, where $X_1$ represents a total traveling distance of the first optical lens group during zooming from the wide-angle limit to the telescopic limit, and $f_T$ represents a focal length of the entire zooming lens apparatus at the telescopic limit.

16. The zooming lens apparatus according to claim 15, wherein, the frame assembly is configured to move the aperture diaphragm independently of the second and third optical lens groups, and a distance between the aperture diaphragm and the third optical lens group is at a maximum distance at the wide-angle limit, and is at a minimum distance at the telescopic limit.

17. The zooming lens apparatus according to claim 15, wherein the second optical lens groups includes, a first negative lens including an optical surface having a curvature larger than a curvature of another optical surface of the first negative lens, the optical surface being arranged to face the aperture diaphragm;

a positive lens including an optical surface having a curvature larger than a curvature of another optical surface of the positive lens, the optical surface being arranged to face the aperture diaphragm, and the positive lens being arranged between the first negative lens and the aperture diaphragm; and a second negative lens including an optical surface having a curvature larger than a curvature of another optical surface of the second negative lens, the optical surface being arranged to face the first optical lens group, and the second negative lens being arranged between positive lens and the aperture diaphragm.

18. The zooming lens apparatus according to claim 15, wherein the zooming lens apparatus satisfies inequality conditions:

$1.75 < N_{21} < 1.90$, $35 < v_{21} < 50$, $1.65 < N_{22} < 1.90$, $20 < v_{22} < 35$, and $1.75 < N_{23} < 1.90$, $35 < v_{23} < 50$, where $N_{2i}$ represents a refractive index of a lens at an i-th position i-th closest to a subject in the second optical lens group, and $v_{2i}$ represents an Abbe number of a lens at an i-th position i-th closest to the subject in the second optical lens group.

19. The zooming lens apparatus according to claim 15, wherein an opening size of the aperture diaphragm is constant during the scaling change of the zooming lens apparatus from the wide-angle limit to the telescopic limit.

20. The zooming lens apparatus according to claim 15, wherein an opening size of the aperture diaphragm increases during the scaling change of the zooming lens apparatus from the wide-angle limit to the telescopic limit.

21. The zooming lens apparatus according to claim 15, wherein the frame assembly is arranged as a cylindrical telescoping frame.

22. A camera comprising:
an optical filter/cover; and
a zooming lens apparatus including,
   a first optical lens group having a positive refractive power,
   a second optical lens group having a negative refractive power and arranged between the first optical lens group and the optical filter/cover,
   a third optical lens group having a positive refractive power and arranged between the second optical lens group and the optical filter/cover,
   an aperture diaphragm arranged between the second optical lens group and the third optical lens group,
   a fourth optical lens group having a positive refractive power and arranged between the third optical lens group and the optical filter/cover, and
   a frame assembly configured to support the first optical lens group, the second optical lens group, the third optical lens group, the fourth optical lens group, and the aperture diaphragm, the frame assembly being configured to move the first optical lens group and the third optical lens group away from the optical filter/cover, and to move the fourth optical lens group toward the optical filter/cover, when a scaling of the zooming lens apparatus is changed from a wide-angle limit to a telescopic limit, and the zooming lens apparatus satisfying an inequality condition $0.50 < X_1/f_T < 0.85$, where $X_1$ represents a total traveling distance of the first optical lens group during zooming from the wide-angle limit to the telescopic limit, and $f_T$ represents a focal length of the entire zooming lens apparatus at the telescopic limit.

23. A mobile information device, comprising:
an optical, filter/cover; and
a zooming lens apparatus including,
   a first optical lens group having a positive refractive power,
   a second optical lens group having a negative refractive power and arranged between the first optical lens group and the optical filter/cover,
   a third optical lens group having a positive refractive power and arranged between the second optical lens group and the optical filter/cover,
   an aperture diaphragm arranged between the second optical lens group and the third optical lens group,
   a fourth optical lens group having a positive refractive power and arranged between the third optical lens group and the optical filter/cover, and
   a frame assembly configured to support the first optical lens group, the second optical lens group, the third optical lens group, the fourth optical lens group, and the aperture diaphragm, the frame assembly being configured to move the first optical lens group and the third optical lens group away from the optical filter/cover, and to move the fourth optical lens group toward the optical filter/cover, when a scaling of the zooming lens apparatus is changed from a wide-angle limit to a telescopic limit, and the zooming lens apparatus satisfying an inequality condition $0.50 < X_1/f_T < 0.85$, where $X_1$ represents a total traveling distance of the first optical lens group during zooming from the wide-angle limit to the telescopic limit, and $f_T$ represents a focal length of the entire zooming lens apparatus at the telescopic limit.

24. A zooming lens apparatus, comprising:
a first optical lens group having a positive refractive power;
a second optical lens group having a negative refractive power;
an aperture diaphragm, the second optical lens group being arranged between the first optical lens group and the aperture diaphragm;
a third optical lens group having a positive refractive power, the aperture diaphragm being arranged between the second optical lens group and the third optical lens group; and
a frame assembly configured to support the first optical lens group, the second optical lens group, the third optical lens group, and the aperture diaphragm, the frame assembly being configured to move the first optical lens group, the second optical lens group, and the third optical lens group such that a distance between the first optical lens group and the second optical lens group increases and a distance between the second optical lens group and the third optical lens group decreases when a scaling of the zooming lens apparatus is changed from a wide-angle limit to a telescopic limit,
wherein the second optical lens group includes,
   a first negative lens including an optical surface having a curvature larger than a curvature of another optical surface of the first negative lens, the optical surface being arranged to face the aperture diaphragm,
   a positive lens including an optical surface having a curvature larger than a curvature of another optical surface of the positive lens, the optical surface being arranged to face the aperture diaphragm, and the positive lens being arranged between the first negative lens and the aperture diaphragm, and
   a second negative lens including an optical surface having a curvature larger than a curvature of another optical surface of the second negative lens, the optical surface being arranged to face the first optical lens group, and the second negative lens being arranged between positive lens and the aperture diaphragm, and
wherein the zooming lens apparatus satisfies an inequality condition $0.70 < Y'_{max}/f_W < 1.00$, where $Y'_{max}$ represents a maximum image height, and $f_W$ represents an image magnification of the entire zooming lens apparatus at the wide-angle limit.

25. The zooming lens apparatus according to claim 24, wherein,
a first negative lens in the second optical lens group includes an aspheric surface facing the aperture diaphragm, and
the zooming lens apparatus satisfies an inequality condition $0.0010 < (1-N_{2f}) \times X_{2f}(H_{0.8})/Y'_{max} < 0.0500$, where $N_{2f}$ represents a refractive index of a meniscus lens of the second optical lens group facing the first optical lens group, $X_{2f}(H_{0.8})$ represents an aspheric mount on 80% of maximum light effective height on a surface of the second optical lens group that is closest to the aperture diaphragm, and $Y'_{max}$ represents a maximum image height.

26. The zooming lens apparatus according to claim 25, wherein,
a second negative lens in the second optical lens group includes an aspheric surface facing away from the aperture diaphragm, and
the zooming lens apparatus satisfies an inequality condition
$-0.0500 < \{(N_{2O}-1) \times X_{2O}(H_{0.8}) + (1-N_{2I}) \times X_{2I}(H_{0.8})\} / Y'_{max} < 0.1500$, where $N_{2O}$ represents a the meniscus lens, $X_{2O}(H_{0.8})$ represents an aspheric mount on 80% of maximum light effective height on a surface of the second optical lens group that is furthest from the aperture diaphragm, $N_{2I}$ represents a refractive index of a meniscus lens of the second optical lens group facing the aperture diaphragm, $X_{2I}(H_{0.8})$ represents an aspheric mount on 80% of maximum light effective height on the surface of the second optical lens group that is closest to the aperture diaphragm, and $Y'_{max}$ represents a maximum image height.

27. The zooming lens apparatus according to claim 24, wherein the zooming lens apparatus satisfies inequality conditions:
$1.75 < N_{21} < 1.90$, $35 < \nu_{21} < 50$,
$1.65 < N_{22} < 1.90$, $20 < \nu_{22} < 35$, and
$1.75 < N_{23} < 1.90$, $35 < \nu_{23} < 50$,
where $N_{2i}$ represents a refractive index of a lens at an i-th position i-th closest to a subject in the second optical lens group, and $\nu_{2i}$ represents an Abbe number of a lens at an i-th position i-th closest to the subject in the second optical lens group.

28. The zooming lens apparatus according to claim 24, wherein the positive lens and the second negative lens in the second optical lens group are attached at a jointed surface.

29. The zooming lens apparatus according to claim 28, wherein the zooming lens apparatus satisfies an inequality condition $-3.5 < R_{2c}/Y'_{max} < -1.0$, where $R_{2c}$ represents a curvature radius of the jointed surface, and $Y'_{max}$ represents a maximum image height.

30. The zooming lens apparatus according to claim 24, wherein,
the frame assembly is configured to move the first optical lens group away from the second optical lens group when a scaling of the zooming lens apparatus is changed from the wide-angle limit to the telescopic limit, and
the zooming lens apparatus satisfies an inequality condition $0.50 < (D_{12T} - D_{12W})/f_T < 0.85$, where $D_{12T}$ represents a distance between the first optical lens group and the second optical lens group at the telescopic limit, $D_{12W}$ represents a distance between the first optical lens group and the second optical lens group at the wide-angle limit, and $f_T$ represents a focal length of the entire zooming lens apparatus at the telescopic limit.

31. The zooming lens apparatus according to claim 24, wherein,
the frame assembly is configured to move the third optical lens group towards the second optical lens group when a scaling of the zooming lens apparatus is changed from the wide-angle limit to the telescopic limit, and
the zooming lens apparatus satisfies an inequality condition $0.25 < (D_{23W} - D_{23T})/f_T < 0.65$, where $D_{23W}$ represents a distance between the second optical lens group and the third optical lens group at the wide-angle limit, $D_{23T}$ represents a distance between the second optical lens group and the third optical lens group at the telescopic limit, and $f_T$ represents a focal length of the entire zooming lens apparatus at the telescopic limit.

32. The zooming lens apparatus according to claim 24, wherein the zooming lens apparatus satisfies an inequality condition $0.5 < |f_2|/f_3 < 0.65$, where f2 represents a focal length of the second optical lens group, and f3 represents a focal length of the third optical lens group.

33. The zooming lens apparatus according to claim 24, wherein the zooming lens apparatus satisfies an inequality condition $6.0 < f_1/f_W < 0.65$, where $f_1$ represents a focal length of the first optical lens group, and $f_W$ represents an image magnification of the entire zooming lens apparatus at the wide-angle limit.

34. The zooming lens apparatus according to claim 24, further comprising:
a fourth optical lens group having a positive refractive power, the third optical lens group being arranged between the aperture diaphragm and the fourth optical lens group,
wherein the frame assembly is configured to move at least the first optical lens group and the third optical lens group in a first direction such that a distance between the first optical lens group and the second optical lens group increases, and such that a distance between the second optical lens group and the third optical lens group decreases, when a scaling of the zooming lens apparatus is changed from the wide-angle limit to the telescopic limit.

35. The zooming lens apparatus according to claim 34, wherein the frame assembly is configured to move the fourth optical lens group in a second direction opposite of the first direction when a scaling of the zooming lens apparatus is changed from the wide-angle limit to the telescopic limit.

36. The zooming lens apparatus according to claim 34, wherein,
the frame assembly is configured to move the aperture diaphragm independently of the second and third optical lens groups, and
a distance between the aperture diaphragm and the third optical lens group is at a maximum distance at the wide-angle limit, and is at a minimum distance at the telescopic limit.

37. The zooming lens apparatus according to claim 24, wherein an opening size of the aperture diaphragm is constant during the scaling change of the zooming lens apparatus from the wide-angle limit to the telescopic limit.

38. The zooming lens apparatus according to claim 24, wherein an opening size of the aperture diaphragm increases during the scaling change of the zooming lens apparatus from the wide-angle limit to the telescopic limit.

39. The zooming lens apparatus of claim 24, wherein the frame assembly is configured as a cylindrical telescoping frame.

40. A camera comprising:
an optical filter/cover; and
a zooming lens apparatus including,
a first optical lens group having a positive refractive power,
a second optical lens group having a negative refractive power and arranged between the first optical lens group and the optical filter/cover,
a third optical lens group having a positive refractive power and arranged between the second optical lens group and the optical filter/cover,
an aperture diaphragm arranged between the second optical lens group and the third optical lens group,
the second optical lens group including,
a first negative lens including an optical surface having a curvature larger than a curvature of another optical surface of the first negative lens, the optical surface being arranged to face the aperture diaphragm,
a positive lens including an optical surface having a curvature larger than a curvature of another optical surface of the positive lens, the optical surface being arranged to face the aperture diaphragm, and the positive lens being arranged between the first negative lens and the aperture diaphragm, and
a second negative lens including an optical surface having a curvature larger than a curvature of another optical surface of the second negative lens, the optical surface being arranged to face the first optical lens group, and the second negative lens being arranged between positive lens and the aperture diaphragm, and
a frame assembly configured to support the first optical lens group, the second optical lens group, the third optical lens group, and the aperture diaphragm, the frame assembly being configured to move the first optical lens group, the second optical lens group, and the third optical lens group such that a distance between the first optical lens group and the second optical lens group increases and a distance between the second optical lens group and the third optical lens group decreases when a scaling of the zooming lens apparatus is changed from a wide-angle limit to a telescopic limit, and the zooming lens apparatus satisfying an inequality condition $0.70 < Y'_{max}/f_W < 1.00$, where $Y'_{max}$ represents a maximum image height, and $f_W$ represents an image magnification of the entire zooming lens apparatus at the wide-angle limit.

41. A mobile information device, comprising:
an optical filter/cover; and
a zooming lens apparatus including,
   a first optical lens group having a positive refractive power,
   a second optical lens group having a negative refractive power and arranged between the first optical lens group and the optical filter/cover,
   a third optical lens group having a positive refractive power and arranged between the second optical lens group and the optical filter/cover,
   an aperture diaphragm arranged between the second optical lens group and the third optical lens group,
   the second optical lens group including,
      a first negative lens including an optical surface having a curvature larger than a curvature of another optical surface of the first negative lens, the optical surface being arranged to face the aperture diaphragm,
      a positive lens including an optical surface having a curvature larger than a curvature of another optical surface of the positive lens, the optical surface being arranged to face the aperture diaphragm, and the positive lens being arranged between the first negative lens and the aperture diaphragm, and
      a second negative lens including an optical surface having a curvature larger than a curvature of another optical surface of the second negative lens, the optical surface being arranged to face the first optical lens group, and the second negative lens being arranged between positive lens and the aperture diaphragm, and
   a frame assembly configured to support the first optical lens group, the second optical lens group, the third optical lens group, and the aperture diaphragm, the frame assembly being configured to move the first optical lens group, the second optical lens group, and the third optical lens group such that a distance between the first optical lens group and the second optical lens group increases and a distance between the second optical lens group and the third optical lens group decreases when a scaling of the zooming lens apparatus is changed from a wide-angle limit to a telescopic limit, and the zooming lens apparatus satisfying an inequality condition $0.70 < Y'_{max}/f_W < 1.00$, where $Y'_{max}$ represents a maximum image height, and $f_W$ represents an image magnification of the entire zooming lens apparatus at the wide-angle limit.

42. A zooming lens apparatus, comprising:
a first optical lens group having a positive refractive power;
a second optical lens group having a negative refractive power;
an aperture diaphragm, the second optical lens group being arranged between the first optical lens group and the aperture diaphragm;
a third optical lens group having a positive refractive power, the aperture diaphragm being arranged between the second optical lens group and the third optical lens group;
a fourth optical lens group having a positive refractive power, the third optical lens group being arranged between the aperture diaphragm and the fourth optical lens group; and
means for supporting the first optical lens group, the second optical lens group, the third optical lens group, the fourth optical lens group, and the aperture diaphragm, and for moving the first optical lens group and the third optical lens group in a first direction, and for moving the fourth optical lens group in a second direction opposite to the first direction, when a scaling of the zooming lens apparatus is changed from a wide-angle limit to a telescopic limit, and the zooming lens apparatus satisfying an inequality condition $0.60 < m_{4T} < 0.85$, where $m_{4T}$ represents an imaging magnification of the fourth optical lens group at the telescopic limit.

43. A zooming lens apparatus, comprising:
a first optical lens group having a positive refractive power;
a second optical lens group having a negative refractive power;
an aperture diaphragm, the second optical lens group being arranged between the first optical lens group and the aperture diaphragm;
a third optical lens group having a positive refractive power, the aperture diaphragm being arranged between the second optical lens group and the third optical lens group;
a fourth optical lens group having a positive refractive power, the third optical lens group being arranged between the aperture diaphragm and the fourth optical lens group; and
means for supporting the first optical lens group, the second optical lens group, the third optical lens group, the fourth optical lens group, and the aperture diaphragm, and for moving the first optical lens group and the third optical lens group in a first direction, and for moving the fourth optical lens group in a second direction opposite of the first direction, when a scaling of the zooming lens apparatus is changed from a wide-angle limit to a telescopic limit, and the zooming lens apparatus satisfying an inequality condition $0.50 < X_1/f_T < 0.85$, where $X_1$ represents a total traveling distance of the first optical lens group during zooming from the wide-angle limit to the telescopic limit, and $f_T$ represents a focal length of the entire zooming lens apparatus at the telescopic limit.

44. A zooming lens apparatus, comprising:
a first optical lens group having a positive refractive power;
a second optical lens group having a negative refractive power;
an aperture diaphragm, the second optical lens group being arranged between the first optical lens group and the aperture diaphragm;
a third optical lens group having a positive refractive power, the aperture diaphragm being arranged between the second optical lens group and the third optical lens group; and
means for supporting the first optical lens group, the second optical lens group, the third optical lens group, and the aperture diaphragm, and for moving the first optical lens group, the second optical lens group, and the third optical lens group such that a distance between the first optical lens group and the second optical lens group increases and a distance between the second optical lens group and the third optical lens group decreases when a scaling of the zooming lens apparatus is changed from a wide-angle limit to a telescopic limit, and the zooming lens apparatus satisfying an inequality condition $0.70 < Y'_{max}/f_W < 1.00$, where $Y'_{max}$ represents a maximum image height, and $f_W$ represents an image magnification of the entire zooming lens apparatus at the wide-angle limit.

45. A method of changing a scaling of a zooming lens apparatus from a wide-angle limit to a telescopic limit, comprising:
moving a first optical lens group of the zooming lens apparatus towards a subject, the first optical lens group having a positive refractive power;
preventing movement of a second optical lens group of the zooming lens apparatus, the second optical lens group having a negative refractive power and being arranged between the first optical lens group and an image plane;
moving a third optical lens group of the zooming lens apparatus towards the subject, the third optical lens group having a positive refractive power and being arranged between the second optical lens group and the image plane; and
moving a fourth optical lens group of the zooming lens apparatus away from the subject, the fourth optical lens group having a positive refractive power and being arranged between the third optical lens group and the image plane,
wherein the zooming lens apparatus satisfies an inequality condition $0.60 < m_{4T} < 0.85$, where $m_{4T}$ represents an imaging magnification of the fourth optical lens group at the telescopic limit.

46. The method of claim 45, further comprising:
moving an aperture diaphragm of the zooming lens apparatus towards the subject, the aperture diaphragm being arranged between second optical lens group and the third optical lens group.

47. A method of changing a scaling of a zooming lens apparatus from a wide-angle limit to a telescopic limit, comprising:
moving a first optical lens group of the zooming lens apparatus towards a subject, the first optical lens group having a positive refractive power;
preventing movement of a second optical lens group of the zooming lens apparatus, the second optical lens group having a negative refractive power and being arranged between the first optical lens group and an image plane;
moving a third optical lens group of the zooming lens apparatus towards the subject, the third optical lens group having a positive refractive power and being arranged between the second optical lens group and the image plane; and
moving a fourth optical lens group of the zooming lens apparatus away from the subject, the fourth optical lens group having a positive refractive power and being arranged between the third optical lens group and the image plane,
wherein the zooming lens apparatus satisfies an inequality condition $0.50 < X_1/f_T < 0.85$, where $X_1$ represents a total traveling distance of the first optical lens group during zooming from the wide-angle limit to the telescopic limit, and $f_T$ represents a focal length of the entire zooming lens apparatus at the telescopic limit.

48. The method of claim 47, further comprising:
moving an aperture diaphragm of the zooming lens apparatus towards the subject, the aperture diaphragm being arranged between second optical lens group and the third optical lens group.

49. A method of changing a scaling of a zooming lens apparatus from a wide-angle limit to a telescopic limit, comprising:
moving a first optical lens group of the zooming lens apparatus towards a subject, the first optical lens group having a positive refractive power;
moving a second optical lens group of the zooming lens apparatus away from the subject, the second optical lens group having a negative refractive power and being arranged between the first optical lens group and an image plane, and the second optical lens group including,
a first negative lens including an optical surface having a curvature larger than a curvature of another optical surface of the first negative lens, the optical surface being arranged to face an aperture diaphragm of the zooming lens apparatus,
a positive lens including an optical surface having a curvature larger than a curvature of another optical surface of the positive lens, the optical surface being arranged to face the aperture diaphragm, and the positive lens being arranged between the first negative lens and the aperture diaphragm, and
a second negative lens including an optical surface having a curvature larger than a curvature of another optical surface of the second negative lens, the optical surface being arranged to face the first optical lens group, and the second negative lens being arranged between positive lens and the aperture diaphragm;
moving the aperture diaphragm of the zooming lens apparatus towards the subject, the aperture diaphragm being arranged between second optical lens group and the image plane; and moving a third optical lens group of the zooming lens apparatus towards the subject, the third optical lens group having a positive refractive power and being arranged between the aperture diaphragm and the image plane, wherein the zooming lens apparatus satisfies an inequality condition $0.70 < Y'_{max}/f_W < 1.00$, where $Y'_{max}$ represents a maximum image height, and $f_W$ represents an image magnification of the entire zooming lens apparatus at the wide-angle limit.

50. The method of claim 49, further comprising:

moving a fourth optical lens group of the zooming lens apparatus away from the subject, the fourth optical lens group having a positive refractive power and being arranged between the third optical lens group and the image plane.

* * * * *